United States Patent
Takahama et al.

[11] Patent Number: 5,905,489
[45] Date of Patent: May 18, 1999

[54] COORDINATE INPUT DEVICE

[75] Inventors: Kengo Takahama, Nara; Hitoshi Nohno, Nabari, both of Japan

[73] Assignee: Sharp Kabushiki Kaisha, Osaka, Japan

[21] Appl. No.: 08/799,425

[22] Filed: Feb. 12, 1997

[30] Foreign Application Priority Data

Feb. 16, 1996 [JP] Japan .................................. 8-029656

[51] Int. Cl.⁶ .................................................. G08G 5/00
[52] U.S. Cl. ........................................ 345/174; 345/156
[58] Field of Search .................................. 345/156, 173, 345/180, 182, 174

[56] References Cited

U.S. PATENT DOCUMENTS

| | | | |
|---|---|---|---|
| 4,639,720 | 1/1987 | Rympaiski et al. | 345/174 |
| 4,639,730 | 1/1987 | Rympalski et al. | 345/174 |
| 4,922,061 | 5/1990 | Meadows et al. | 345/174 |
| 5,592,197 | 1/1997 | Tagawa | 345/173 |
| 5,631,670 | 5/1997 | Tomiyoshi et al. | 345/173 |

FOREIGN PATENT DOCUMENTS

| | | |
|---|---|---|
| 5053726 | 2/1992 | Japan . |
| 6314166 | 4/1993 | Japan . |

Primary Examiner—Daniel J. Wu

[57] ABSTRACT

An M-sequence signal is generated in an M-sequence generation circuit, and the M-sequence signal, which is successively delayed by a column-electrode driving circuit or a row-electrode driving circuit, is applied to a column-electrode group or a row-electrode group. A correlator finds a correlation between the M-sequence signal and a detection signal that has been detected by amplifying electrostatically induced voltage that appeared in the detection electrode of an electronic pen so that a position specified by the electronic pen is detected by a detection circuit as a coordinate signal. Thus, it is possible to obtain a coordinate detection signal having a superior S/N ratio without reducing the coordinate detection speed, and consequently to carry out a coordinate detecting operation with high precision.

29 Claims, 41 Drawing Sheets

ROW ELECTRODES: G1, G2, G3, G4
COLUMN ELECTRODES: S1 S2 S3 S4 S5 S6 S7

COORDINATE INPUT DEVICE

FIELD OF THE INVENTION

The present invention relates to a coordinate input device that is used in computers, word processors or other apparatuses.

BACKGROUND OF THE INVENTION

Tablets in which graphic and character recognition and command execution can be carried out by instructions that are given with a pen, finger or other means have been known in the art as one type of input devices that carry out predetermined input operations to computers, word processors, and other apparatuses. Moreover, Japanese Laid-Open Patent Publication No. 53726/1993 (Tokukaihei 5-53726) and Japanese Laid-Open Patent Publication No. 314166/1994 (Tokukaihei 6-314166) disclose display-integrated type tablet devices which achieve inexpensive constructions by commonly using electrode constructions and driving circuits in liquid crystal panels and other components, which are regarded as further advanced tablets.

It is required for such coordinate input devices to carry out coordinate detection with high precision at high speeds. In recent years, pixels in the display device become smaller and smaller, and such fine display has further increased the demands for high precision of the coordinate detection.

However, high speed and high precision of the coordinate input device form two effects that are inconsistent with each other; therefore, the problem with the prior art coordinate input device is that the coordinate detecting precision can not be improved with high-speed coordinate detection maintained as it is. In other words, high-speed coordinate detection needs to widen the frequency band width, resulting in degradation in the precision.

Among these coordinate input devices, especially in the display-integrated type devices, the coordinate detecting precision further deteriorate for the following reasons: For example, the arrangement of the above-mentioned Japanese Laid-Open Patent Publication No. 53726/1993 (Tokukaihei 5-53726) is designed to provide the display and coordinate detection functions by carrying out the image display and coordinate detection in a time-sharing manner. In this case, the coordinate detection period is set as short as possible in order for the coordinate detection operation not to give adverse effects on the display. Further, the applied voltage used for detection in not increased so much since it is limited by the resistance to voltage of the display driver. Moreover, in the case of duty-type liquid crystal, since this system utilizes the electrostatic coupling that is exerted between the tip electrode of an electronic pen and the transparent electrode group on one side through the gap of the electrode group on the other side, only a minute detection voltage is obtained. Consequently, the above-mentioned display-integrated type tablet devices only provide a coordinate detection signal with an inferior S/N ratio.

Moreover, the above-mentioned Japanese Laid-Open Patent Publication No. 314166/1994 (Tokukaihei 6-314166) shows an arrangement wherein a tablet function is added to a TFT (Thin Film Transistor) liquid crystal panel using the addressing system. In order to improve display quality, a present trend in TFT liquid crystal panels is to improve the aperture ratio by narrowing the widths of gate electrodes and source electrodes so as to widen the areas of pixel electrodes. In this case also, since the coordinate detection signal is detected in proportion to the coupling capacitance between the tip electrode of an electronic pen and the gate electrodes or the source electrodes, the coupling capacitance decreases with the improvement of the aperture ratio, thereby resulting in degradation in the S/N ratio of the detection signal. Here, in the TFT liquid crystal panels also, it is needless to say that the coordinate detection period should be maintained as short as possible so as not to give adverse effects on the display.

Furthermore, in the prior art coordinate input devices, it is essential to provide a connecting line for the electronic pen so as to supply power to the electronic pen and to output the coordinate detection signal. Here, this connecting line is a disturbing object for the user to operate the electronic pen, causing degradation in the operability.

Additionally, another tablet using the pressure-sensitive system, which has two superimposed sheets of transparent electrodes with an insulating spacer inserted therebetween and which gives specified coordinates by using a current that flows between the detection electrodes when pressed by a pen point or a finger, has been proposed. However, the problems with this system are that merely an inferior visibility is obtained due to the transmittance and reflection of the transparent electrodes and that a finger and a pen cannot be used at the same time.

Further, U.S. Pat. No. 4,639,720 has proposed an arrangement wherein a pen-input function is achieved by intersecting transparent electrodes in liquid crystal so as to measure the electrostatic coupling capacitance between them, a pen point or a finger. However, this arrangement has a deficiency in that a complicated structure and driving method are required since the liquid crystal electrodes have to be designed to intersect each other on the same plane.

SUMMARY OF THE INVENTION

The first objective of the present invention is to provide a coordinate input device with high detecting precision without causing degradation in detection speeds.

The second objective of the present invention is to provide a coordinate input device which allows an input operation using a finger and a cordless pen and in which an input operation using a finger and the pen is carried out at the same time.

(1) In order to achieve the first objective, the first coordinate input apparatus of the present invention is provided with: 1) a first group of electrodes that are arranged on a substrate with predetermined intervals; 2) a second group of electrodes that are insulated from the first group of electrodes and that are arranged with predetermined intervals so as to intersect the first group of electrodes; 3) a pseudo-random-signal generator for generating a pseudo-random signal which has a pulse-related auto-correlation function; 4) a first sequential driver for sequentially applying the pseudo-random-signal having alternately different phases to the respective electrodes of the first group of electrodes; 5) a second sequential driver for sequentially applying the pseudo-random-signal having alternately different phases to the respective electrodes of the second group of electrodes; 6) a correlation detector for detecting the correlation between a detection signal that is outputted from an indicator when the indicator is electrostatically coupled to the first or second group of electrodes and the pseudo-random signal that has been generated by the pseudo-random-signal generator; and 7) a coordinate output device which finds a time difference that forms an extreme value of the detection signal detected by the correlation detector and outputs a coordinate value corresponding to the time difference as a specified coordinate.

In the above-mentioned arrangement, the pseudo-random signal, generated by the pseudo-random-signal generator, is first inputted to the first sequential driver. Then, it is sequentially subject to a time delay in the first sequential driver so that voltage changes corresponding to the pseudo-random signal are applied to the first group of electrodes. In other words, the voltage changes which have the amounts of time delay that are different little by little from each other are applied to the adjacent electrodes in the first group of electrodes. When a certain position in the first and second electrode groups is specified by the indicator, the first group of electrodes and the indicator are electrostatically coupled so that the change of electric potential in the first group of electrodes is detected by the indicator. The detection signal is inputted to the correlation detector, and the correlation detector detects the correlation between the detection signal and the pseudo-random signal. Thereafter, the coordinate output device finds a time difference that forms an extreme value of the detection signal and outputs a coordinate value corresponding to the time difference as a specified coordinate in the first electrode direction.

Next, the pseudo-random-signal generator again generates a pseudo-random signal, and the signal is inputted to the second sequential driver. Then, in the same manner as the case of the first electrodes, a specified coordinate in the second electrode direction is outputted from the coordinate output device.

As described above, in the coordinate input device of the present invention, since the pseudo-random signal whose electric potential is constantly changing is applied to the first group of electrodes and the second group of electrodes, signal energy, which is dispersed on a time basis, can be compressed to concentrate into one point by carrying out correlation operations upon detecting coordinates. Thus, it is possible to improve to a great degree the suppression ratio in relation to other signals such as random noise, thereby providing a high S/N ratio. As a result, even if the distance between the indicator and the panel substrate is large, or even if high-speed scanning is carried out, it is possible to obtain good precision in the coordinate detection.

Further, since a sufficient S/N ratio is maintained in the coordinate signal, drivers, even if they have merely low voltage resistance, can be used as the first sequential driver and the second sequential driver. Consequently, in the development of portable-type coordinate input devices, it is possible to meet demands for low-voltage devices.

(2) In order to achieve the above-mentioned second objective, the second coordinate input device of the present invention is provided with the above-mentioned arrangements as indicated by 1) through 5) and 7) and an arrangement 6)' having a correlation detector, which detects the correlation between the pseudo-random signal that has been generated by the pseudo-random-signal generator and a detection signal that has been induced in the electrode group that have not been driven, due to the fact that the indicator, which has been electrostatically coupled to the electrode group that have been driven by the first or second sequential driver, is also electrostatically coupled to the electrode group that have not been driven.

In the above-mentioned arrangement, the pseudo-random signal, generated by the pseudo-random-signal generator, is first inputted to the first sequential driver. Then, it is sequentially subject to a time delay in the first sequential driver so that voltage changes corresponding to the pseudo-random signal are applied to the first group of electrodes. In other words, the voltage changes which have the amounts of time delay that are different little by little from each other are applied to the adjacent electrodes in the first group of electrodes. When a certain position in the first and second electrode groups is specified by the indicator, the first group of electrodes and the indicator are electrostatically coupled so that the change of electric potential in the first group of electrodes is induced in the indicator. Simultaneously, the indicator is also electrostatically coupled to the second group of electrodes so that the voltage change, induced in the indicator, is also induced in the group of electrodes. The detection signal, which has been induced in the second group of electrodes, is inputted to the correlation detector, and the correlation detector detects the correlation between the detection signal and the pseudo-random signal. Thereafter, the coordinate output device finds a time difference that forms an extreme value of the detection signal and outputs a coordinate value corresponding to the time difference as a specified coordinate in the first electrode direction.

Next, the pseudo-random-signal generator again generates a pseudo-random signal, and the signal is inputted to the second sequential driver. Then, in the same manner as the case of the first electrodes, a specified coordinate in the second electrode direction is outputted from the coordinate output device.

As described above, in the coordinate input device of the present invention, since the pseudo-random signal whose electric potential is constantly changing is applied to the first group of electrodes and the second group of electrodes, signal energy, which is dispersed on a time basis, can be compressed to concentrate into one point by carrying out correlation operations upon detecting coordinates. Thus, it is possible to improve to a great degree the suppression ratio in relation to other signals such as random noise, thereby providing a high S/N ratio.

Here in the case when an indicator, such as a finger or a cordless pen that are not physically connected to the coordinate input device, is used, coupling between the indicator and the first group of electrodes or the second group of electrodes is very small so that a detectable voltage level is very small. However, even in such a case, the above-mentioned arrangement makes it possible to provide a high S/N ratio.

(3) The above-mentioned second coordinate input device may be preferably designed to have a second indicator for indicating a coordinate position on the first and second groups of electrodes by being coupled to the first or second group of electrodes, a second correlation detector for detecting the correlation between a detection signal that is outputted from the second indicator and the pseudo-random signal that has been generated by the pseudo-random-signal generator, and a second coordinate output device which finds a time difference that forms an extreme value of the detection signal detected by the second correlation detector and outputs a coordinate value corresponding to the time difference as a specified coordinate.

In the above-mentioned arrangement, when a certain position in the electrode groups is specified by the second indicator, the first or second group of electrodes and the second indicator are electrostatically coupled so that the change of electric potential in the first or second group of electrodes is detected by the second indicator. The detection signal is inputted to the second correlation detector, and the second correlation detector detects the correlation between the detection signal and the pseudo-random signal. Then, the second coordinate output device outputs a specified coordinate in the first or second electrode direction.

As described above, the coordinate input device of the present invention, upon finding a specified position by using the two indicators, utilizes the first and second groups of electrodes, the pseudo-random-signal generator, and the first and second sequential drivers as commonly-used components. Therefore, with a simple construction, it is possible to simultaneously detect coordinates by using the two indicators. Further, since the correlation detectors and the coordinate output devices are provided in a manner so as to correspond to the indicators, it is possible to carry out the coordinate detection at high speeds.

(4) The above-mentioned second coordinate input device may be preferably designed to have a second indicator for indicating a coordinate position on the first and second groups of electrodes by being coupled to the first or second group of electrodes, and a switch which selectively inputs to the correlation detector the detection signal outputted from the second indicator and the detection signal that has been induced in the electrode group that has not been driven.

In the above-mentioned arrangement, when a certain position in the electrode groups is specified by the second indicator, the first or second group of electrodes and the second indicator are electrostatically coupled so that the change of electric potential in the first or second group of electrodes is detected by the second indicator. The detection signal is selected by the switch and inputted to the correlation detector. In the case when a certain position in the electrodes groups is specified by the first indicator, the detection signal, which has been induced in the electrode group that has not been driven, is inputted to the correlation detector through the switch.

As described above, the coordinate input device of the present invention, upon finding a specified position by using the two indicators, utilizes the parts except for the indicators as commonly-used components by making switchover using the switch. Therefore, with a further simple construction, it is possible to detect coordinates with high precision by using the two indicators, as compared with the above-mentioned arrangement (4).

(5) The above-mentioned first or second coordinate input device may be preferably designed to have an information-processing device for driving an application program so as to generate display data upon receipt of the specified coordinates outputted from the coordinate output device, a display control device for generating a control signal for driving the first or second sequential driver based on the display data that has been outputted from the information-processing device, an output-switching device for selectively outputting the control signal from the display control device and the pseudo-random signal from the pseudo-random-signal generator in a time sharing manner, and a display device for providing a liquid crystal display by using the first and second groups of electrodes. In the above-mentioned first or second coordinate input device, the light transmittance of liquid crystal is controlled by an electric signal released from the first or second sequential driver so as to display an image during a display period in which the control signal has been selected by the output-switching device.

In the above-mentioned arrangement, during a coordinate detection period, specified coordinates are obtained since the output-switching device selects the pseudo-random-signal generator. In contrast, during the display period, the output-switching device selects the display control device. In this case, the information-processing device generates display data based on the specified coordinates, and releases it to the display control device. The display data controls the first or second sequential driver through the display control device. Then, the display device controls the light transmittance by using an electric signal from the first or second sequential driver so as to display an image.

In the conventional display-integrated-type coordinate input device, degradation in precision in coordinate detection has been seen since the coordinate detection period is set as short as possible so that the coordinate detection operation does not give adverse effects on the display. However, the coordinate input device of the present invention makes it possible to provide good precision in coordinate detection even with a short coordinate detection period, since correlation operations between the detection signal and the pseudo-random signal are carried out.

Further, upon carrying out the coordinate detection and image display, high-precision operation is available even if the respective components are utilized in a time-sharing manner; this enables the coordinate input device to have a simple structure. Thus, it becomes possible to miniaturize the coordinate input device.

Further, since a sufficient S/N ratio is maintained with respect to the coordinate signals, drivers, even if they have merely low voltage resistance, can be used as both the first sequential driver and the second sequential driver. Consequently, in the recent development of portable-type coordinate input devices, it is possible to meet demands for low-voltage devices.

(6) The above-mentioned display device may be preferably designed to have a plurality of electrode-group switching elements that are connected to the first and second electrode groups, transparent pixel electrodes wherein a plurality of pixel electrodes, connected to the electrode-group switching elements, are arranged in a matrix format, and opposing electrodes that are placed so as to face the transparent pixel electrodes with liquid crystal interpolated in between. In this arrangement, during the coordinate detection period in which the pseudo-random signal has been selected by the output-switching device, a voltage, which does not allow the electrode-group switching elements to conduct, is applied to the first electrode group or the second electrode group.

In the above-mentioned arrangement, during the display period in which the display control device has been selected by the output-switching device, a voltage, which corresponds to display luminance for one line, is applied to the electrode-group switching elements by the first electrodes, while scanning is sequentially carried out in the second electrode direction so that the electrode-group switching elements connected to the second electrodes are turned on. Then, the voltage of the first electrodes is charged to the liquid crystal through the transparent pixel electrodes.

In contrast, during the coordinate detection period in which the pseudo-random signal has been selected by the output-switching device, the coordinate detection is carried out by applying sequential voltages to the first and second groups of electrodes respectively. In this case, since the voltage, which does not allow the electrode-group switching elements to conduct, is applied to the first electrode group or the second electrode group, it is possible to prevent the image data that has been charged into the liquid crystal from being lost through discharge.

Normally, in the case when electrode-group switching elements and liquid crystal are used as a display device, since the areas of the first and second groups of electrodes are narrowed to be as small as possible so as to increase the aperture ratio for image display, high-precision coordinate detection is not available because of small electric coupling between the first or second group of electrodes and the indicator. However, the coordinate input device of the present invention makes it possible to provide high-precision detection signal by the correlation detection using the pseudo-random signal even when the aperture ratio for display is increased.

(7) The above-mentioned display device may be preferably designed to have a first transparent substrate on which the first group of electrodes are arranged and a second transparent substrate on which the second group of electrodes are arranged in a manner so as to face the first transparent substrate. Here, liquid crystal is interpolated between the two transparent substrates, and the optical characteristics of the liquid crystal are controlled by an effective applied voltage between the first group of electrodes and the second group of electrodes.

In the above-mentioned arrangement, pixels are formed in regions at which the first and second groups of electrodes intersect each other. Here, the line of the pixel matrix is selected by making the second group of electrodes active, while a signal corresponding to display data is outputted to the first group of electrodes; thus, the liquid crystal displaying operation is carried out.

Normally, since the areas in which the liquid crystal is interpolated with the first and second groups of electrodes intersecting each other are widened as large as possible so as to increase the aperture ratio for display, the electric coupling between the indicator and the closer electrode group on the surface side is comparatively great, while the electric coupling between the indicator and the electrode group on the opposite side is very small because the coupling is made through the gaps between the electrode group on the surface side. However, even in this case, the coordinate input device of the present invention makes it possible to provide a detection signal with high precision even when driven by a low voltage.

For a fuller understanding of the nature and advantages of the invention, reference should be made to the ensuing detailed description taken in conjunction with the accompanying drawings.

DESCRIPTION OF THE EMBODIMENT

EMBODIMENT 1

Referring to FIGS. 1 through 24, the following description will discuss one embodiment of the present invention. The coordinate input device of the present embodiment is designed to carry out coordinate detection by using the spectrum-dispersing technique.

Figure 1:
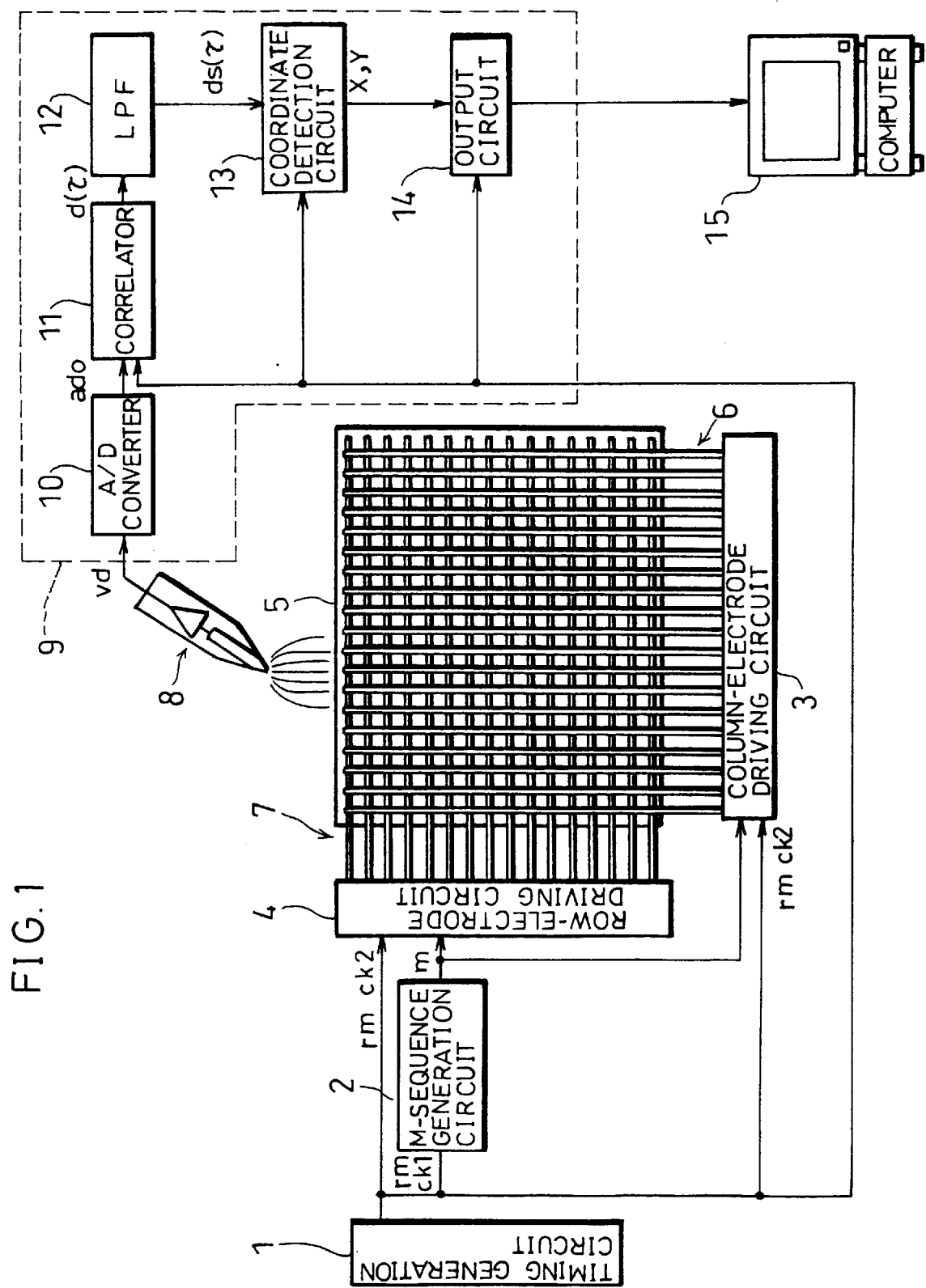
FIG. 1 is a block diagram showing an arrangement of a coordinate input device of one embodiment of the present invention.

As illustrated in FIG. 1, the coordinate input device is constituted by a timing generation circuit 1, an M-sequence (Maximum Length Code) generation circuit 2, a column-electrode driving circuit 3, a row-electrode driving circuit 4, a coordinate-input-panel substrate 5, a group of column electrodes 6, a group of row electrodes 7, an electronic pen 8, a detection circuit 9, and a computer 15.

The coordinate-input-panel substrate 5 is a flat panel that is mainly made of an electrically insulating material, such as glass, phenol resin, polyethyleneterephthalate or acryl. The column-electrode group (a first group of electrodes) 6 and the row-electrode group (a second group of electrodes) 7 are arranged on one surface or both of the surfaces of the coordinate-input-panel substrate 5 in a manner so as to orthogonally intersect each other, and both of the electrode groups are electrically insulated from each other.

The column-electrode group 6 is constituted by "a" number of column electrodes, which are indicated by S1 through Sa. The row-electrode group 7 is constituted by "b" number of row electrodes, which are indicated by G1 through Gb. Here, the numbers of the column electrodes and row electrodes may be set the same.

The timing generation circuit 1, which generates control signals for driving the entire system, supplies the control signals to the M-sequence generation circuit 2, the column-electrode driving circuit 3, the row-electrode driving circuit 4 and the detection circuit 9. The entire system operates based on the timing generated by the timing generation circuit 1. The control signals include clocks ck1 and ck2, a coordinate-detection cycle signal d, which will be described later, a column-coordinate (X) detection period signal xd, a row-coordinate (Y) detection period signal yd (see FIG. 2), and other signals.

The M-sequence generation circuit (a pseudo-random-signal generator) 2 is a circuit for generating an M-sequence signal m which has a pulse-related auto-correlation function based on the control signals. The M-sequence signal m, which is noise having a high degree of whiteness, is a function whose auto-correlation shows "1" only upon receipt of time difference of 0, and shows "0" upon receipt of time difference other than 0.

The column-electrode driving circuit (the first sequential driver) 3 and the row-electrode driving circuit (the second sequential driver) 4 apply voltages that correspond to the M-sequence signal m to the column-electrode group 6 and the row-electrode group 7 respectively.

The electronic pen (indicator) 8 has a detection electrode 81 (see FIG. 14) which will be described later and which is electrostatically coupled to the column-electrode group 6 and the row-electrode group 7, and designates a coordinate position on the coordinate-input-panel substrate 5. In other words, the electronic pen 8 amplifies a detection voltage vd that has been induced in the detection electrode 81 upon receipt of a change in electric potential due to the row-electrode driving circuit 4 and the column-electrode driving circuit 3, and outputs the resulting voltage.

The detection circuit 9, which is a circuit for outputting values of coordinates that have been specified by the electronic pen 8 in accordance with the detection voltage vd, is constituted by an A/D converter 10, a correlator 11, an LPF (low-pass filter) 12, a coordinate detection circuit 13 and an output circuit 14.

The A/D converter 10 converts the detection voltage vd to digital data ado with j bits, and supplies it to one of the input terminals of the succeeding correlator 11. An M-sequence initializing pulse rm, which is outputted from the timing generation circuit 1, is supplied to the other terminal of the correlator 11.

The correlator (correlation detector) 11 carries out correlation operations by using the digital data ado and an M-sequence that has the same degree as the M-sequence generated by the M-sequence generation circuit 2, based upon the M-sequence initializing pulse rm. Then, it successively releases an output d (τ) to the LPF 12.

The LPF 12 suppresses a high-frequency component of the output d (τ) from the correlator 11, and supplies the resulting output ds (τ) to the coordinate detection circuit 13.

The coordinate detection circuit 13 finds a time difference from extreme values of the output ds (τ) so as to find a position that corresponds to the time difference, and supplies the position to the output circuit 14 as X-Y coordinates. The output circuit 14 outputs the X-Y coordinate values to the computer 15 as specified coordinates. Here, the coordinate output device described in claim 1 is equivalent to the coordinate detection circuit 13 and the output circuit 14.

The computer 15 provides such an effect as to make the user feel as if he or she were drawing a picture using a pen by changing the display color of a pixel on the display at the corresponding position based upon the coordinate values detected by the detection circuit 9, drives the corresponding application based upon the coordinate values, or performs other functions.

Figure 2:
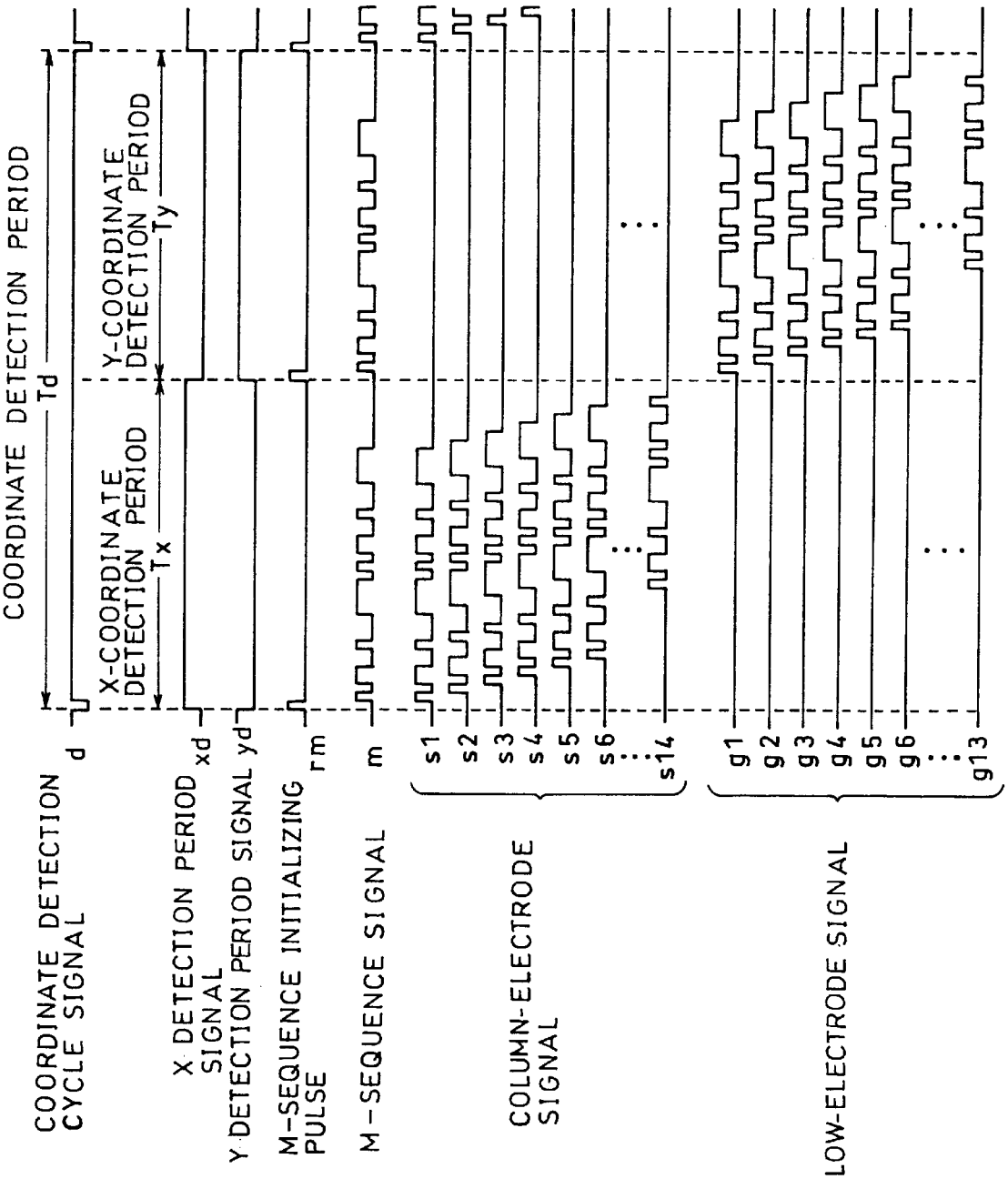
FIG. 2 is a timing chart that indicates the operation of the above-mentioned coordinate input device.

FIG. 2 shows operation timing of the coordinate input device. The cycle at which coordinates, specified by the electronic pen 8, are detected is indicated by a coordinate detection period Td, and this period is constituted by an X-coordinate detection period Tx and a Y-coordinate detection period Ty.

At the first timing of each of the X-coordinate detection period Tx and the Y-coordinate detection period Ty, the M-sequence initializing pulse rm is outputted from the timing generation circuit 1, and is fed to the M-sequence generation circuit 2, the column-electrode driving circuit 3 and the row-electrode driving circuit 4. When the M-sequence initializing pulse rm is inputted to the M-sequence generation circuit 2, the M-sequence generation circuit 2 is initialized, and in accordance with the clock ck1 that has been successively supplied thereto from the timing generation circuit 1, the M-sequence signal m is generated therefrom.

The M-sequence signal m, outputted from the M-sequence generation circuit 2, is supplied to the column-electrode driving circuit 3 during the X-coordinate detection period Tx, and is delayed by a shift register that is incorporated into the column-electrode driving circuit 3, in synchronism with the clock ck2 that is supplied from the timing generation circuit 1. Column-electrode signals (voltages) s1 through sa, which correspond to the delayed M-sequence signal m, are successively applied to the column electrodes S1 through Sa.

Next, during the Y-coordinate detection period Ty, the M-sequence initializing pulse rm is again outputted, the M-sequence generation circuit 2 is initialized, and the M-sequence signal m is again generated. The M-sequence signal m is inputted to the row-electrode driving circuit 4, and is delayed by a shift register that is incorporated into the row-electrode driving circuit 4, in synchronism with the clock ck2 that is supplied from the timing generation circuit 1. Row-electrode signals (voltages) g1 through gb, which correspond to the delayed M-sequence signal m, are successively applied to the row electrodes G1 through Gb. Here, in FIG. 2, with respect to the column-electrode signal, sa=s14 is satisfied, and with respect to the row-electrode signal, gb=g13 is satisfied.

Thus, an electric potential pattern resulted from the M-sequence signal m appears in the column-electrode group 6 and the row-electrode group 7 that are formed on the coordinate-input-panel substrate 5, and the pattern moves as the time elapses.

Next, an explanation will be given in detail of the detection voltage vd that is induced in the electronic pen 8 and of respective outputs in the detection circuit 9.

Figure 14:
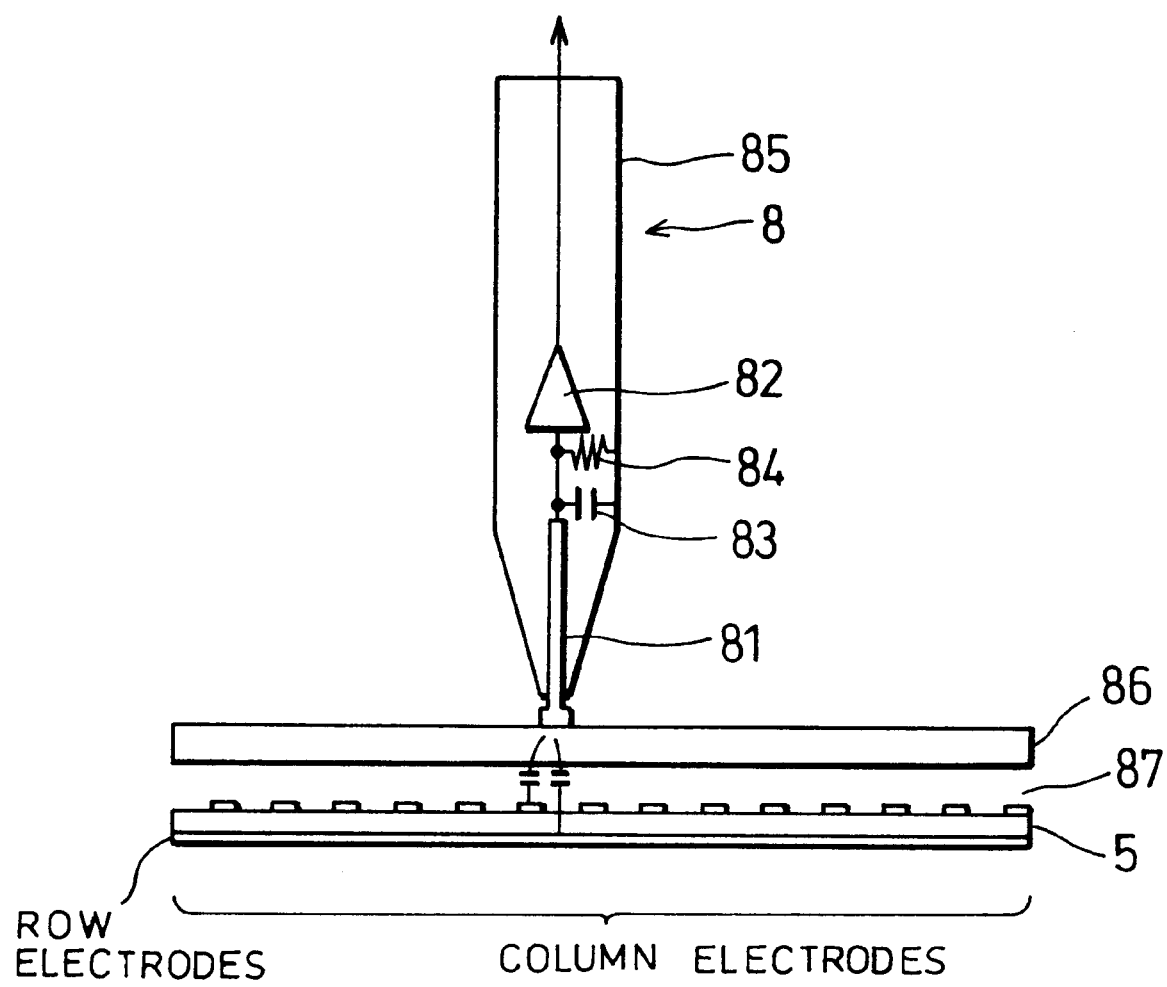
FIG. 14 is a side view that shows the structure of an electronic pen as well as the positional relationship among the electronic pen, a protective panel and a coordinate-input-panel substrate.

As illustrated in FIG. 14, the electronic pen 8 is constituted by the detection electrode 81, an amplifier 82, an input capacitance 83, an input resistor 84 and a pen case 85. The detection electrode 81, which is placed on the top of the electronic pen 8 and which is a conductor made of metal or other materials, is electrostatically coupled to the column-electrode group 6 and the row-electrode group 7 through insulating materials, such as a protective panel 86, an air layer 87, and the coordinate-input-panel substrate 5.

Figure 3:
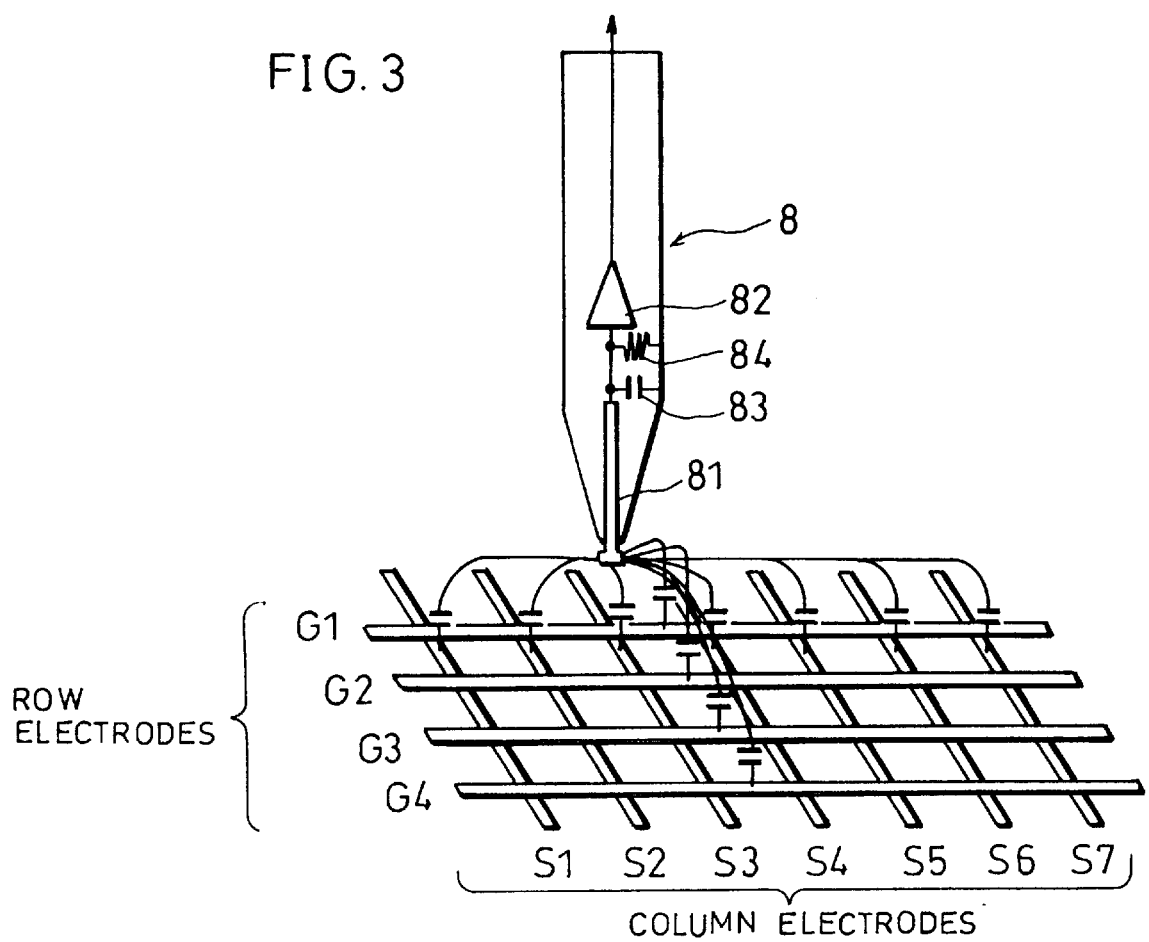
FIG. 3 is an explanatory drawing that shows a state wherein the detection electrode of an electronic pen is electrostatically coupled to row electrodes and column electrodes.

FIG. 3 shows a coupled state between the detection electrode 81 and the column-electrode group 6 as well as the row-electrode group 7. Although not completely shown in FIG. 3, the detection electrode 81 is electrostatically coupled to all the row electrodes G1 through Gb and all the column electrodes S1 through Sa at the same time. In this case, when the electronic pen 8 is located at a position as shown in FIG. 3, the detection electrode 81 is closest to the column electrode S3 and the row electrode G1, thereby having the greatest coupling capacitance with respect to these electrodes.

Figure 4:
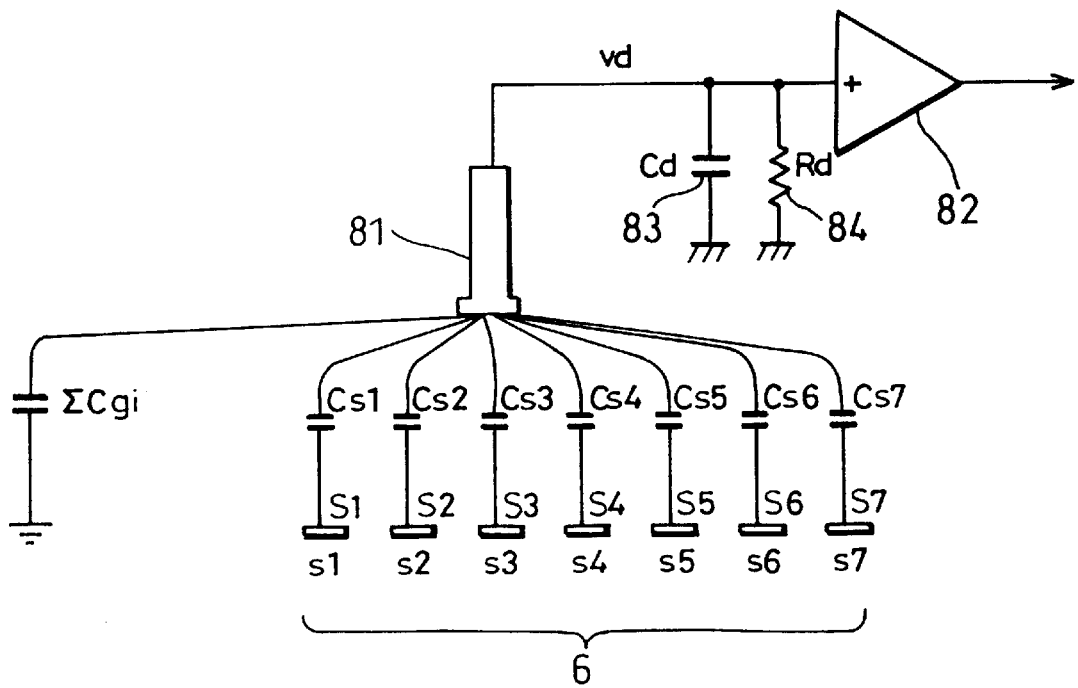
FIG. 4 is a circuit diagram that indicates an equivalent circuit corresponding to the electrostatically coupled state in FIG. 3 wherein a voltage is applied to the column electrodes.
Figure 5:
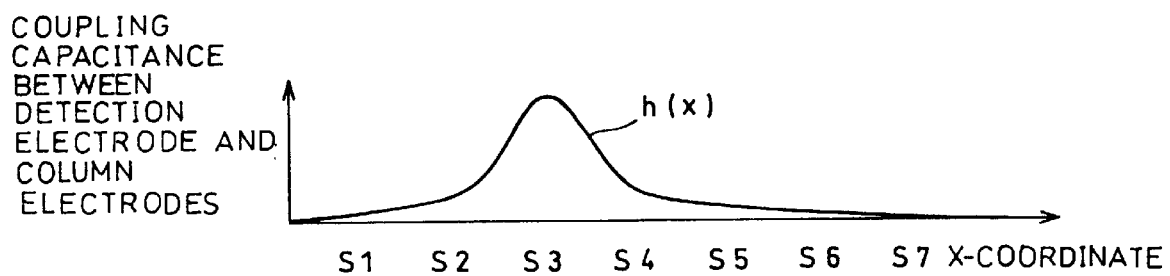
FIG. 5 is a graph that shows the coupling capacitance characteristic between the detection electrode and the column electrodes.

Since no electric-potential change appears in the row-electrode group 7 during the X-coordinate detection period Tx, its equivalent circuit is simplified. FIG. 4 shows an equivalent circuit which shows only the coupling between the detection electrode 81 and the column electrodes S1 through S7. As described above, since the detection electrode 81 is closest to the column electrode S3, the coupling capacitance Cs3 related to the column electrode S3 is the greatest, and the coupling capacitance becomes smaller as the distance between the detection electrode 81 and the row electrode in question becomes greater. Therefore, when the X-coordinate (column electrode) is plotted on the x-axis and the coupling capacitance between the detection electrode 81 and the column electrode is plotted on the y-axis, the graph shows a characteristic having one peak, as shown in FIG. 5.

The detection voltage vd which is induced in the detection electrode 81 is represented by the following equation in the case of frequencies which make the input resistor 84 become negligible in comparison with the input capacitance 83.

$$vd = (Cs1 \times s1 + Cs2 \times s2 + \ldots + Csb \times sb)/(\Sigma Csi + \Sigma Cgi + Cd) \quad (1)$$

where $\Sigma Csi$ is an addition of the coupling capacitances between the detection electrode 81 and the respective column electrodes, $\Sigma Cgi$ is an addition of the coupling capacitances between the detection electrode 81 and the respective row electrodes, and Cd is an input capacitance of the electronic pen 8.

Here, as illustrated in FIG. 2, during the X-coordinate detection period Tx, the M-sequence signal m, which is delayed in relation to the X-coordinate position, is applied to the column-electrode group 6. Supposing that the voltage (column-electrode signal) si is a voltage to be applied to a given column electrode Si and that the cycle of the clock ck2 is $\Delta t_2$, the voltage si is represented by the following equation:

$$si(t) = m(t - \Delta t_2 \times i) \quad (2),$$

where m(t) indicates the M-sequence signal m that is represented as a function of time, that is, the output waveform of the M-sequence generation circuit 2.

In the state as shown in FIG. 4, since the value of the coupling capacitance Cs3 is the greatest, the detection voltage vd, induced in the detection electrode 81, is most greatly affected by the voltage s3 that has been applied to the column electrode S3. Therefore, the detection voltage vd contains the most component of $m(t - \Delta t_2 \times 3)$ that corresponds to the electric-potential change of the voltage s3. In other words, in FIG. 4, the detection voltage vd is virtually equal to the voltage s3(t) that is shown by the equation (2), which forms the delayed M-sequence signal m.

Next, If, supposing that Cs(x)=h(x), the function of FIG. 5 is subjected to a continuous system modeling process, then the detection voltage vd(t) is represented as follows from equation (1):

$$vd(t)=\int h(x)m(t-x)dx \quad (3)$$

Here, since equation (3) is actually a discrete type, $\int$ is represented by $\Sigma$.

The following description will discuss the M-sequence.

Figure 10:
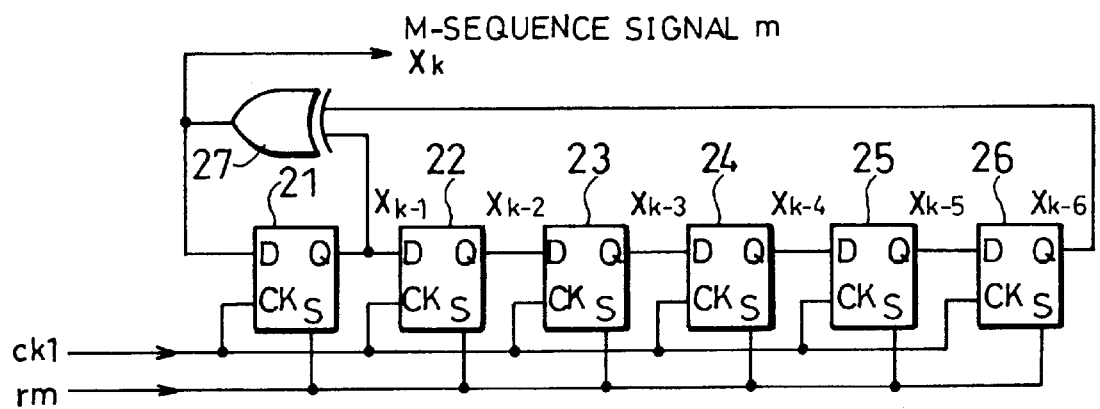
FIG. 10 is a circuit diagram showing the arrangement of a M-sequence generation circuit in the above-mentioned coordinate input device.

The M-sequence, which is a binary sequence signal, can be produced easily by using shift registers and an exclusive-OR, for example, as shown in FIG. 10. However, feed-back taps, which are taken up from the intermediate portions of the shift registers, are not necessarily taken up from any positions of the shift registers, and data sequence that is obtained only when few specific combinations are used is referred to as the M-sequence.

The M-sequence mainly has the following three characteristics:

1) The ratio of the numbers of "0" and "1" contained in one cycle is kept constant, and if shift registers of "k" number of steps are used, the number of "1" is represented by $2^{k-1}$, and the number of "0" is represented by $(2^{k-1})-1$. In other words, the number of "0" is smaller by one.

2) If, when "0s" or "1s" appear in succession in the sequence, the length of the continuation is represented by L, the frequency of occurrence of the continuation with the length L in one cycle in the sequence is twice as much as the frequency of occurrence of the continuation with the length L+1.

3) When a certain M-sequence that has been generated is added by data of the same M-sequence which only has a different initial value on registers, the same sequence, which is the original M-sequence that has been subjected to a time-wise shift, is produced.

Therefore, the product of the sequence itself and the sequence having the time-wise shift makes a M-sequence again because of the characteristic (3), thereby providing a correlation value of virtually "0" because of the character (1). Here, if the two waveforms have no time-wise shift, the correlation value is "1" since the waveforms are identical. In other words, when the correlation value is "1", the two waveforms are completely coincident with each other, and when it is "0", no similarity is found in the instantaneous values at a given time of the two waveforms.

In the M-sequence signal m of the present embodiment, supposing that n represents the step number of shift registers, ai is a coefficient and $X_{k-i}$ is an output from a feedback tap, the M-sequence signal $\{X_k\}$ (=m) is represented by the following equation (see FIG. 10):

$$X_k=(a1\times X_{k-1}) \wedge (a2\times X_{k-2}) \wedge \ldots \wedge (an\times X_{k-n}) \quad (4)$$

Here, ai and $X_{k-1}$ is 0 or 1, and $\wedge$ is an exclusive-OR.

Here, the output $d(\tau)$ of the correlator 11 is represented by:

$$d(\tau)=\int vd(t)m(t-\tau)dt \quad (5)$$

and, the following equation is given by equation (3):

$$d(\tau)=\int\int h(x)m(t-x)m(t-\tau)dtdx \quad (6)$$

Here, if m(t), which satisfies the following equation (7), is applied to equation (6), $d(\tau)$ in equation (6) is represented by the following equation (8):

$$\delta(\tau) = \int m(t)m(t-\tau)dt \quad (7)$$

$$d(\tau) = \int h(x)\delta(\tau - x)dx \quad (8)$$
$$= h(\tau)$$

Equation (7), which is an auto-correlation function, indicates how much degree of similarity its own waveform has with respect to the one obtained by shifting its own waveform on a time basis in the case when two frequency functions, which are to be compared, are identical. When the correlation between the detection voltage vd(t) and M-sequence signal m(t) is found by equation (8), $h(\tau)$ (=h(x)) itself of FIG. 5, which is a distribution function of the electrostatic coupling between the detection electrode 81 and the column-electrode group 6, can be restored. Since $d(\tau)=h(\tau)$ is given by equation (8), the position $\tau$, at which the output $ds(\tau)$ takes a maximal value that has been found through the LPF12, is detected by the coordinate detection circuit 13, and the position $\tau$ indicates a coordinate in the column-electrode direction that has been specified by the electronic pen 8, that is, an X coordinate.

In contrast, as illustrated in FIG. 2, during the Y-coordinate detection period Ty, no electric-potential change is applied to the column-electrode group 6. Therefore, the detection voltage vd, which is induced in the detection electrode 81 of the electronic pen 8, is given by the equivalent circuit of FIG. 9, and represented as follows, in the same manner as equation (1).

$$vd=(Cg1\times g1+Cg2\times g2+\ldots+Cgb\times gb)/(\Sigma Csi+\tau Cgi+Cd) \quad (9)$$

In the same manner as the case of the X-coordinate detection period Tx, the detection voltage vd is amplified by the amplifier 82, and inputted to the A/D converter 10 where it is digitalized. Then, the correlator 11 finds a correlation with the M-sequence signal m, noise is suppressed by the LPF12, and the coordinate detection circuit 13 detects the peak position $\tau$ having a maximal value, thereby providing a coordinate in the row-electrode direction that has been specified by the electronic pen 8, that is, an Y coordinate.

Here, in an actual operation, in the input section of the amplifier 82 in the electronic pen 8, random noise, such as thermal noise and shot noise, is generated, and gives serious adverse effects on the result of detection. Supposing that generated random noise is n(t), the output $d(\tau)$ of the correlator 11 is represented by the following equation, instead of equation (8):

$$d(\tau)=h(\tau)+\int n(t)m(t-\tau)dt \quad (10)$$

Figure 6:
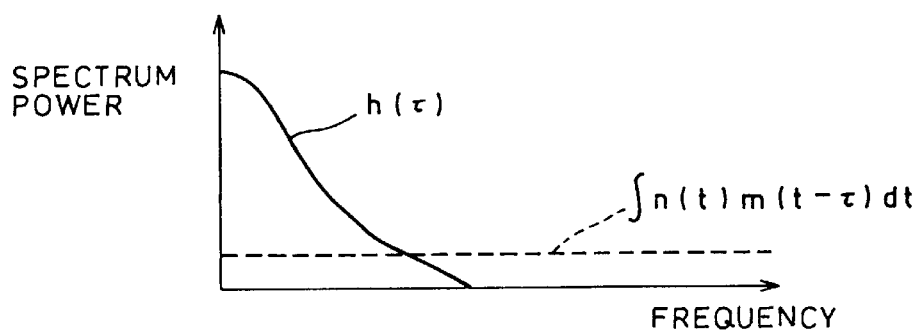
FIG. 6 is a graph that shows the frequency spectrum of the output of a correlator in the coordinate input device.
Figure 7:
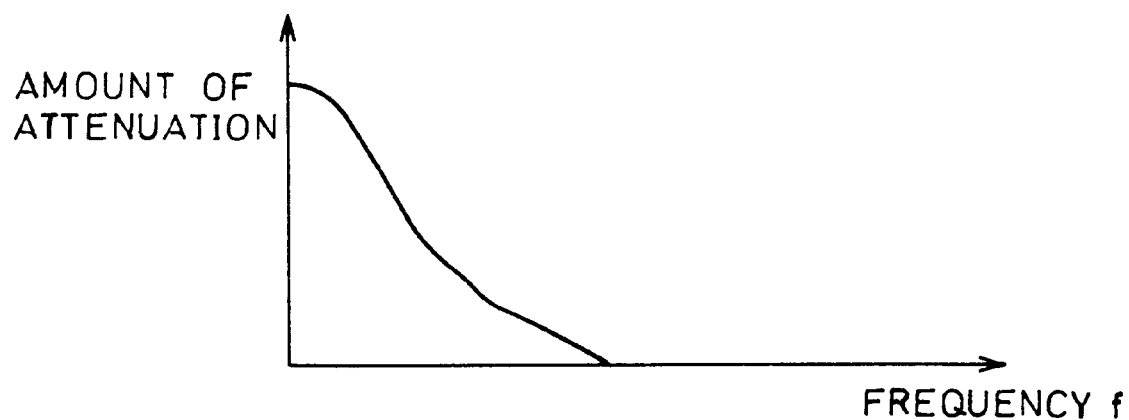
FIG. 7 is a graph that shows the signal transmitting characteristic of a LPF in the above-mentioned coordinate input device.
Figure 8:
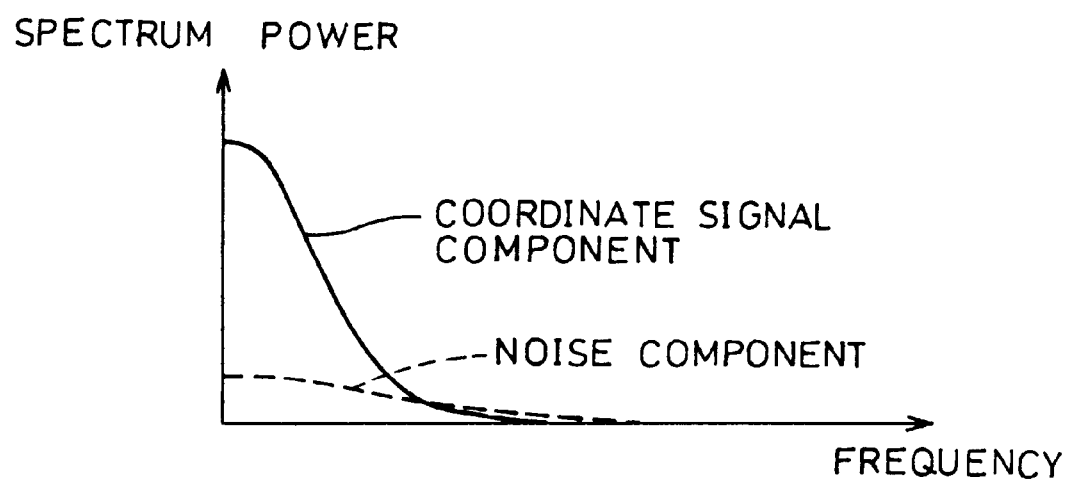
FIG. 8 is a graph that shows the frequency spectrum of the output of the LPF.
Figure 9:
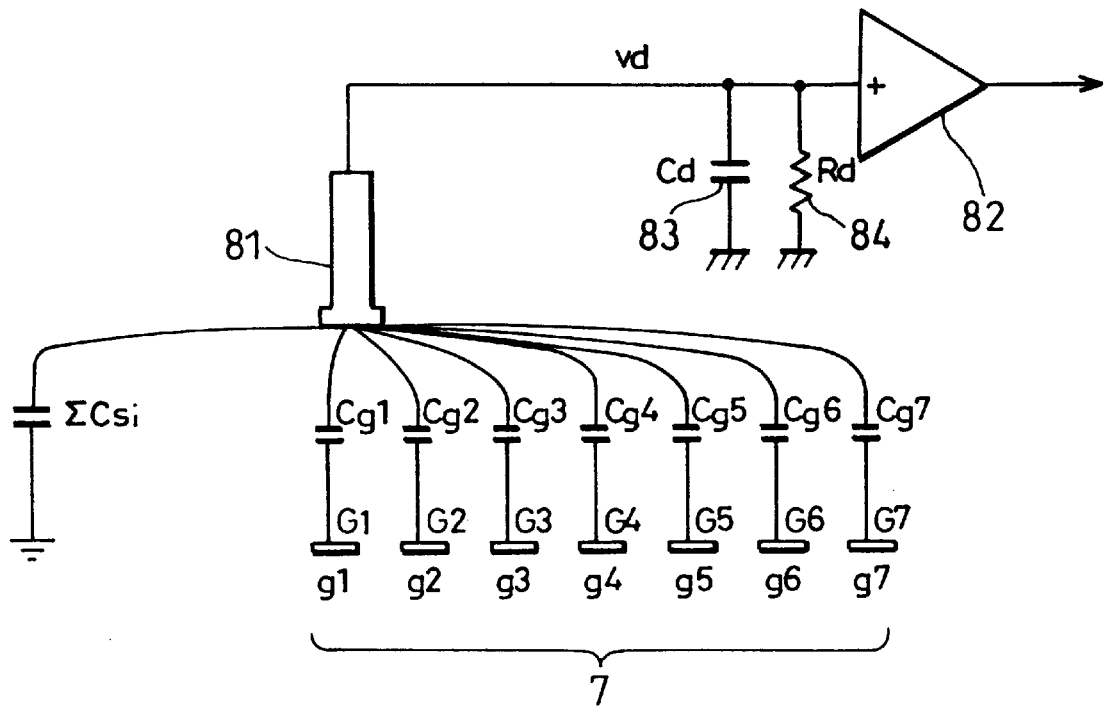
FIG. 9 is a circuit diagram that indicates an equivalent circuit corresponding to the electrostatically coupled state in FIG. 3 wherein a voltage is applied to the row electrodes.

The second term of equation (10) indicates random noise that has been convolution-converted by the M-sequence signal m, and the converted noise is random noise containing all frequency components. The first term of equation (10) is $h(\tau)$ which is a signal containing many low-band frequency components, as shown in FIG. 6. Therefore, in fact, the frequency spectrum of the output $d(\tau)$ of the correlator 11 is indicated by an addition of two components shown in FIG. 6. In this case, when the LPF 12, which suppresses high-band frequency components as shown in FIG. 7, is applied to the output d(τ), only high-band noise is suppressed to a great degree as shown in FIG. 8; thus, it is possible to obtain a detection signal with a high S/N ratio.

The following description will discuss respective circuits that constitute the coordinate input device in detail.

(1) M-sequence Generation Circuit

Figure 11:
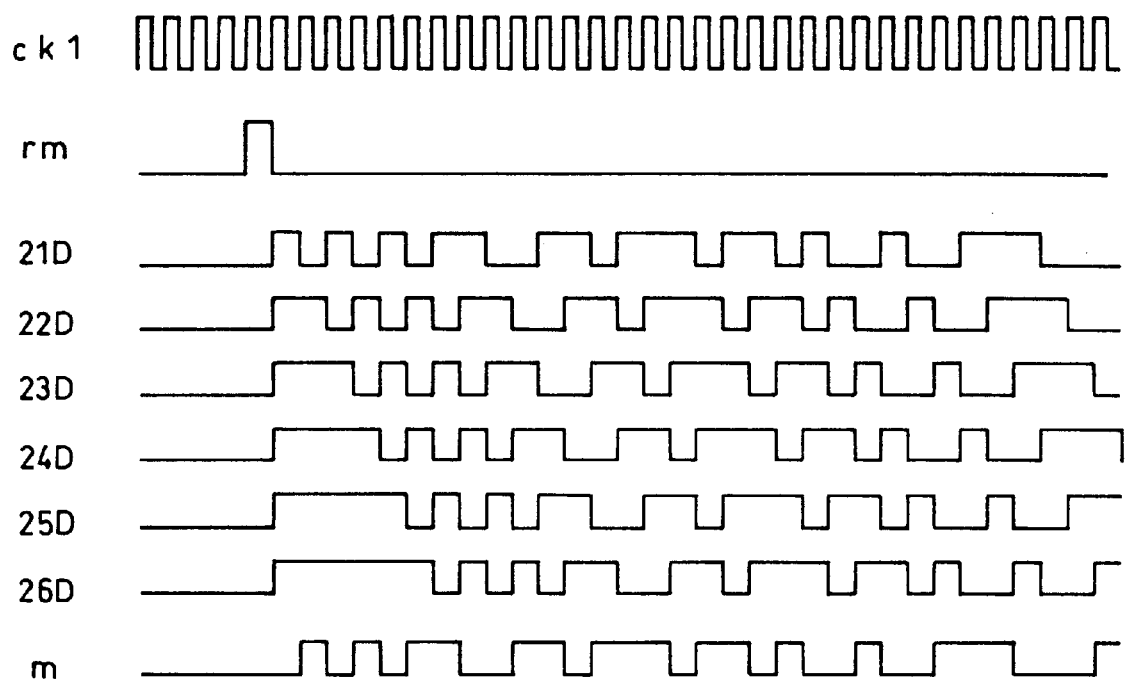
FIG. 11 is a timing chart that indicates the operation of the above-mentioned M-sequence generation circuit.

Referring to the structural example of FIG. 10 and the timing chart of FIG. 11, an explanation will be given of the operation of the M-sequence generation circuit 2. The arrangement of FIG. 10 generates an M sequence which has 6 degrees and a repeat cycle of $2^6-1=63$.

The M-sequence generation circuit 2 is constituted by flipflops 21 through 26 with synchronous-type set terminals, and an exclusive-OR 27. The terminals Q of the flipflops 21 and 26 are connected to the input terminal of the exclusive-OR 27. The output terminal of the exclusive-OR 27, which is connected to the terminal D of the flipflop 21, also functions as the output terminal of the M-sequence generation circuit 2, and outputs an M-sequence signal m. A clock ck1 is supplied from the timing generation circuit 1 to the terminal CK of each flipflop, and an M-sequence initializing pulse rm is supplied to the terminal S of each flipflop.

When the M-sequence initializing pulse rm changes from "0" to "1", the terminals D of the flipflops 21 through 26 are set at "1" upon receipt of a rise of the clock ck1. Until the next rise of the clock ck1, the output of the exclusive-OR 27 is "0" since the terminal D of the flipflop 21 and the terminal D of the flipflop 26 are "1"; this makes the M-sequence signal m "0". Upon the next rise of the clock ck1, the flipflop 21 is set at "0" which was the output of the exclusive-OR 27 immediately before, and the flipflops 22 through 26 are set at "1" since the data that was held by the flipflops 21 through 25 immediately before, shift to the right. Since the terminal D of the flipflop 21 is "0" while the terminal D of the flipflop 26 is "1", the output of the exclusive-OR 27 becomes "1", thereby making the M-sequence signal m "1" in this clock cycle. Here, 21D through 26D in FIG. 11 indicate signals that are to be inputted to the terminals D of the flipflops 21 through 26.

As described above, the M-sequence generation circuit 2 of FIG. 10 outputs to the column-electrode driving circuit 3 and the row-electrode driving circuit 4 a M-sequence signal m that is indicated by "010101100110111011010010011100 . . . ", as shown in FIG. 11. The above-mentioned pattern is repeated with the 63 clock cycle of the clock ck1.

Here, the explanation is given by exemplifying the case where the degree of the M-sequence is set at 6; however, another degree may be adapted by changing the arrangement of FIG. 10 based upon Table 1. Table 1 is a coefficient table that provides an index in the case when the M-sequence generation circuit 2 is arranged to generate an M-sequence with another degree.

TABLE 1

| Degree n | Coef. | | | | | | | | | | | | | | |
|---|---|---|---|---|---|---|---|---|---|---|---|---|---|---|---|
| | a15 | a14 | a13 | a12 | a11 | a10 | a9 | a8 | a7 | a6 | a5 | a4 | a3 | a2 | a1 |
| 3 | | | | | | | | | | | | | 1 | 0 | 1 |
| 4 | | | | | | | | | | | | 1 | 0 | 0 | 1 |
| 5 | | | | | | | | | | | 1 | 0 | 0 | 1 | 1 |
| 6 | | | | | | | | | | 1 | 0 | 0 | 0 | 0 | 1 |
| 7 | | | | | | | | | 1 | 0 | 0 | 0 | 0 | 0 | 1 |
| 8 | | | | | | | | 1 | 0 | 0 | 0 | 1 | 1 | 1 | 0 |
| 9 | | | | | | | 1 | 0 | 0 | 0 | 0 | 1 | 0 | 0 | 0 |
| 10 | | | | | | 1 | 0 | 0 | 0 | 0 | 0 | 0 | 1 | 0 | 0 |
| 11 | | | | | 1 | 0 | 0 | 0 | 0 | 0 | 0 | 0 | 0 | 1 | 0 |
| 12 | | | | 1 | 0 | 0 | 0 | 0 | 0 | 0 | 0 | 1 | 0 | 0 | 1 |
| 13 | | | 1 | 1 | 0 | 0 | 0 | 0 | 0 | 0 | 0 | 0 | 0 | 1 | 1 |
| 14 | | 1 | 0 | 1 | 0 | 0 | 0 | 0 | 0 | 0 | 0 | 0 | 0 | 1 | 1 |
| 15 | 1 | 0 | 0 | 0 | 0 | 0 | 0 | 0 | 0 | 0 | 0 | 0 | 0 | 0 | 1 |

(2) Column-electrode Driving Circuit and Row-electrode Driving Circuit

Figure 12:
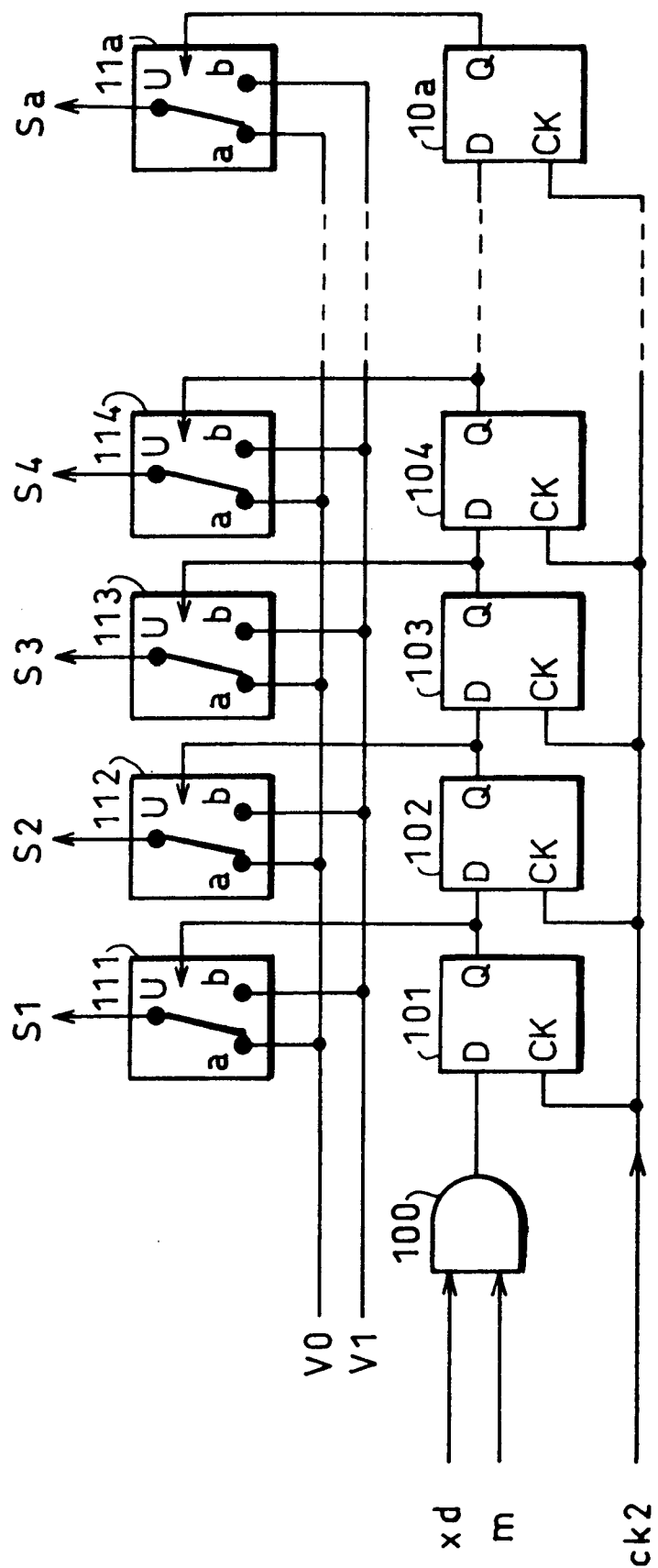
FIG. 12 is a circuit diagram showing the arrangement of a column-electrode driving circuit in the above-mentioned coordinate input device.

As illustrated in FIG. 12, the column-electrode driving circuit 3 is constituted by an AND gate 100, "a" number of D-flipflops 101 through 10a and "a" number of analog switches 111 through 11a.

The X detection period signal xd and M-sequence signal m, generated from the timing generation circuit 1, are inputted to the AND gate 100. When the X detection period signal xd becomes "1" during the X-coordinate detection period, the AND gate 100 allows the M-sequence signal m to pass, and supplies it to the input terminal D of the flipflop 101. The flipflops 101 through 10a, which constitute shift registers, allows the data that has been inputted thereto in synchronism with the clock ck2 to shift to the right. The output terminal Q of each flipflop is connected to the input terminal D of the succeeding flipflop, and is also connected to the control terminal U of each of the analog switches 111 through 11a.

Upon receipt of "0" in the control terminal U, each of the analog switches 111 through 11a makes a switchover to the a-side, while upon receipt of "1", it makes a switchover to the b-side. Therefore, when the output of each of the flipflops 101 through 10a is "0", voltage V0, which has been connected to the a-side, is applied to the column-electrode group 6, and when the output is "1", voltage V1, which has been connected to the b-side, is applied to the column-electrode group 6. Since the shifted M-sequence signal m is successively inputted to the shift registers, the electric-potential patterns of the voltages V0 and V1 are applied to the column-electrode group 6 in accordance with the M-sequence signal m.

Figure 13:
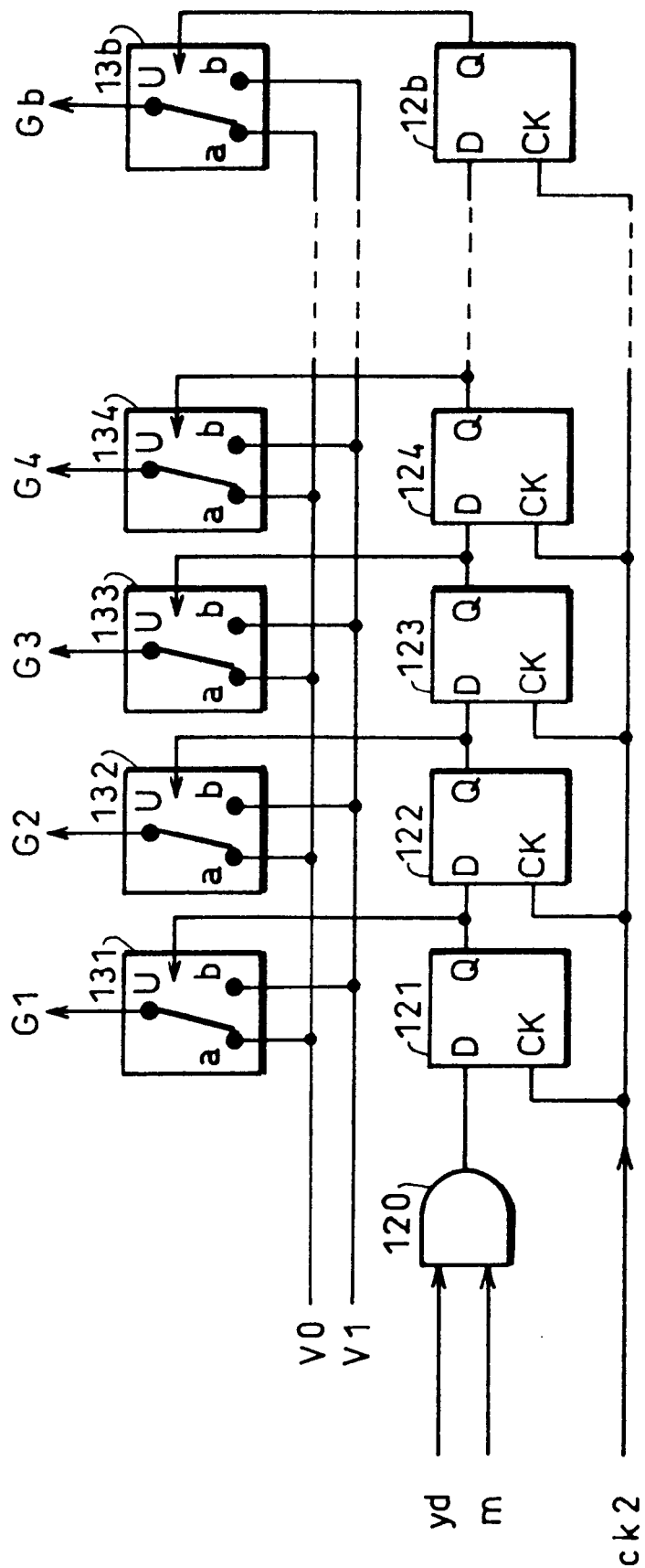
FIG. 13 is a circuit diagram showing the arrangement of a row-electrode driving circuit in the above-mentioned coordinate input device.

As illustrated in FIG. 13, the row-electrode driving circuit 4 is constituted by an AND gate 120, "b" number of D-flipflops 121 through 12b and "b" number of analog switches 131 through 13b. The arrangement of the row-electrode driving circuit 4 is virtually the same as the column-electrode driving circuit 3 except that the X detection period signal xd is replaced by the Y detection period signal yd and that the electrodes to be driven are not the column-electrode group 6 but the row-electrode group 7.

Figure 15:
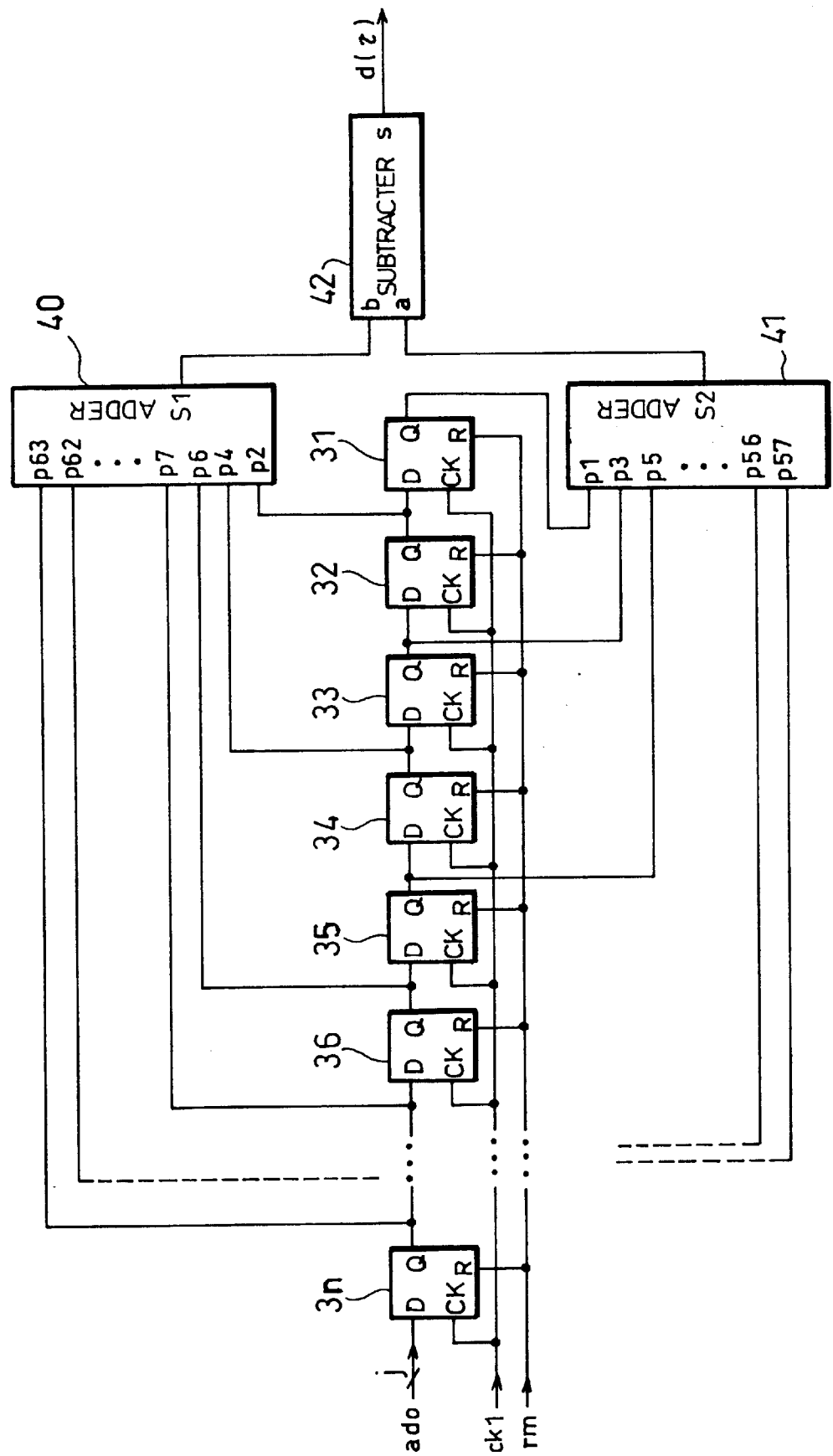
FIG. 15 is a circuit diagram showing the arrangement of a correlator in the above-mentioned coordinate input device.

The Y detection period signal yd is a signal that provides "1" during the Y-coordinate detection period, and allows the row-electrode driving circuit 4 to operate only this period.
(3) Correlator FIG. 15 shows a structural example of the correlator 11. The correlator 11 is constituted by "n" number of flipflops (delay devices) 31 through 3n, each having j bits, adders 40 and 41 for adding respective intermediate outputs, and a subtracter 42 that calculates the difference between the outputs of the two adders. Here, the number "n" is set not less than the repeat cycle of the M-sequence, and n is set at 63 in the present embodiment.

The digital data ado from the A/D converter 10 is inputted to the terminal D of the flipflop 3n, and the data with j bits is successively shifted to the succeeding flipflop by the clock ck1. Supposing that digital data that is applied to the input terminal (the terminal D of the flipflop 3n) of the correlator 11 is ado (t), the digital data that appears in the output terminal Qi of the i-numbered flipflop is represented by ado (t−i).

The M-sequence signal m with 6 degrees is represented as follows, as was shown in the aforementioned Section (1) of M-sequence generation circuit 2:

$$\{m1, m2 \ldots m63\}=\{0, 1, 0, \ldots 1\} \quad (11)$$

With respect to the output terminals Q of the flipflops, those terminals corresponding to "1" of equation (11) are connected to the input terminal of the adder 40, and those terminals corresponding to "0" are connected to the input terminal of the adder 41.

For example, the flipflop 31, which corresponds to m1=0, is connected to the input terminal of the adder 41, and the flipflop 32, which corresponds to m2=1, is connected to the input terminal of the adder 40. With these connections, the outputs AS1 and AS2 of the adders 40 and 41 are obtained from the results of the following calculations:

$$AS1 = \Sigma ado \{t-(2^k-i)\} \times mi \quad (12)$$

$$AS2 = \Sigma ado \{t-(2^k-i)\} \times /mi \quad (13)$$

where "/" represents a closure and /mi=1 holds when mi=0.

The outputs AS1 and AS2 of the adders 40 and 41, obtained from the above-mentioned equations, are supplied to the input terminal of the subtracter 42, and the subtracter 42 carries out calculations based upon the following equations, and provides the resulting output as d(τ).

$$d(\tau)=AS1-AS2=\Sigma ado \{t-(2^k-i)\} \times (2 \times mi-1) \quad (14)$$

Figure 16:
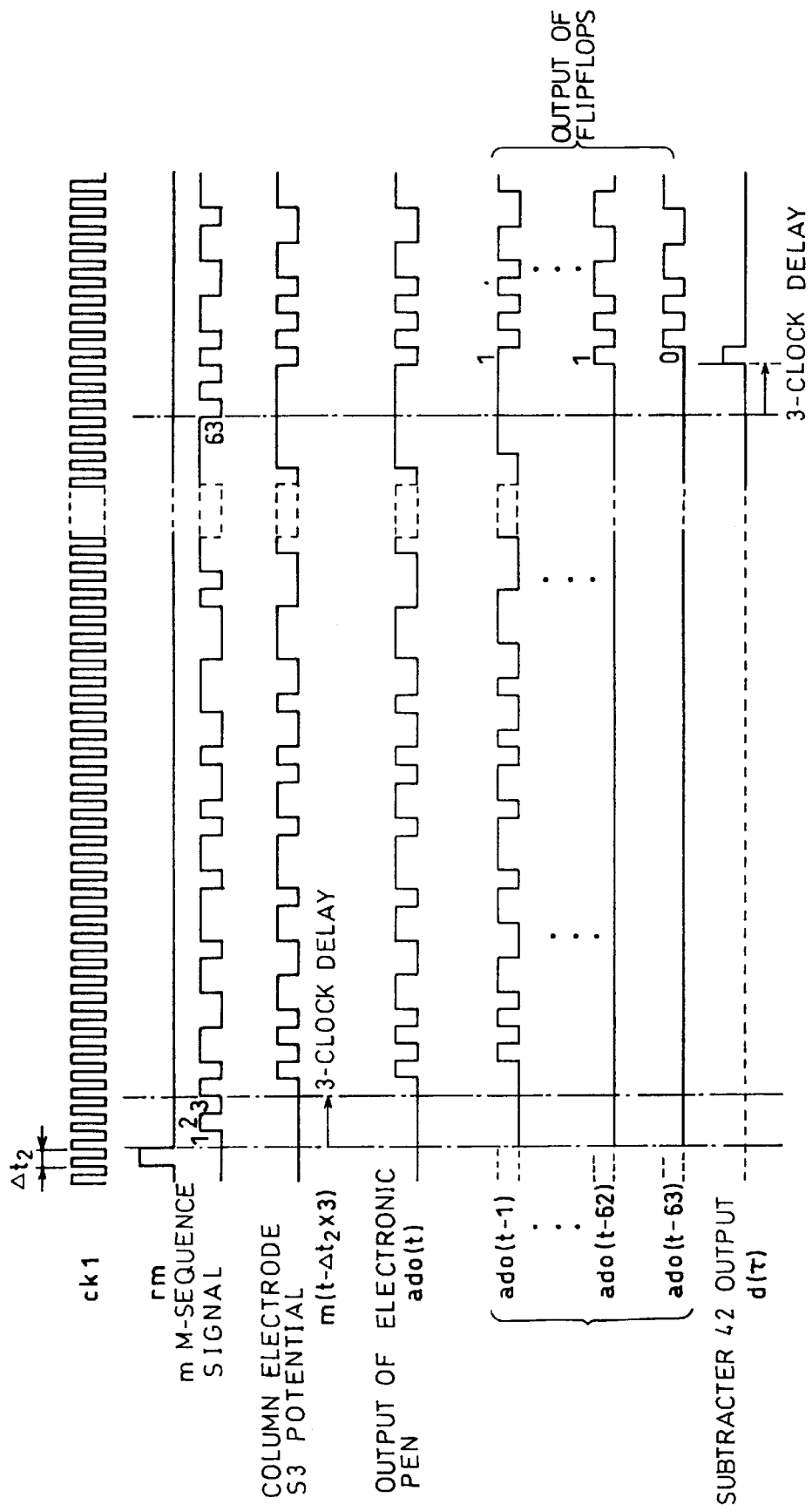
FIG. 16 is a timing chart that shows the operation of the correlator in the case of optimal detection waveforms.

FIG. 16 shows an optimal timing chart that is provided by the structural example of FIG. 15. The clock ck1 and the M-sequence initializing pulse rm, which are control signals outputted from the timing generation circuit 1, are supplied to the flipflops 31 through 3n. The M-sequence initializing pulse rm, which is a pulse providing "1" only for one cycle of the clock ck1, is inputted to the synchronous reset terminals R of the flipflops 31 through 3n, and upon receipt of a rise of the clock ck1, the contents of all the flipflops become "0", thereby making all the outputs ado (t−i) of the Q terminals of the flipflops become "0" (where i=1 to 63).

Supposing that the detection electrode 81 of the electronic pen 8 is closest to the column electrode S3, the digital data ado (t), released from the electronic pen 8 through the A/D converter 10, has a waveform that closely resembles to the electric-potential change of the column electrode S3, as shown on the fifth row in FIG. 16. The digital data ado (t), inputted to the flipflop 3n, shifts to the right in synchronism with the clock ck1.

In this case, delayed data, such as ado (t−1), . . . , ado (t−62) and ado (t−63), respectively appear in the outputs of the flipflops 31 through 3n, as shown from 6th row to 8th row in FIG. 16. Since the voltage, originally applied to the column electrode S3, is a signal that is delayed from the M-sequence signal m(t) by three clocks, the output of the subtracter 42 provides "1" only at a position that is delayed from the M-sequence initializing pulse rm by 67 (=1+63+3) clocks. This is due to the characteristic that the auto-correlation of the M-sequence becomes "1" only when the time difference is 0.

Figure 17:
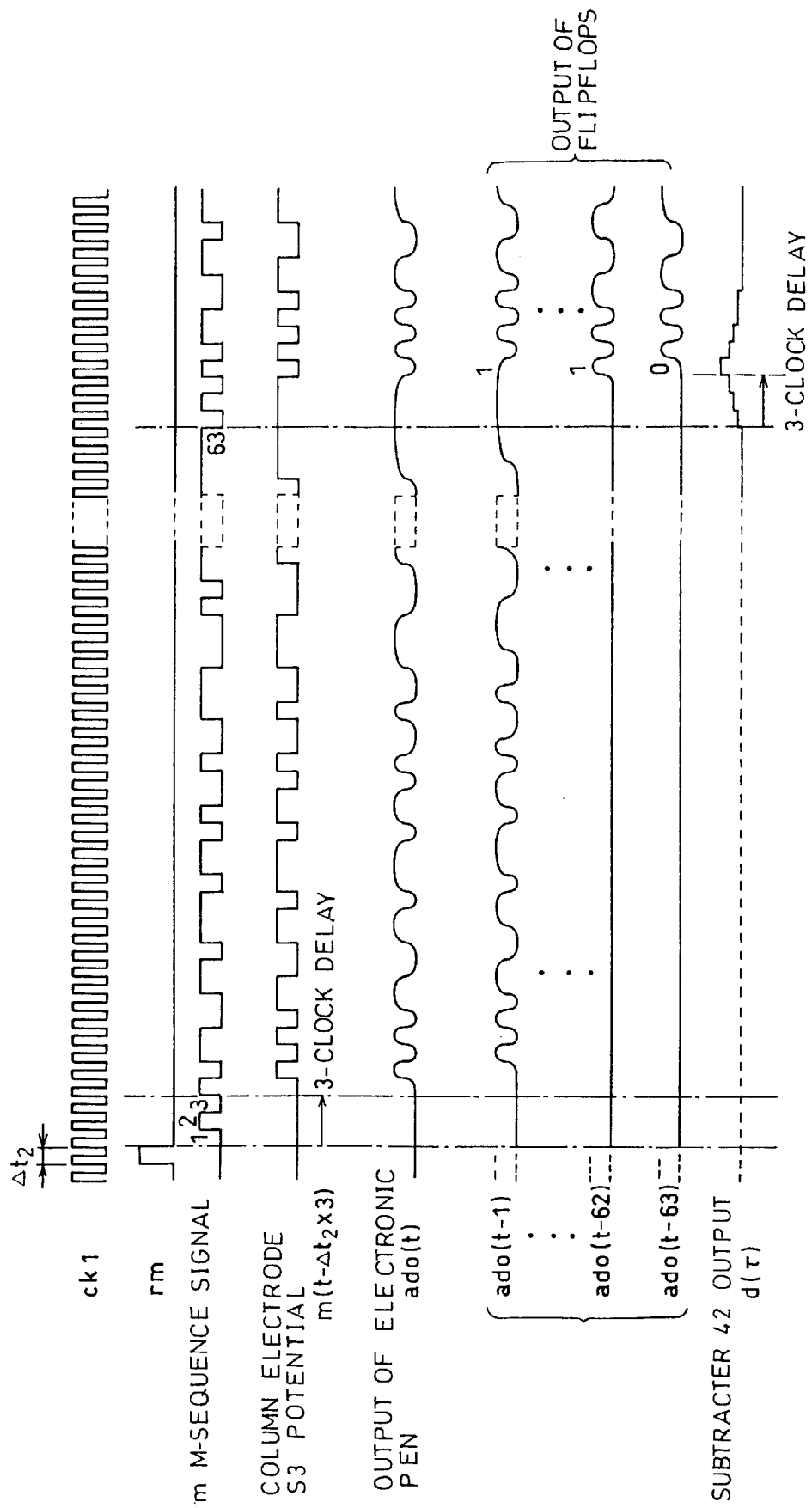
FIG. 17 is a timing chart that shows the operation of the correlator in the case of actual detection waveforms in which the effects of a spacial low-pass filter are included.

Since, in an actual operation, the coupling capacitance between the detection electrode 81 of the electronic pen 8 and each of the column electrodes is maintained as shown in FIG. 5, the output waveform of the digital data ado (t) of the electronic pen 8 of FIG. 16 is subject to the effects equivalent to a spacial low-pass filter, and has a smooth waveform as shown in FIG. 17. Therefore, the outputs ado (t−i) of the respective flipflops also have smooth waveforms. As a result, the output d(τ), obtained from the subtracter 42, also has a smooth waveform that has a peak at a position in which it is delayed from the M-sequence initializing pulse rm by 67 (=1+63+3) clocks. The output d(τ), obtained at this point, is given by equation (10).

(4) LPF

As represented by equation (10), the output d(τ) of the correlator 11 contains random noise that was generated by the amplifier 82 of the electronic pen 8 and that has been M-sequence-converted, and the components of the output d(τ) also form random noise containing all frequency components. If the random component of the output d(τ) is large, degradation in detection precision and erroneous detection tend to occur when the peak position τ is found by the coordinate detection circuit 13.

However, the coordinate-signal component, which is represented by h(τ) of the first term of equation (10), contains many low-band frequency components, as shown in FIG. 6, and the random noise components of the second term form a signal that extends from low-band to high-band frequency components. Therefore, it is possible to improve the S/N ratio by using a low-pass filter that mainly allows h(τ) to pass.

Figure 18:
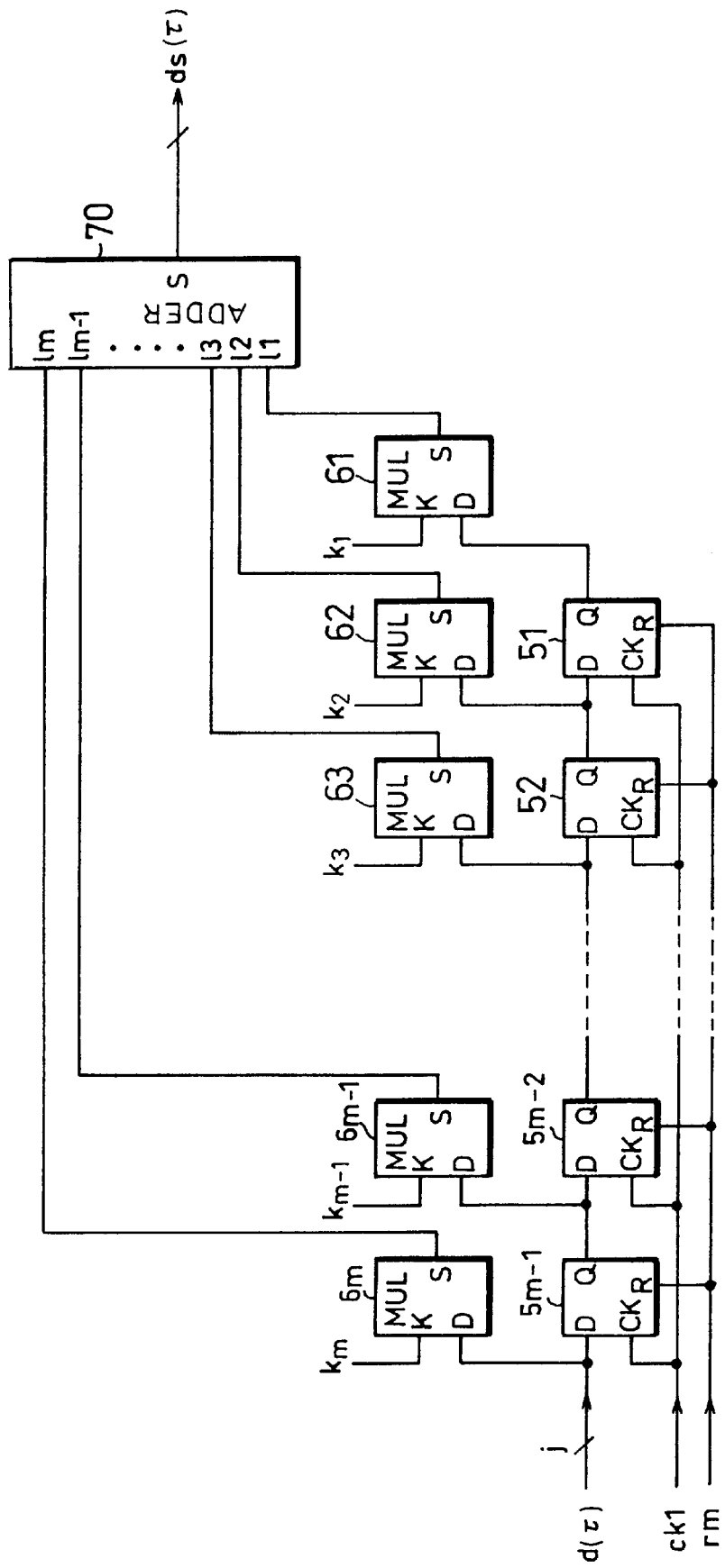
FIG. 18 is a circuit diagram that shows an arrangement wherein the LPF is used as an FIR-type low-pass filter.

FIG. 18 shows a structural example of the LPF 12. The LPF 12 is constituted by "m−1" number of flipflops 51 through 5m−1, each having j bits, "m" number of multipliers 61 through 6m and an adder 70.

The output terminal Q of each flipflop at the preceding step is connected to the input terminal D of the one at the following step, and the output d(τ) of the correlator 11 is supplied to the input terminal D of the flipflop 5m−1. Further, the clock ck1 and the M-sequence initializing pulse rm from the timing generation circuit 1 are supplied to each flipflop.

The output terminals Q of the flipflops 51 through 5m−1 are respectively connected to the input terminals D of the multipliers 61 through 6m−1. Further, the output d(τ) is inputted to the input terminal D of the multiplier 6m. Predetermined constants $k_1$ through $k_m$ are inputted to the respective input terminals K of the multipliers 61 through 6m. The multipliers 61 through 6m respectively output results of multiplication that are represented as follows:

$$S = D \times K \tag{15}$$

Since the output terminals S of the multipliers 61 through 6m are connected to the input terminal of the adder 70, the adder 70 calculates the addition of them and outputs the results as ds($\tau$). As a result, ds($\tau$) is represented as follows:

$$ds(\tau) = \Sigma d(\tau-i) \times k_{m-i} \tag{16}$$

where i=0 through m−1.

Here, when the following coefficient is given supposing that j-numbered coefficient is kj, the LPF 12 forms a matched filter, thereby providing a maximum S/N ratio. Here, j=1 through m holds.

$$kj = Csj/(Cs1 + Cs2 + \ldots + Csa) \tag{17}$$

Additionally, in order to make the size of circuit as small as possible, the circuit may be designed by ignoring where the coefficient kj is small.

Figure 19:
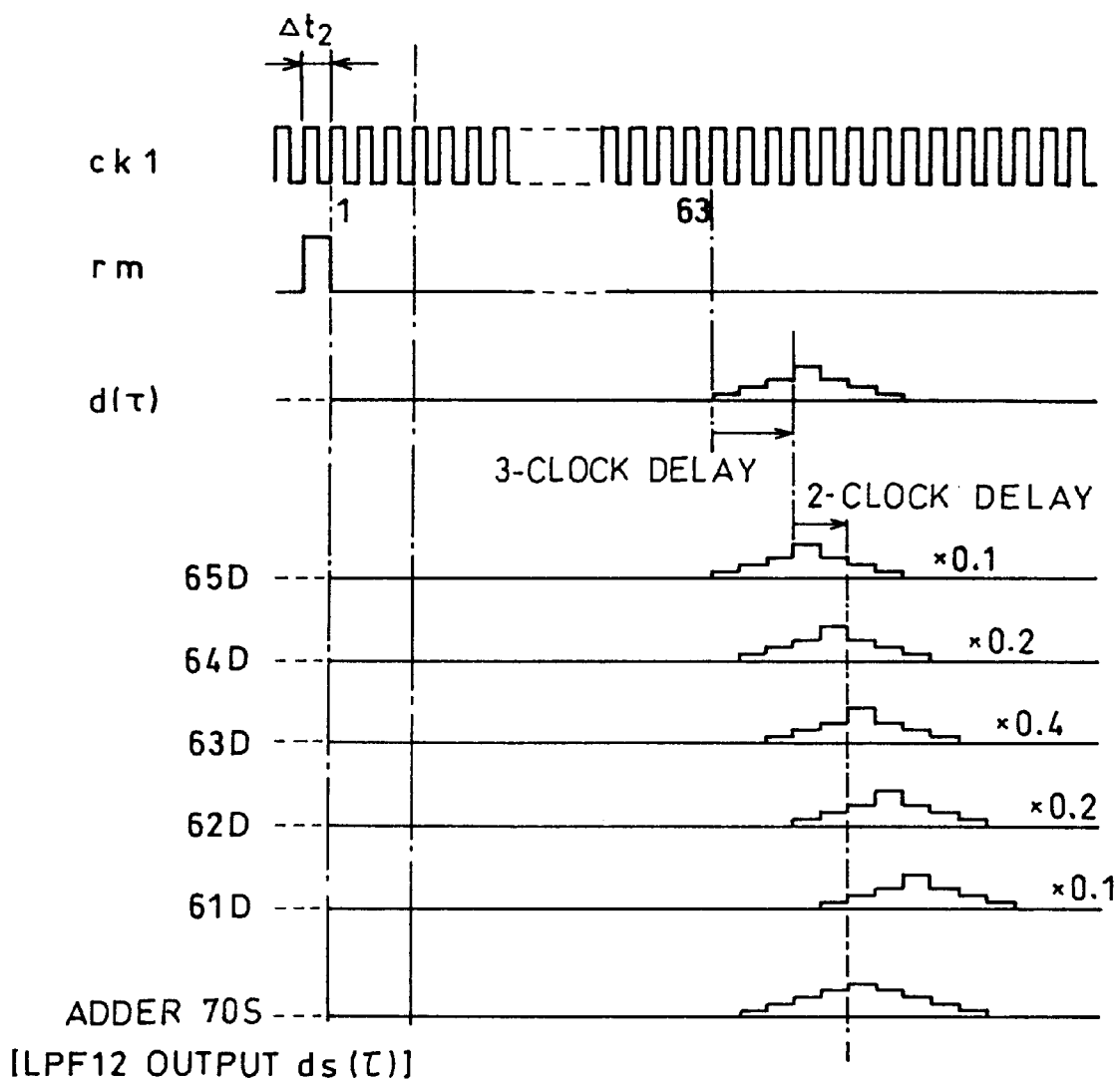
FIG. 19 is a timing chart that shows the operation of the FIR-type low-pass filter.

Table 2 shows examples of indices of multiplication coefficients in the case when the number m of the multipliers is 5. When the values of the respective coefficients kj are set at 0.1, 0.2, 0.4, 0.2 and 0.1, the operational timing chart as shown on the lowermost row of FIG. 19 is obtained. In other words, the output ds($\tau$) of the LPF 12 forms a waveform which has a peak at a position delayed from the M-sequence initializing pulse rm by 69 (=1+63+3+2) clocks. Here, 61D through 65D in FIG. 19 show signals that are to be inputted to the input terminals D of the multipliers 61 through 65.

TABLE 2

| Coefficient | $k_1$ | $k_2$ | $k_3$ | $k_4$ | $k_5$ |
|---|---|---|---|---|---|
| Coefficient Values | 0.1 | 0.2 | 0.4 | 0.2 | 0.1 |

As described above, by adjusting the LPF 12 to a matched filter, it becomes possible to maximize the S/N ratio of the output d($\tau$) from the correlator 11. Moreover, the application of an optimal matched filter allows the output ds($\tau$) to be a function that has a symmetric shape with respect to $\tau$ even when the electronic pen 8 specifies an end portion of the coordinate-input-panel substrate 5. Therefore, upon determining coordinates, easy pulse detection is provided, and it becomes possible to carry out a coordinate-detecting operation that is stable to noise and variations in the detection output.

Additionally, in equation (17), the example is given as a matched filter; however, the coefficient kj may be given as a simpler coefficient, such as "1" or "0", in order to reduce the size of circuit, as long as the circuit functions as a low-pass filter as a whole. Moreover, the LPF 12 may be constructed not only as the aforementioned FIR (Finite Impulse Response) type, but also as the IIR (Infinite Impulse Response) type. The application of this type provides a very simple circuit construction as compared with the filter of the FIR type such as a matched filter; therefore, it becomes possible to further reduce the size of circuit, and also to further improve the S/N ratio. This is more advantageous in providing portable-type coordinate input devices.

(5) Coordinate Detection Circuit

Figure 20:
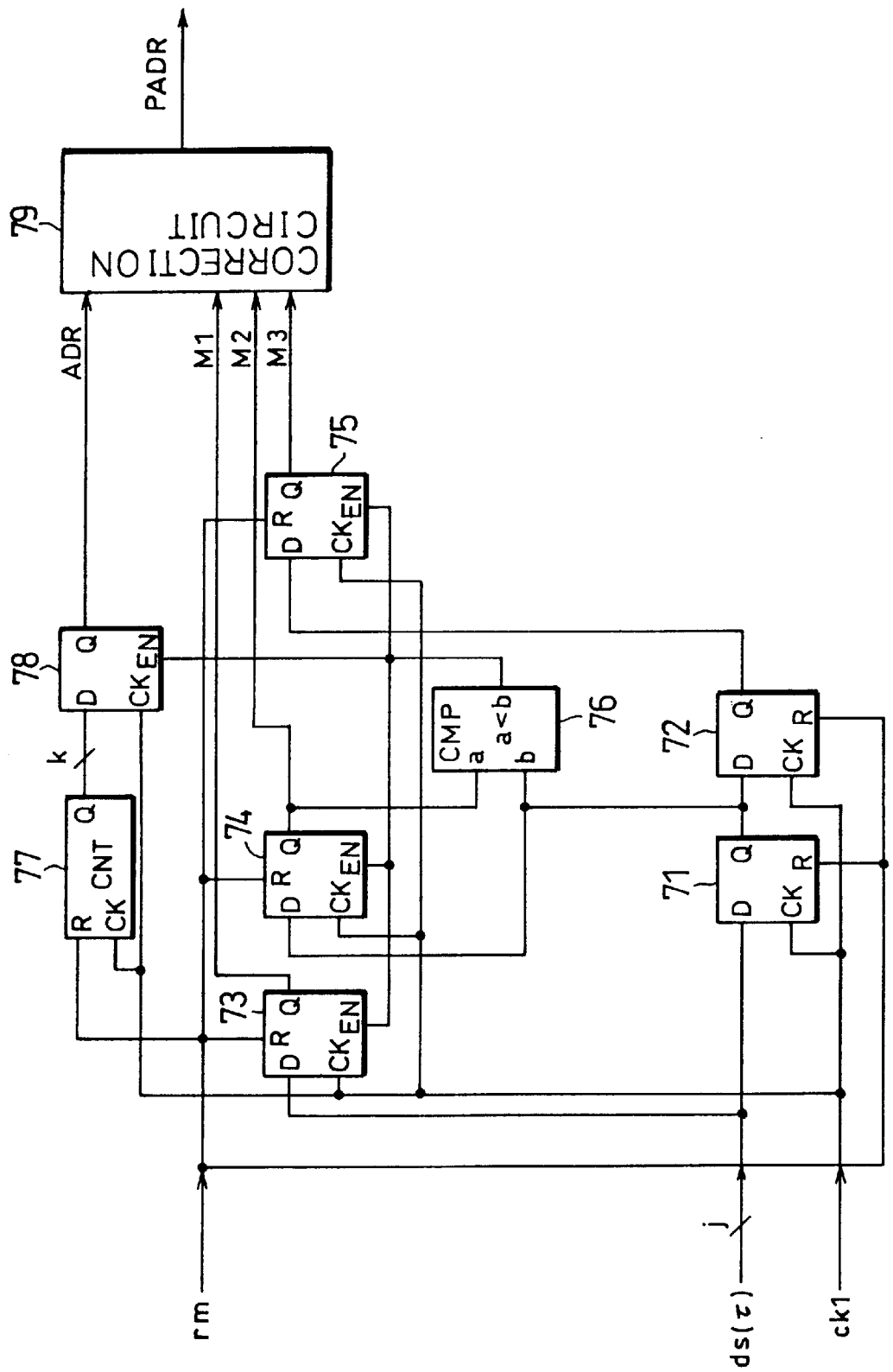
FIG. 20 is a circuit diagram that shows the arrangement of a coordinate detection circuit in the coordinate input device.
Figure 21:
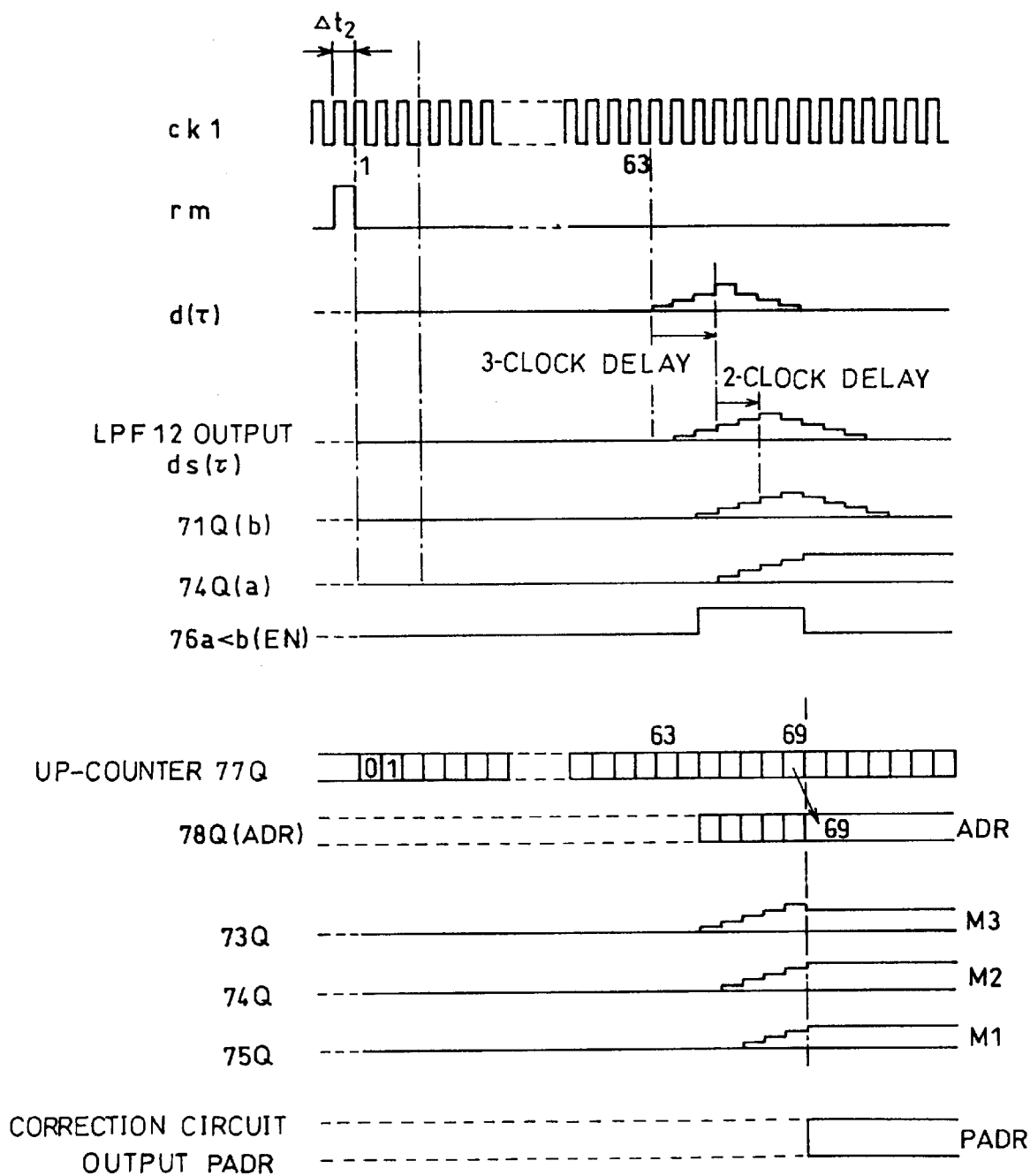
FIG. 21 is a timing chart that shows the operation of the above-mentioned coordinate detection circuit.

Referring to the structural example of FIG. 20 and the timing chart of FIG. 21, the operation of the coordinate detection circuit 13 is explained in more detail. The coordinate detection circuit 13 is constituted by flipflops 71 and 72, each having j bits and provided with a synchronous reset terminal R, flipflops 73, 74 and 75, each having n bits and provided with a reset terminal R and an enable terminal EN, a comparator 76, an up-counter 77 having k-bits and provided with a synchronous reset terminal R, a flipflop 78 having k-bits and provided with an enable terminal EN and a correction circuit (correction device) 79.

When the M-sequence initializing pulse rm is first supplied thereto from the timing generation circuit 1, the flipflops 71 through 75 and the up-counter 77 are reset so that the outputs from all the terminals Q are set at "0". Since the output terminal Q of the flipflop 74 is connected to the input terminal a of the comparator 76 and the output terminal Q of the flipflop 71 is connected to the input terminal b of the comparator 76, the output terminal a<b of the comparator 76 outputs "0". Therefore, the enable terminals EN of the flipflops 73, 74, 75 and 78 are set at "0" so that they are set to a disable state.

Since the output ds($\tau$) of the LPF 12 is supplied to the input terminals D of the flipflops 71 and 73, data is shifted to the flipflops 71 and 72 in synchronism with the clock ck1. Data, which corresponds to the output ds($\tau$) that has been delayed by one clock cycle, is outputted through the output terminal Q of the flipflop 71, and inputted to the input terminal b of the comparator 76. Since the flipflop 74 outputs "0" and it is inputted to the input terminal a of the comparator 76, the output of the comparator 76 is maintained at "0" until the flipflop 71 becomes greater than "0".

As shown on the fifth row of FIG. 21, when the output 71 Q(b) of the flipflop 71 becomes greater than "0", the output 76a<b (EN) of the comparator 76 becomes "1", thereby allowing the flipflops 73 through 75 to become enable upon receipt of the next rise of the clock ck1. Consequently, the flipflop 73 latches data of ds($\tau$), the flipflop 74 latches data of ds($\tau-\Delta t_2$), and the flipflop 75 latches data of ds($\tau-2\times\Delta t_2$), respectively.

After having been reset by the M-sequence initializing pulse rm, the up-counter 77, on the other hand, counts up based on the clock ck1, and when the output 76a<b (EN) of the comparator 76 becomes "1", it allows the enable terminal EN of the flipflop 78 connected to the up-counter 77 as the succeeding step to also become "1", that is, to become enable. Thus, the data of the up-counter 77 is latched, and outputted to the correction circuit 79 as data ADR.

When the data, ds($\tau-\Delta t_2$), of the flipflop 71 becomes greater than the data stored in the flipflop 74, the output of the comparator 76 becomes "1" as described above, thereby updating the data of the flipflops 73 through 75 and the count data of the flipflop 78. If the data, ds($\tau-\Delta t_2$), of the flipflop 71 becomes smaller than the data stored in the flipflop 74, the comparator 76 again becomes "0", thereby making the flipflops 73 through 75 and 78 disable so that they hold the previous data without updating data.

In other words, after completion of these operations, a maximum value M2=ds($\tau_{max}$) of ds($\tau$) is held in the flipflop 74, data M3=ds($\tau_{max}-\Delta t_2$) that precedes immediately before it is held in the flipflop 73, and data M1=ds($\tau_{max}+\Delta t_2$) that succeeds immediately after it is held in the flipflop 75, and then supplied to the correction circuit 79. Moreover, simultaneously as the timing at which the maximum value M2 has been taken up, the value of the up-counter 77 is held by the flipflop 78 as a coordinate value, and supplied to the correction circuit 79 as the data ADR.

In the correction circuit 79, the inputted data ADR is corrected by substituting the data, M1, M2 and M3, to the following equation, and the resulting output PADR, which has a higher precision of k+α bits, is provided. That is, the corrected PADR is represented as follows:

$$PADR=ADR+(M3-M1)/(2\times M2-M1-M3)/2 \qquad (18)$$

Figure 22:
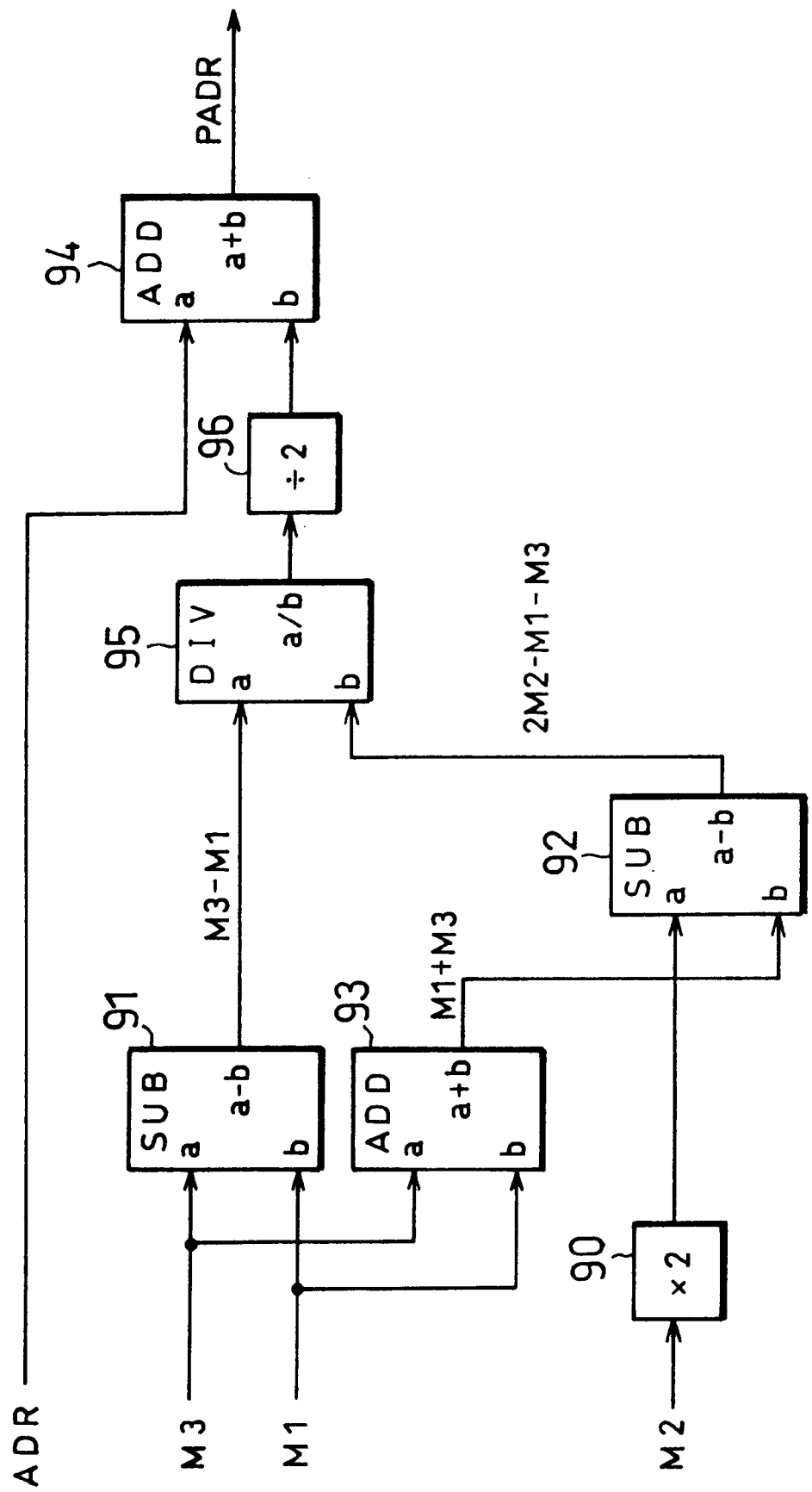
FIG. 22 is a circuit diagram that shows the arrangement of a correction circuit in the above-mentioned coordinate detection circuit.

As illustrated in FIG. 22, the correction circuit 79 is constituted by a doubler 90, subtracters 91 and 92, adders 93 and 94, a divider 95, and a 1/2 multiplier 96. Here, the doubler 90 and 1/2 multiplier 96 may be constituted as a bit shift using connecting lines.

The construction of the correction circuit 79 as described above makes it possible to accurately detect a peak position in accordance with equation (18). In particular, the adoption of the LPF 12 as a matched filter allows the output $ds(\tau)$ of the LPF 12 to become a function that is symmetric with respect to $\tau$, thereby further improving the detection precision by using the quadratic-curve interpolation of equation (18).

(6) Output Circuit

Figure 23:
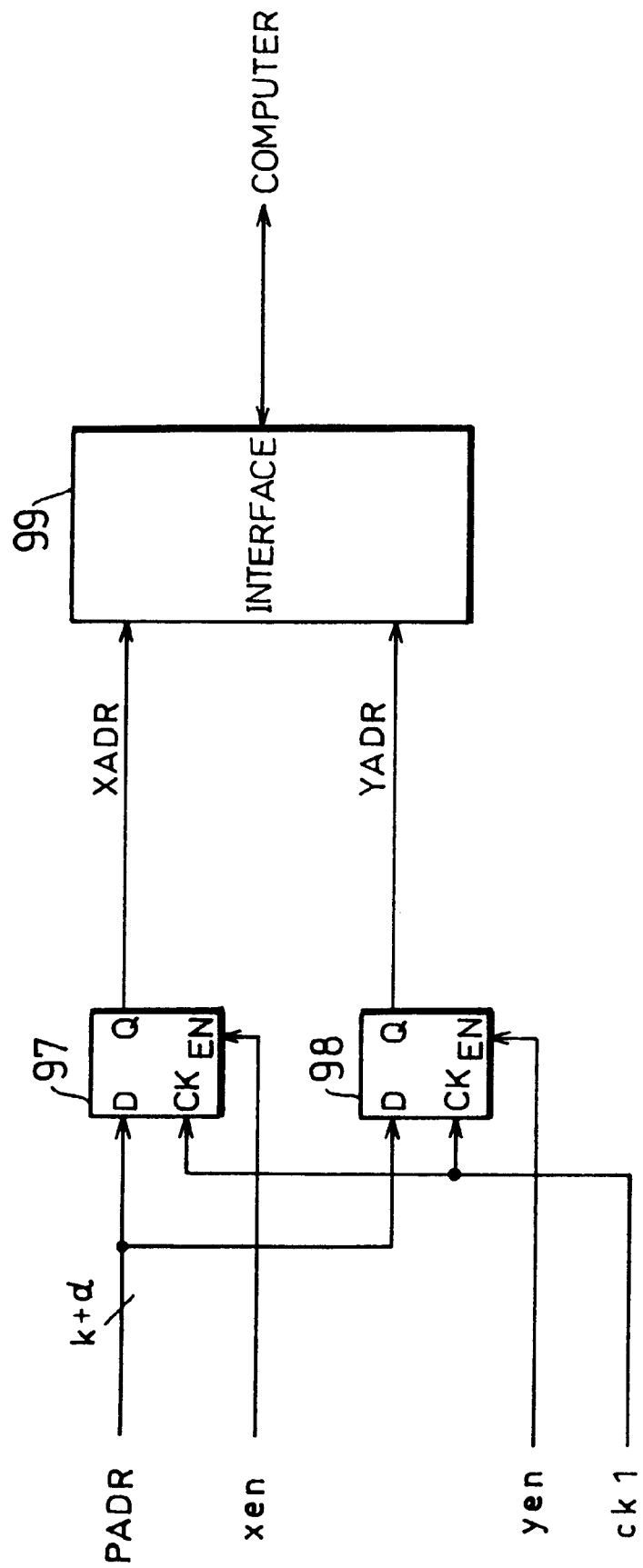
FIG. 23 is a circuit diagram that shows the arrangement of an output circuit in the coordinate input device.
Figure 24:
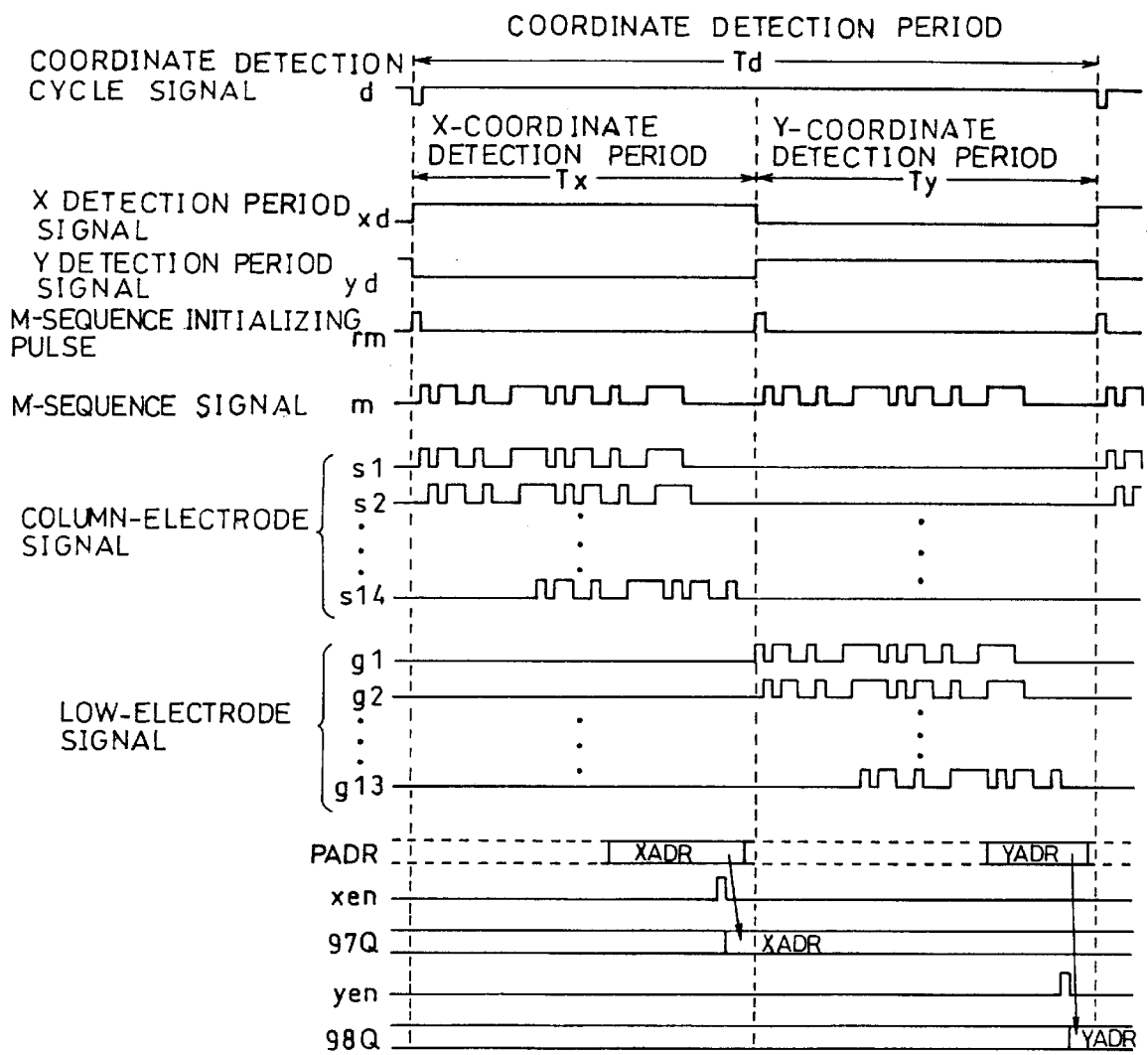
FIG. 24 is a timing chart that shows the operation of the output circuit.

Next, referring to the structural example of FIG. 23 and the timing chart of FIG. 24, an explanation will be given of the output circuit 14. The output circuit 14 is constituted by flipflops 97 and 98, each having k+α bits and provided with an enable terminal EN, and an interface 99 in relation to the computer 15.

A control signal xen and a control signal yen are respectively inputted to the enable terminals EN of the flipflops 97 and 98. The control signal xen, supplied from the timing generation circuit 1, is a pulse that has the same cycle as the coordinate detection period Td and that is generated at the last time of the X-coordinate detection period Tx. The control signal yen, supplied from the timing generation circuit 1, is a pulse that has the same cycle as the coordinate detection period Td and that is generated at the last time of the Y-coordinate detection period Ty.

During the X-coordinate detection period Tx, the column electrodes are driven by the M-sequence signal m, and after the correlator 11 has detected a signal that was electrostatically induced in the electronic pen 8, the coordinate detection circuit 13 calculates the peak position of the signal through the LPF 12. After completion of a sequence of these operations, the output PADR of the coordinate detection circuit 13 holds a detected X coordinate positively. The output PADR is inputted to the input terminal D of the flipflop 97, and the control signal xen becomes "1" after the output PADR has been determined. Thus, the resulting value is stored in the flipflop 97, and outputted to the interface 99 as an X-coordinate value XADR.

During the Y-coordinate detection period Ty, the row electrodes are driven by the M-sequence signal m, and after the correlator 11 has detected a signal that was electrostatically induced in the electronic pen 8, the coordinate detection circuit 13 calculates the peak position of the signal through the LPF 12. After completion of a sequence of these operations, the output PADR of the coordinate detection circuit 13 holds a detected Y coordinate positively. The output PADR is inputted to the input terminal D of the flipflop 98, and the control signal yen becomes "1" after the output PADR has been determined. Thus, the resulting value is stored in the flipflop 98, and outputted to the interface 99 as an Y-coordinate value YADR.

With respect to the interface 99 in relation to the computer 15, methods based on various standards, such as RS (Recommended Standard) 232C and GPIB (General-Purpose Interface Bus), may be adopted, or a method in which a direct connection is made to the input-output bus of the computer 15 may be adopted.

As described above, in the coordinate input device of the present embodiment, a voltage is induced in the electronic pen 8 by successively applying the M-sequence signal m, generated from the M-sequence generation circuit 2, to the row electrodes and the column electrodes, and the correlation between the detected voltage and the M-sequence signal m is found. In other words, the coordinate detection is carried out by carrying out correlation operation utilizing a signal having a certain cycle as the scanning signal, that is, the M-sequence signal m whose electric potential is constantly changing.

Therefore, the signal energy, which has been dispersed on a time basis, can be compressed and concentrated into one point by finding the correlation. In other words, the energy density of the signal becomes higher. In this case, with respect to necessary detection signals, the signal energy, which has been dispersed on a time basis, can be concentrated, while with respect to other interfering signals such as random noise, the signal energy is not concentrated. This effect makes it possible to improve the S/N ratio of the detection signal to a great degree.

As a result, the row electrodes and the column electrodes can be driven by using a comparatively low power voltage. Consequently, in the recent development of portable-type coordinate input devices, it is possible to meet demands for low-voltage devices. Further, it becomes possible to provide coordinate input devices which can carry out coordinate detection that is suitable for practical use, even in the case when they are used for liquid crystal panels, plasma displays and EL panels that have thin row electrodes and column electrodes so as to achieve an optically high aperture ratio. Moreover, with an arrangement wherein the electrode widths of the row electrodes and the column electrodes are increased so as to be dedicated to the coordinate detection, it becomes possible to detect not only plane coordinates, but also coordinates in the height-wise direction, with high precision by evaluating the magnitude of the detection voltage.

Furthermore, the correlator 11 of the above-mentioned coordinate input device is constituted by flipflops which successively delay the detection signal that has been inputted to the correlator 11 and converted into a digital signal, and outputs the resulting signal, the adder 40 which adds the outputs from the flipflops that correspond to high-level coefficients of the M-sequence signal m, the adder 41 which adds the outputs from the flipflops that correspond to low-level coefficients of the M-sequence signal m, and the subtracter 42 which calculates the difference between the outputs of the two adders 40 and 41. Thus, the correlator 11 can be easily designed by using flipflops and adding and subtracting devices; therefore, it is possible to provide a portable-type coordinate input device which operates at high speeds with small power consumption.

Further, the above-mentioned coordinate input device is provided with the LPF 12 that is placed between the correlator 11 and the coordinate detection circuit 13 and that suppresses high-frequency components of the output from the correlator 11.

Here, the detection signal, released from the correlator 11, contain a lot of low-frequency components, while random noise components are distributed over high-frequency components. This characteristic is explained as follows: To make a detection with the electronic pen 8 by electrically coupling the M-sequence signal m that is applied to the column electrodes 6 or the row electrodes 7 and that is delayed little by little is equivalent to a spacial low-pass filter. Here, the correlation detection is carried out by using the M-sequence signal m, the energy of the detection signal is concentrated and allowed to have a lot of low-frequency components, while random noise components are not concentrated and held in the distributed state as high-frequency components.

Therefore, among signals detected by the correlator 11, only low-frequency components, which are coordinate-detection signal components, are extracted by the LPF 12; thus, it is possible to obtain a detection signal that has a higher S/N ratio, and also to carry out coordinate detection with high precision.

Moreover, the LPF 12 is a matched filter with weight based on the coupling capacitance resulted from the electronic pen 8. This makes it possible to maximize the S/N ratio of the output from the correlator 11. Furthermore, even when the electronic pen 8 specifies an end portion of the coordinate input device, the output from the correlator 11 is allowed to be a function that is symmetric with respect to right and left shapes. Thus, upon determining coordinates, the output is easily detected as a pulse, and it is possible to carry out the coordinate detection stably in spite of noise and variations in the detection output.

Further, the above-mentioned coordinate detection circuit 13 is provided with the correction circuit 79 that carries out a quadratic-curve interpolation on the output signal from the matched filter. Therefore, since coordinate determination is made by carrying out the quadratic-curve interpolation on the signal from the matched filter, it is possible to provide a coordinate input device which can reduce variations in coordinate detection in spite of noise and variations in the detection output.

EMBODIMENT 2

Referring to FIGS. 25 through 31, the following description will discuss Embodiment 2 of the present invention. Here, for convenience of explanation, those members that are the same as those shown in Figures in Embodiment 1 are indicated by the same reference numerals and the description thereof is omitted.

The coordinate input device of the present embodiment has an arrangement wherein coordinates, which have been specified by a finger or a cordless pen that has a metal case on its tip, are detected instead of the detection using an electronic pen.

Figure 25:
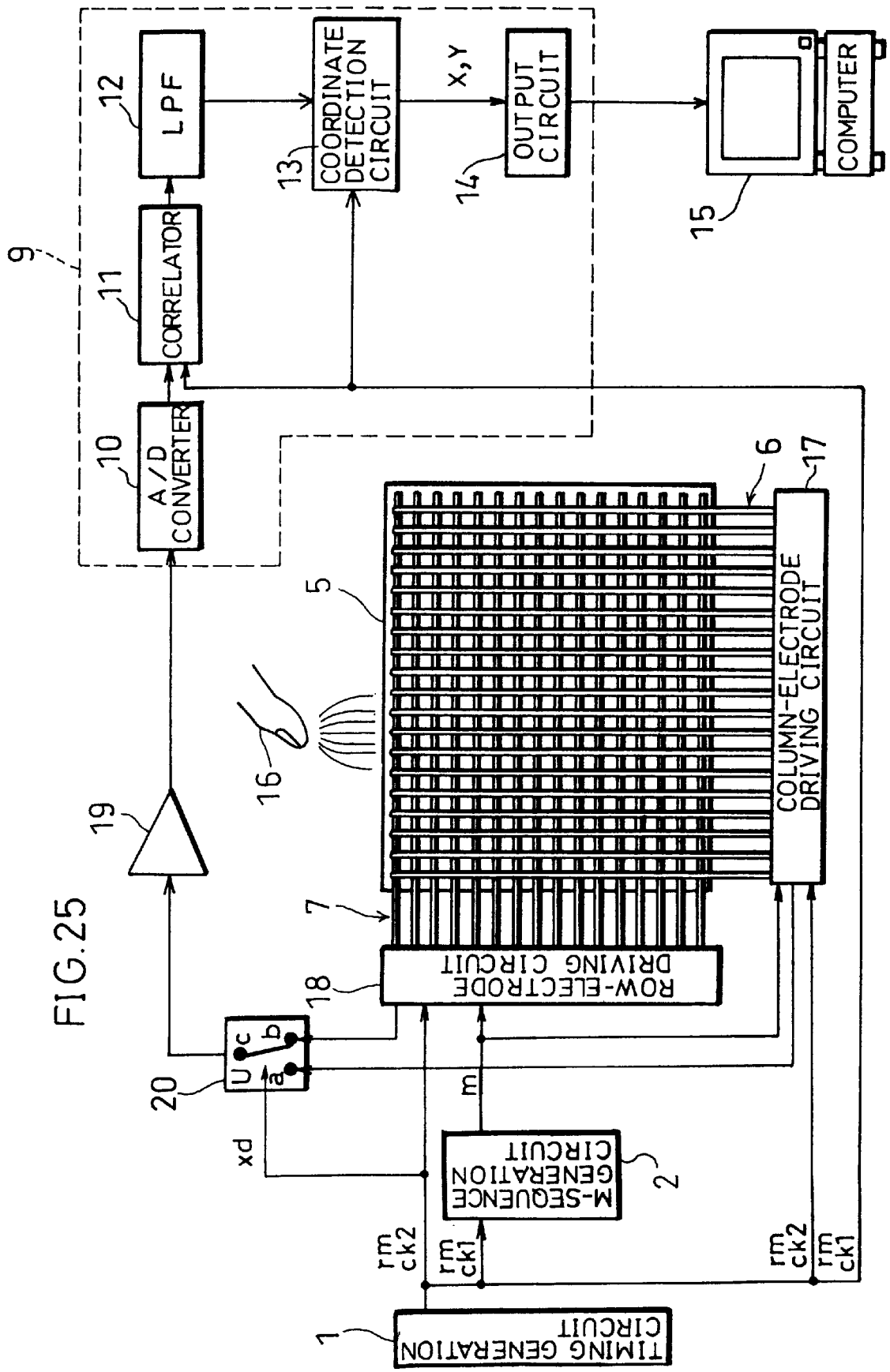
FIG. 25 is a block diagram that shows the arrangement of a coordinate input device in accordance with the second embodiment of the present invention.

As illustrated in FIG. 25, the coordinate input device is provided with a column-electrode driving circuit 17 and a row-electrode driving circuit 18 in place of the column-electrode driving circuit 3 and the row-electrode driving circuit 4 in Embodiment 1, and is also provided with an analog switch 20 and an amplification circuit 19. Further, a finger 16 is used instead of the electronic pen 8.

Figure 29:
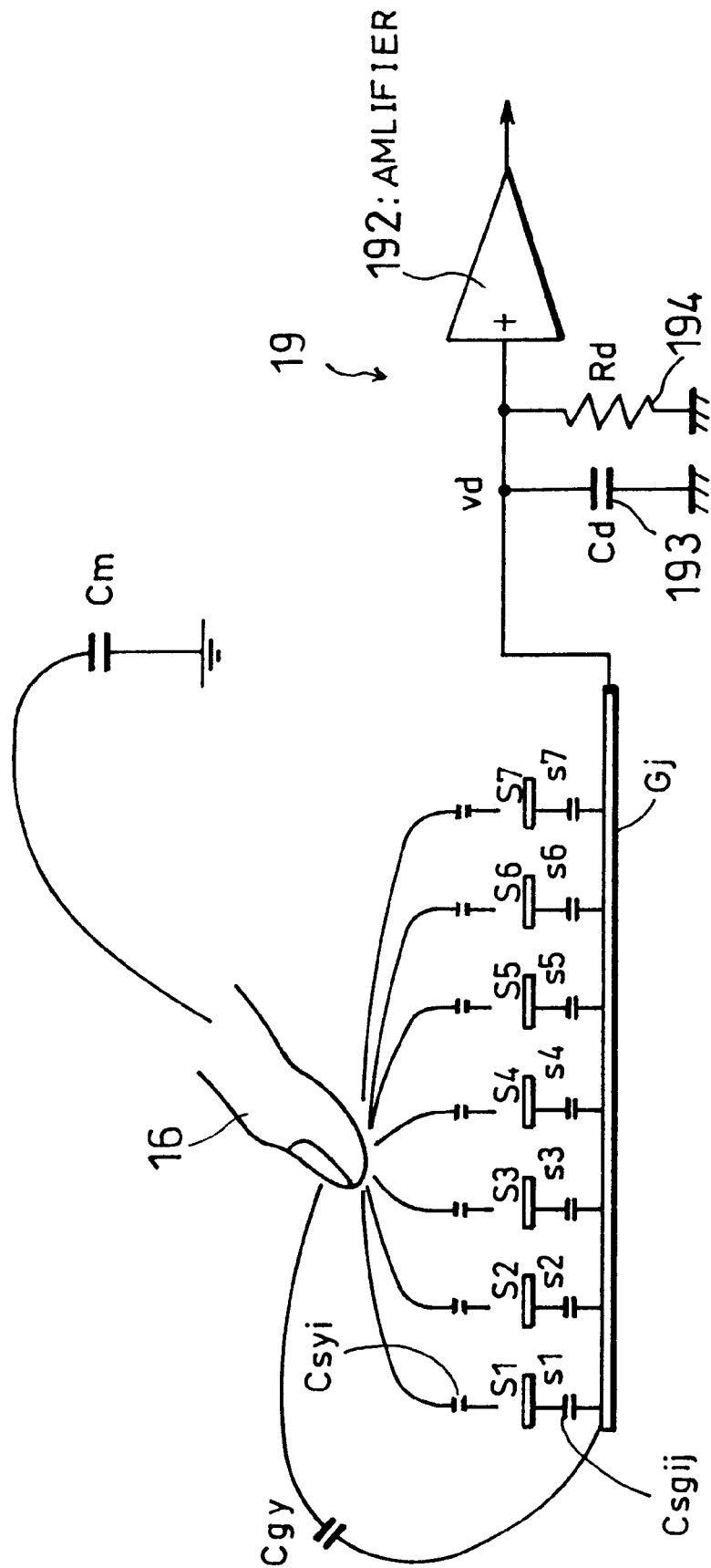
FIG. 29 is a circuit diagram that indicates an equivalent circuit corresponding to the electrostatically coupled state between a finger and the column electrodes as well as row electrodes, in the case when the finger is placed on a coordinate-input-panel substrate and a voltage is applied to column electrodes.

The column-electrode driving circuit 17 and the row-electrode driving circuit 18 are made by adding detection-output functions to the column-electrode driving circuit 3 and the row-electrode driving circuit 4 respectively. As illustrated in FIG. 29, the amplification circuit 19 is constituted by an amplifier 192, an input capacitance 193, and an input resistor 194. These components are the same as the amplifier 82, the input capacitance 83 and the input resistor 84 inside the electronic pen 8 in Embodiment 1. Further, the finger 16 may be replaced by other conductors, such as a metal piece.

In the above arrangement, the column-electrode driving method and the row-electrode driving method are the same as those in Embodiment 1; however, in place of the detection electrode 81 of the electronic pen 8 that functions as an electrode for detecting a signal, the row-electrode group 7 or the column-electrode group 6 are utilized. In other words, during the X-coordinate detection period Tx in which the column-electrode group 6 are driven by the M-sequence signal m, the row-electrode group 7 function as detection electrodes, and the resulting detection signal is supplied to the detection circuit 9 through the analog switch 20 and the amplification circuit 19. In contrast, during the Y-coordinate detection period Ty in which the row-electrode group 7 are driven by the M-sequence signal m, the column-electrode group 6 function as detection electrodes, and the resulting detection signal is supplied to the detection circuit 9 through the analog switch 20 and the amplification circuit 19.

Figure 26:
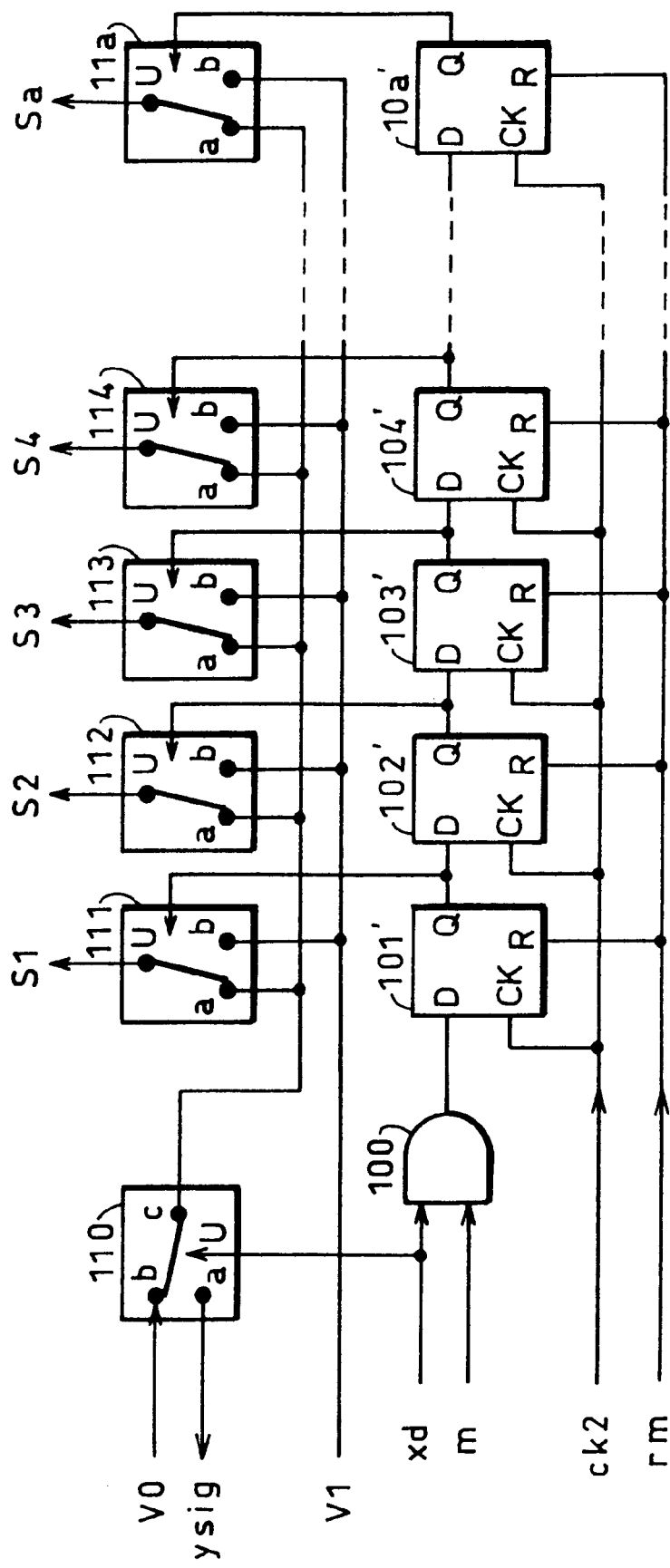
FIG. 26 is a circuit diagram showing the arrangement of a column-electrode driving circuit in the above-mentioned coordinate input device.
Figure 27:
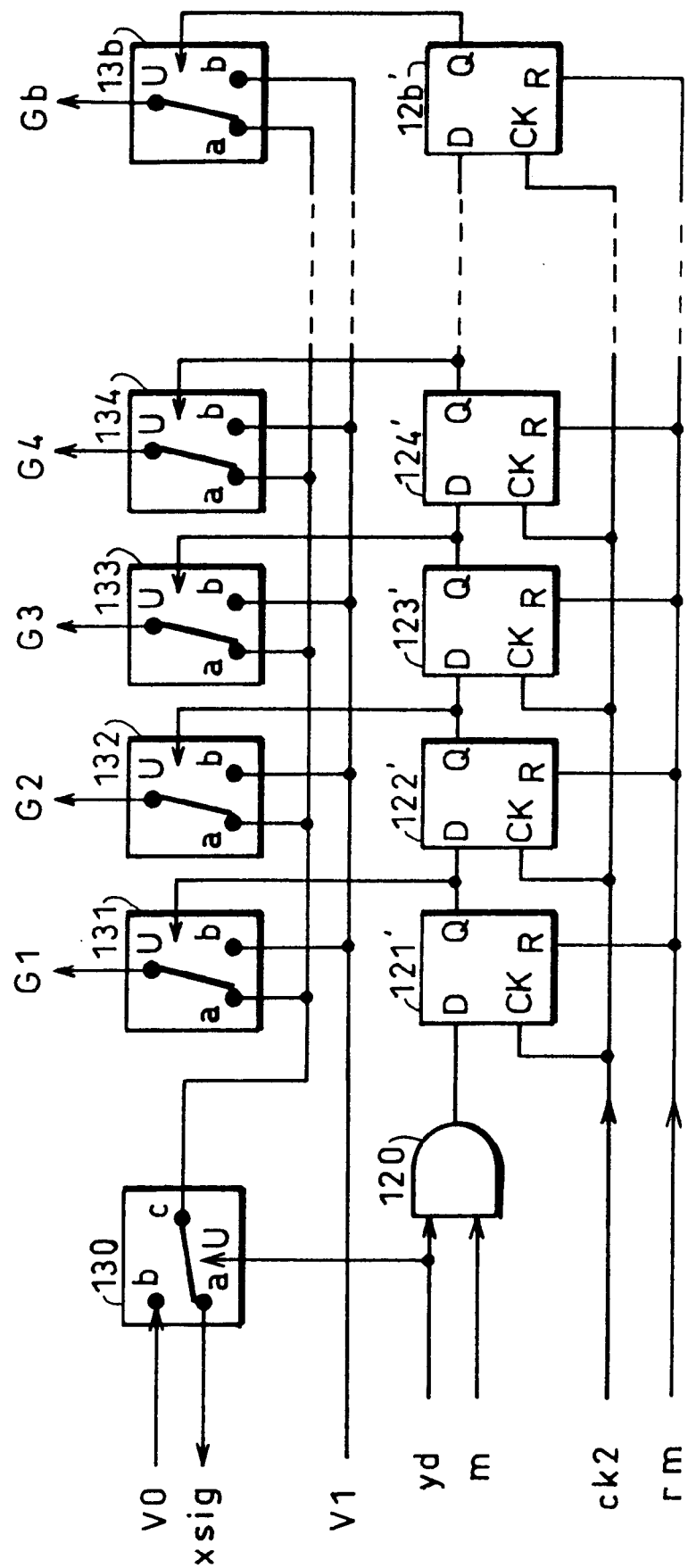
FIG. 27 is a circuit diagram showing the arrangement of a row-electrode driving circuit in the above-mentioned coordinate input device.
Figure 28:
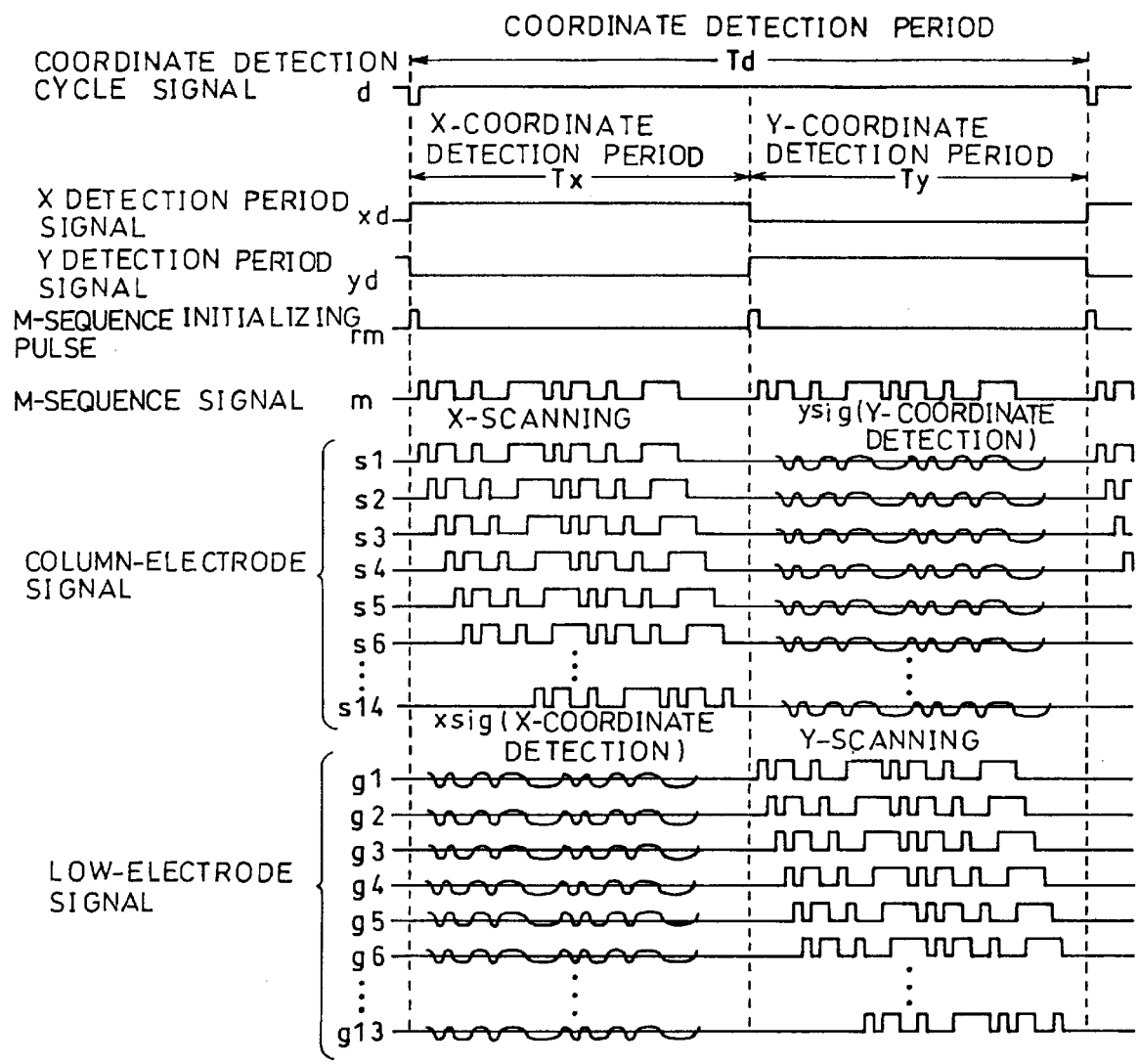
FIG. 28 is a timing chart that shows the operation of the above-mentioned coordinate input device.

FIG. 26 shows a structural example of the column-electrode driving circuit 17 and FIG. 27 shows a structural example of the row-electrode driving circuit 18. Here, referring to the timing chart of FIG. 28, an explanation will be given of the operations of these circuits.

The column-electrode driving circuit 17 is designed by adding flipflops 101' through 10a', each having a reset terminal R, in place of the D-flipflops 101 through 10a in the column-electrode driving circuit 3 of FIG. 12, and also by adding an analog switch 110. Further, the row-electrode driving circuit 18 is designed by adding flipflops 121' through 12b', each having a reset terminal R, in place of the D-flipflops 121 through 12b in the row-electrode driving circuit 4 of FIG. 13, and also by adding an analog switch 130.

During the X-coordinate detection period Tx in which the X detection period signal xd is "1", the analog switch 110 is connected to the b-side in the column-electrode driving circuit 17. Since voltage V0 is applied to the terminal a of the analog switches 111 through 11a, the same function as that of the column-electrode driving circuit 3 of FIG. 12 is obtained.

Here, since the Y detection period signal yd is "0", the analog switch 130 is connected to the a-side in the row-electrode driving circuit 18. Further, analog switches 131 through 13b are connected to the a-side so that the a-side is all short-circuited through connecting lines, and connected to the terminal c of the analog switch 130.

When the M-sequence initializing pulse rm is inputted during the X-coordinate detection period Tx, the flipflops 121' through 12b' are all reset at "0". Since the Y detection period signal yd is "0" during the X-coordinate detection period Tx, the output of an AND gate 120 always outputs "0", and the flipflops 121' through 12b' remain to hold "0" even if the clock ck2 is inputted thereto.

Consequently, during the X-coordinate detection period Tx, the row-electrode group 7 are all short-circuited so that a voltage induced in the row-electrode group 7 is supplied to the terminal b of the analog switch 20 from the row-electrode driving circuit 18 as an output xsig. In this case, the X detection period signal xd is applied to the control terminal U of the analog switch 20, and since the X detection period signal xd is "1" during the X-coordinate detection period Tx, the analog switch 20 is connected to the b-side. Therefore, the output xsig from the row-electrode driving circuit 18 is supplied to the input terminal of the amplification circuit 19.

During the Y-coordinate detection period Ty, the column-electrode driving circuit 17 and the row-electrode driving circuit 18 carry out operations that are reverse to those described above. Thus, the analog switch 20 is connected to the a-side so that the output ysig from the column-electrode driving circuit 17 is supplied to the input terminal of the amplification circuit 19.

FIG. 29, which is an equivalent circuit wherein all the row-electrodes are connected to the amplification circuit 19 through the row-electrode driving circuit 18 and the analog switch 20 during the X-coordinate detection period Tx, shows an electric coupling state when a certain position is specified by the finger 16.

The M-sequence signal m is applied to the column electrodes S1 through S7, and a given column electrode Si is connected to the input terminal of the amplifier 192 through a coupling capacitance related to a given row electrode Gj. Further, the finger 16 and the column electrode Si are electrostatically coupled with a coupling capacitance Csyi and the finger 16 and all the row electrodes are electrostatically coupled with a coupling capacitance Cgy.

Figure 30:
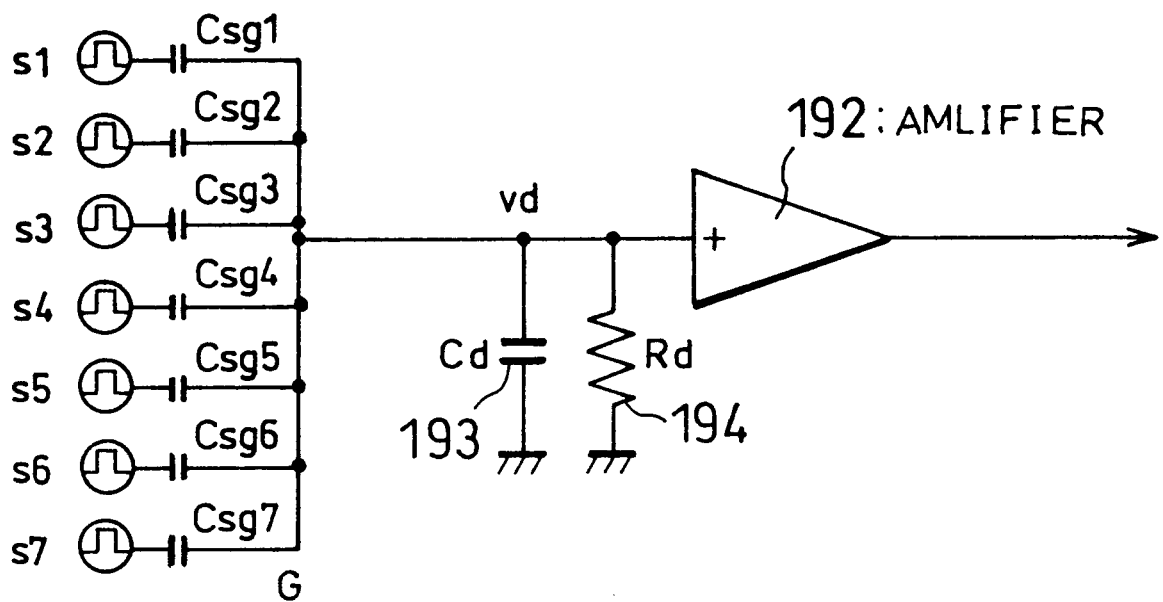
FIG. 30 is a circuit diagram that shows a further simplified form of the equivalent circuit of FIG. 29.
Figure 31A:
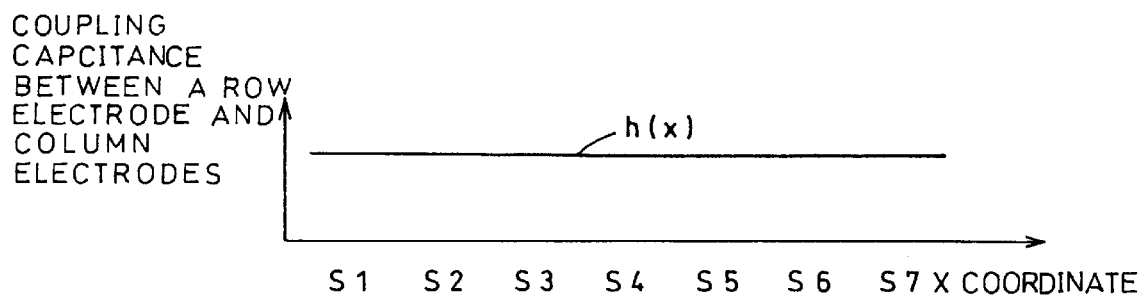
FIG. 31(a) is a graph that shows the coupling capacitance between the row electrode and the column electrodes in the case when the finger is retreating from the coordinate-input-panel substrate.

FIG. 30 shows an equivalent circuit of FIG. 29. When the finger 16 is retreating from the coordinate-input-panel substrate 5, the coupling capacitances Csyi and Cgy become very small values. Therefore, supposing that Csgi=ΣCsgij (Σ finds a sum with respect to j), the coupling capacitance between the column electrode and the row electrode is represented by Csg1=Csg2=. . . =Csg7, if the intersecting construction between the column electrodes and row electrodes is maintained uniform all over the coordinate-input-panel substrate. In this case, the coupling distribution function h(τ) becomes flat as shown in FIG. 31(a).

Figure 31B:
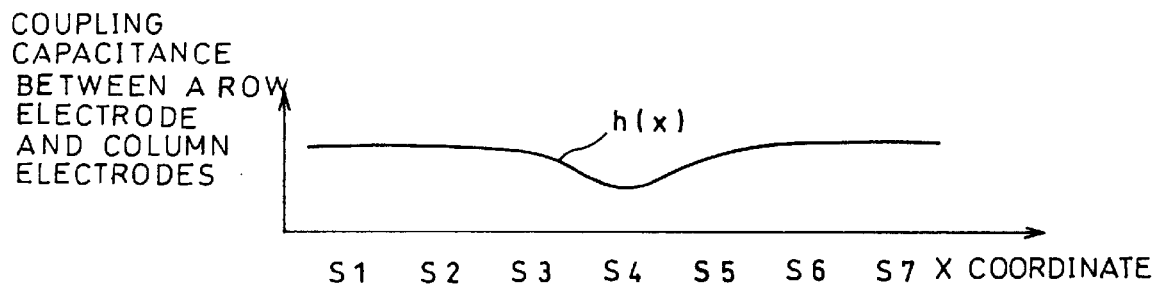
FIG. 31(b) is a graph that shows the coupling capacitance between the row electrode and the column electrodes in the case when the finger is approaching the coordinate-input-panel substrate.

In contrast, when the finger 16 is approaching the coordinate-input-panel substrate 5, lines of electric force, released from the column electrodes, are partially attracted toward the finger 16, with the result that the coupling capacitance Csyi between the finger 16 and the column electrode Si becomes greater, while the coupling capacitance Csgi, located near the finger 16, becomes smaller. Therefore, in this case, in the electrostatic coupling distribution function h(τ), the coupling capacitance Csgi that corresponds to the position specified by the finger 16 has a minimum value, as shown in FIG. 31(b).

In this case, the detection voltage vd, which is induced in the input terminal of the amplifier 192, is represented as follows by the effect of the input capacitance Cd of the amplification circuit 19.

$$vd=(Csg1{\times}s1+Csg2{\times}s2+ \ldots +Csga{\times}sa)/(Csg1+Csg2+ \ldots +Csga+Cd) \quad (19)$$

Similarly, during the Y-coordinate detection period Ty, supposing that ΣCsgij=Csgj, the detection voltage vd, which is induced in the input terminal of the amplifier 192, is represented by:

$$vd=(Cgs1{\times}g1+Cgs2{\times}g2+ \ldots +Cgsb{\times}gb)/(Cgs1+Cgs2+ \ldots +Cgsb+Cd) \quad (20)$$

The above-mentioned two equations have the same forms as those of equations (1) and (9) in Embodiment 1. Therefore, with respect to the operation of the detection circuit 9, only the necessary change in construction is to change the function of the coordinate detection circuit 13 so as to find the minimum value M2' instead of finding the maximum value M2; all the other operation principles are the same as those described in Embodiment 1.

As described above, the coordinate input device of the present embodiment is designed to carry out coordinate detection by using a finger 16 or a cordless pen by carrying out the correlation detection wherein an M-sequence signal which has a pulse-related auto-correlation function is used. When a finger 16 or another object is put close to the panel substrate, the coupling between the row electrodes and the column electrodes becomes smaller at the vicinity of the specified point, but since the change is very small, the level of the detectable voltage is very small. However, the arrangement of the present embodiment, which carries out the correlation detection by using the M-sequence signal m, makes it possible to obtain a higher S/N ratio as compared with prior-art arrangements, even from such small detection signals.

As a result, in the same manner as Embodiment 1, the row electrodes and the column electrodes can be driven by using a comparatively low power voltage. Further, it becomes possible to provide coordinate input devices which can carry out coordinate detection that is suitable for practical use, even in the case when they are used for liquid crystal panels, plasma displays and EL panels that have thin row electrodes and column electrodes so as to achieve an optically high aperture ratio. Moreover, with an arrangement wherein the electrode widths of the row electrodes and the column electrodes are made wider so as to be dedicated to the coordinate detection, it becomes possible to detect not only plane coordinates, but also coordinates in the height-wise direction, with high precision by evaluating the magnitude of the detection voltage.

EMBODIMENT 3

Figure 32:
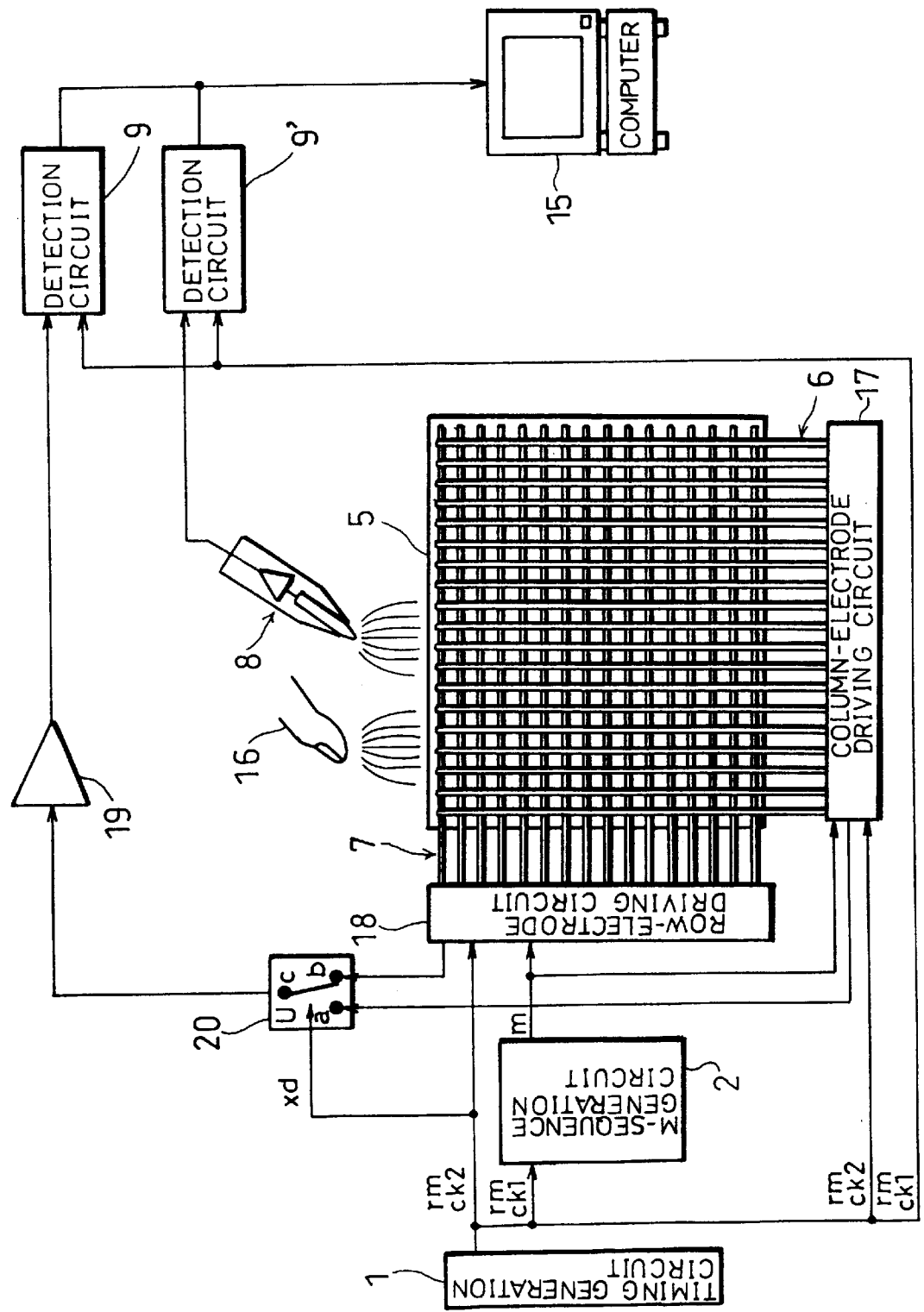
FIG. 32 is a block diagram that shows the arrangement of a coordinate input device in accordance with the third embodiment of the present invention.
Figure 33:
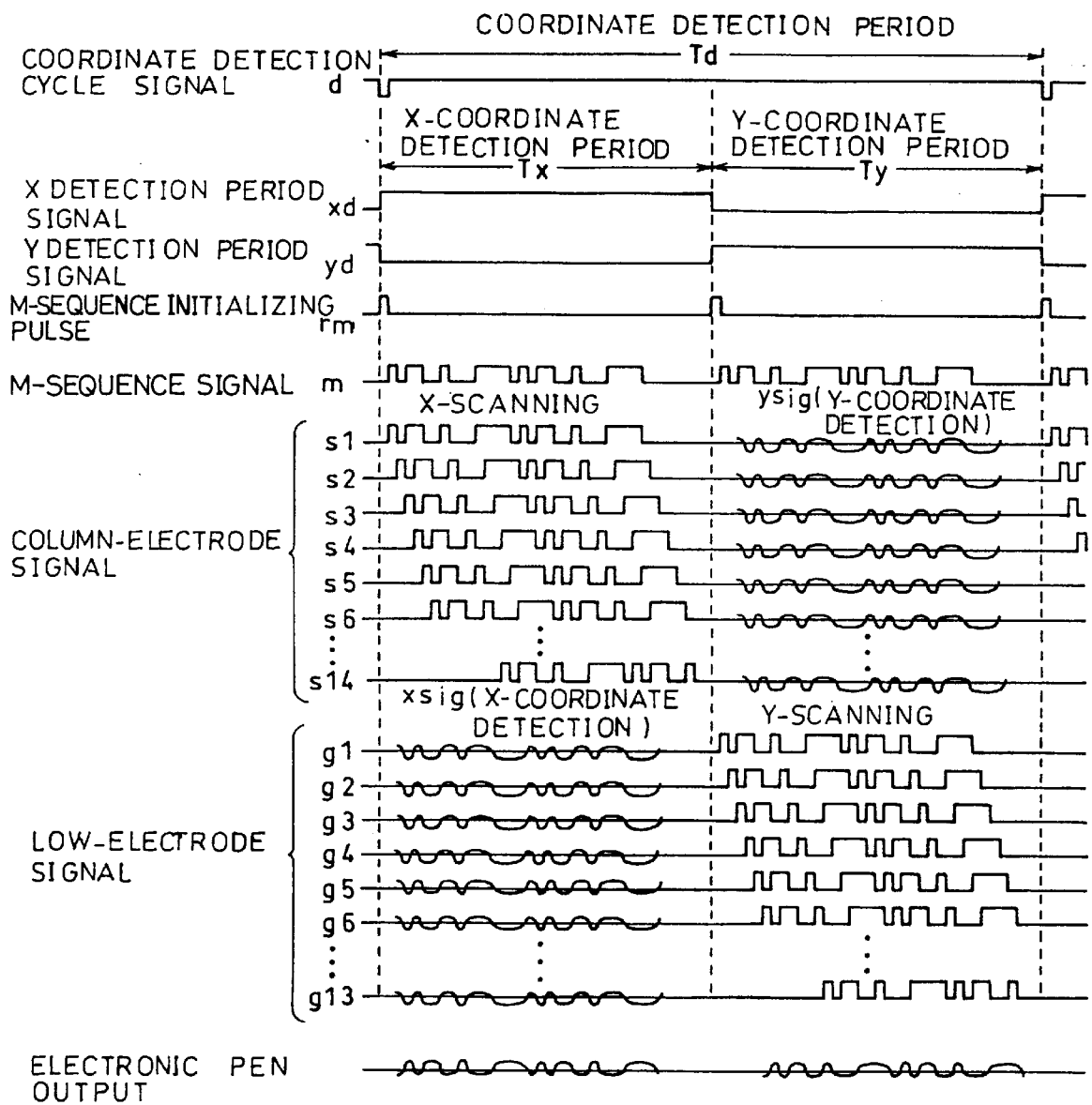
FIG. 33 is a timing chart that shows the operation of the above-mentioned coordinate input device.

Referring to FIGS. 32 and 33, the following description will discuss Embodiment 3 of the present invention. Here, for convenience of explanation, those members that are the same as those shown in Figures in the aforementioned embodiments are indicated by the same reference numerals and the description thereof is omitted.

The coordinate input device of the present embodiment has an arrangement wherein a finger input and a pen input can be simultaneously carried out. This coordinate input device is arranged by adding an electronic pen 8 and a detection circuit 9' for detecting a position specified by the electronic pen 8 to the arrangement of Embodiment 2. The detection circuit 9' has the same arrangement as the detection circuit 9.

FIG. 33 is a timing chart that explains the operation of the arrangement of FIG. 32. With respect to the finger input, the same operation as described in Embodiment 2 is carried out, and with respect to the pen input using the electronic pen 8, the same operation as described in Embodiment 1 is carried out. In this case, during the detection by the electronic pen 8, the column-electrode signal and the row-electrode signal, which are used at the time of the detection by the finger 16, are commonly used for detecting X-coordinate and Y-coordinate respectively.

As described above, the coordinate input device of the present embodiment, which is designed to commonly use the scanning signals upon finger input as well as pen input, utilizes the row-electrode group 7, the column-electrode group 6, the M-sequence generation circuit 2, the row-electrode driving circuit 18 and the column-electrode driving circuit 17 as commonly-used components; therefore, it is possible to provide an coordinate input device which allows the finger input and pen input simultaneously with a simple arrangement. Moreover, high-speed coordinate input is available by adding the detection circuit 9' in parallel with the detection circuit 9.

EMBODIMENT 4

Figure 34:
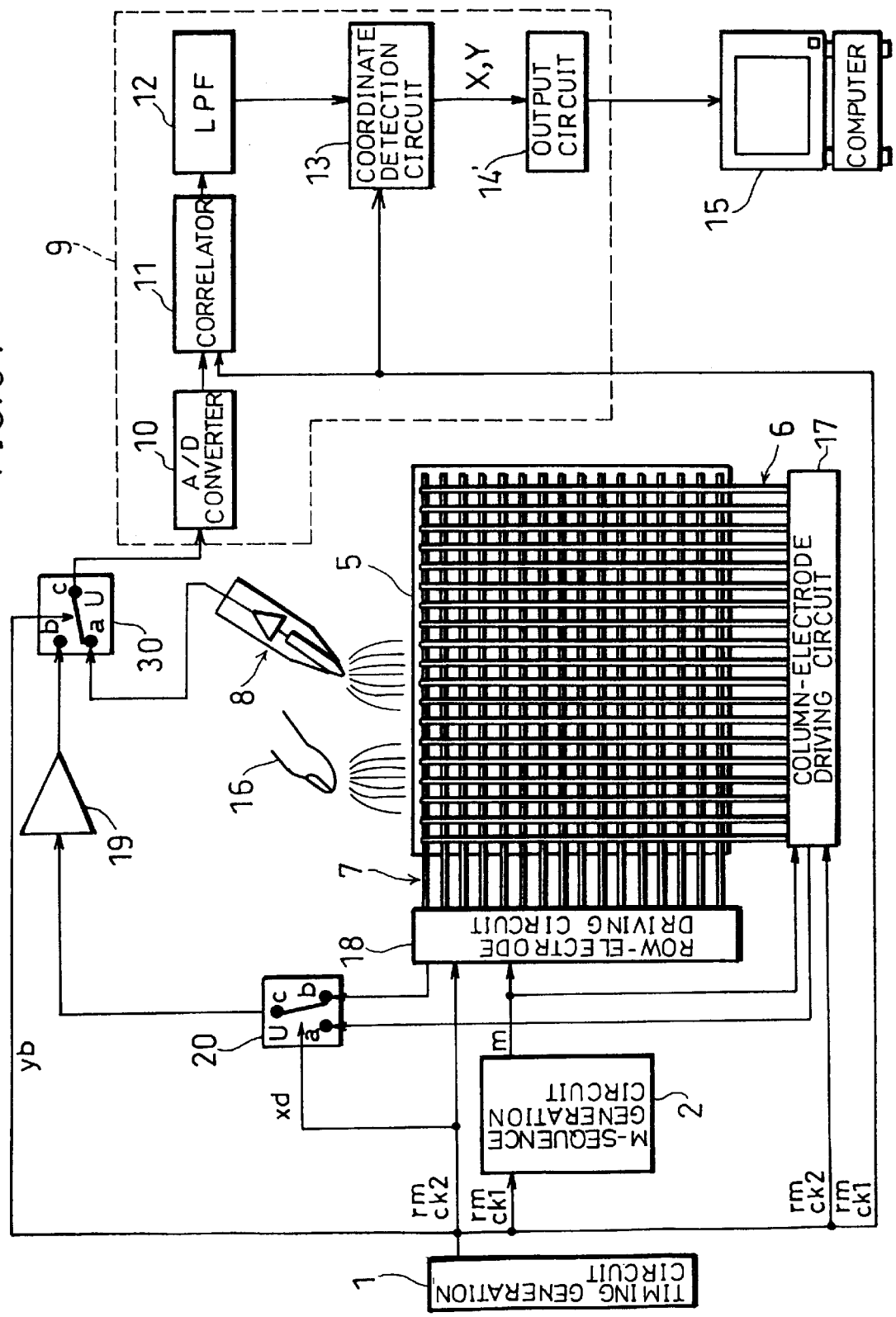
FIG. 34 is a block diagram that shows the arrangement of a coordinate input device in accordance with the fourth embodiment of the present invention.
Figure 35:
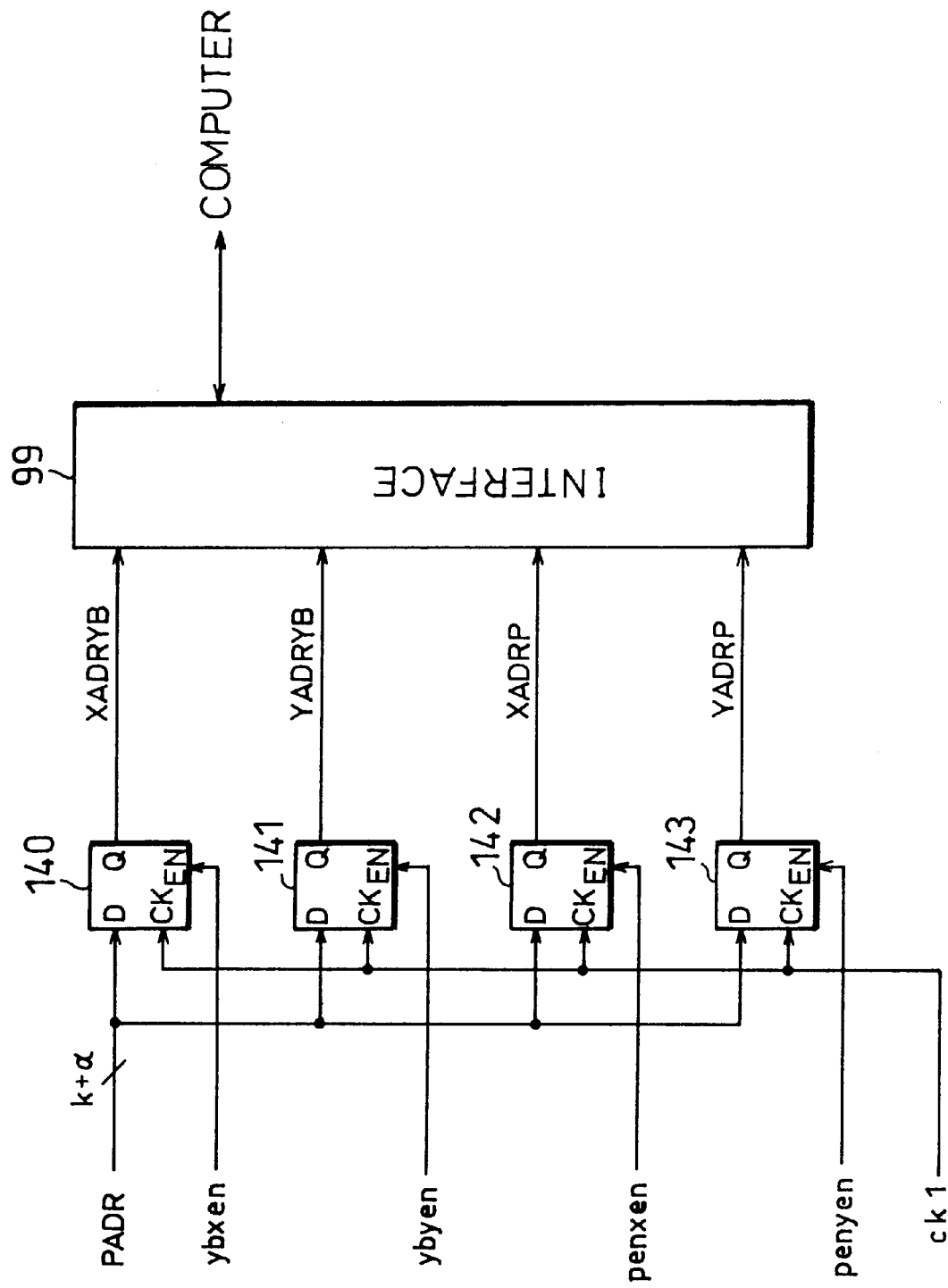
FIG. 35 is a circuit diagram that shows the arrangement of an output circuit in the above-mentioned coordinate input device.
Figure 36:
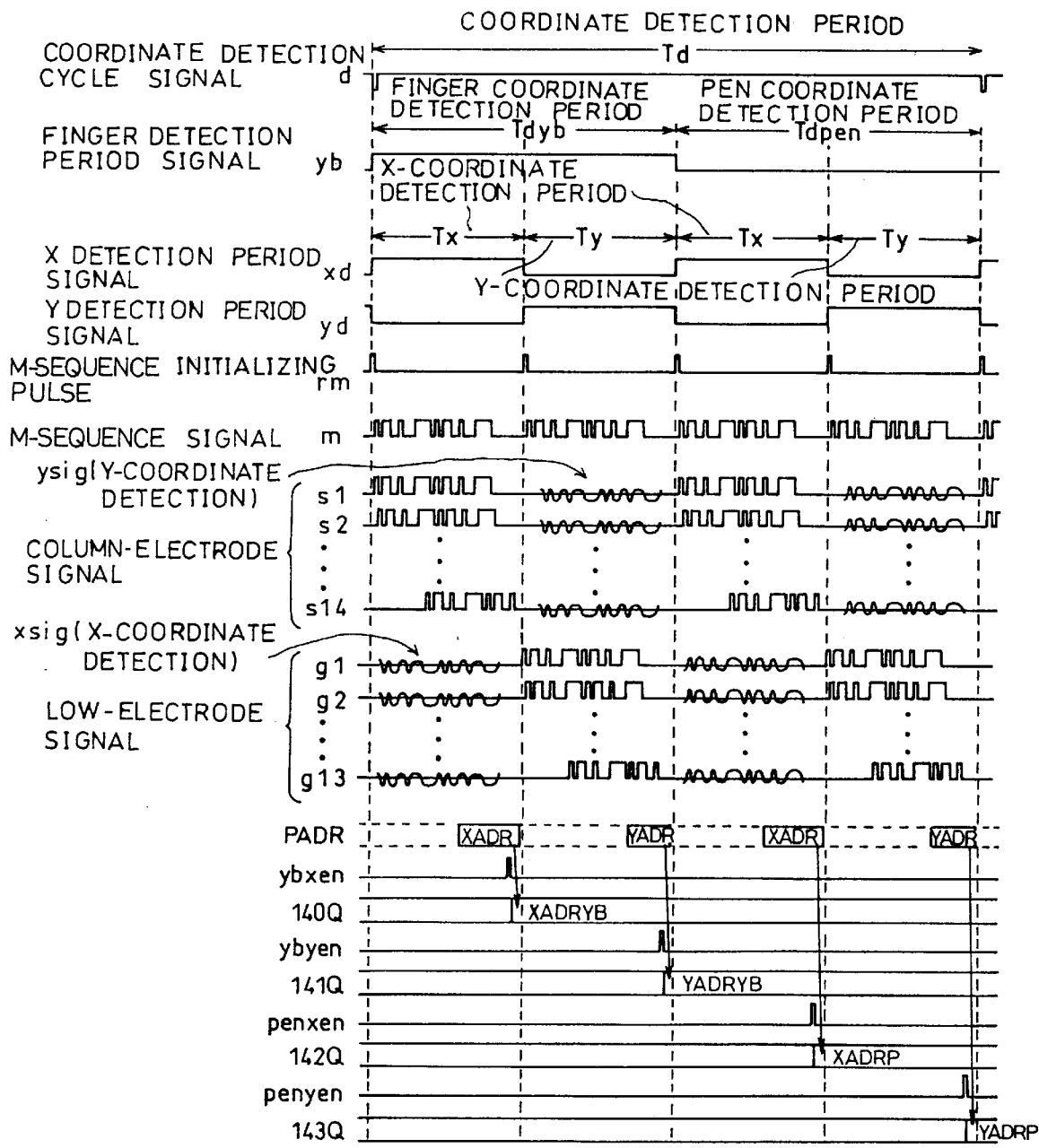
FIG. 36 is a timing chart that shows the operation of the above-mentioned coordinate input device.

Referring to FIGS. 34 through 36, the following description will discuss Embodiment 4 of the present invention.

Here, for convenience of explanation, those members that are the same as those shown in Figures in the aforementioned embodiments are indicated by the same reference numerals and the description thereof is omitted.

The coordinate input device of the present embodiment, which has a further improved arrangement of that of Embodiment 3, is designed to commonly use even the detection circuit by carrying out the finger-input coordinate-detection operation and pen-input coordinate-detection operation in a time-sharing manner.

As illustrated in FIG. 34, the coordinate input device is constructed by adding an analog switch 30 to the arrangement of Embodiment 2 and changing the output circuit 14 to an output circuit 14'.

The analog switch (switch) 30 is provided so that detection signals, detected by a finger 16 or an electronic pen 8, are selectively inputted to the detection circuit 9.

FIG. 35 shows a structural example of the output circuit 14'. The output circuit 14' is provided with flipflops 140 through 143, each having k+α bits and provided with an enable terminal EN, and an interface 99 related to a computer 15. In this arrangement, XADRYB and YADRYB that correspond to a position specified by the finger 16, as well as XADRP and YADRP that correspond to a position specified by the electronic pen 8, are latched as detected coordinates.

Referring to the timing chart of FIG. 36, an explanation will be given of the operation of FIG. 34. The coordinate detection period Td, which is a detection cycle, is constituted of a finger coordinate detection period Tdyb and a pen coordinate detection period Tdpen.

During the finger coordinate detection period Tdyb, a finger-detection period signal yb, supplied from the timing generation circuit 1, is inputted to the control terminal U of the analog switch 30 as "1", and the analog switch 30 is thus connected to the b-side so that a finger coordinate-detection operation mode is started. In other words, the output of the amplification circuit 19 is inputted to the detection circuit 9. During the finger coordinate detection period Tdyb, the operation of the detection circuit 9 is carried out in the same manner as that of Embodiment 2. Here, in synchronized timing with control signals ybxen and ybyen, the output circuit 14' allows the X-coordinate XADRYB and Y-coordinate YADRYB specified by the finger 16, to be latched respectively at the flipflop 140 and the flipflop 141 from the output PADR of the coordinate detection circuit 13.

During the pen coordinate detection period Tdpen, on the other hand, the finger-detection period signal yb becomes "0", and the analog switch 30 is thus connected to the a-side so that an electronic-pen coordinate-detection operation mode is started. In other words, the output of the electronic pen 8 is inputted to the detection circuit 9. During the pen coordinate detection period Tdpen, the operation of the detection circuit 9 is carried out in the same manner as that of Embodiment 1. Here, in synchronized timing with control signals penxen and penyen, the output circuit 14' allows the X-coordinate XADRP and Y-coordinate YADRP specified by the electronic pen 8, to be latched respectively at the flipflop 142 and the flipflop 143 from the output PADR of the coordinate detection circuit 13.

As described above, with the application of the analog switch 30, the coordinate input device of the present embodiment carries out coordinate detection by commonly using the detection circuit 9 upon finger input as well as pen input. This arrangement makes it possible to reduce the size of circuit to a great degree as compared with the arrangement of Embodiment 3. Moreover, the coordinate detection is carried out by using a time-sharing operation in which the coordinate detection period Td is divided into the finger coordinate detection period Tdyb and the pen coordinate detection period Tdpen; therefore, it becomes possible to carry out finger input and pen input simultaneously.

EMBODIMENT 5

Referring to FIGS. 37 through 40, the following description will discuss Embodiment 5 of the present invention. Here, for convenience of explanation, those members that are the same as those shown in Figures in the aforementioned embodiments are indicated by the same reference numerals and the description thereof is omitted.

The coordinate input device of the present embodiment, which adds the finger-input and electronic-pen-input functions of Embodiment 4 to a TFT liquid crystal display, is designed to commonly use the row-electrode group, the column-electrode group, the row-electrode driving circuit and the column-electrode driving circuit of the TFT liquid crystal display panel.

In this coordinate input device, the coordinate-input-panel substrate 5 of Embodiment 4 is replaced by a TFT liquid-crystal display panel (display device) 5', and a display control circuit (display control device) 201 and a switching circuit (output-switching device) 202 are added thereto.

The TFT liquid-crystal display panel 5' is constituted by a transparent TFT substrate 203, an opposing substrate 205, and a transparent opposing electrode 204 that is formed on the opposing substrate 205. On the TFT substrate 203 facing the opposing electrode 204, a row-electrode group 7 and a column-electrode group 6 are placed in a manner so as to orthogonally intersect each other, and TFTs (electrode-group switching elements) 206 are placed at the intersections. The gate of each TFT 206 is connected to the corresponding row electrode, the source thereof is connected to the corresponding column electrode, and the drain thereof is connected to a pixel electrode 207. The column-electrode group 6 is connected to a column-electrode driving circuit 17, and the row-electrode group 7 is connected to a row-electrode driving circuit 18. Liquid crystal is sealed between the pixel electrode 207 and the opposing electrode 204.

The display control circuit 201 converts image data outputted from a computer (information-processing apparatus) 15 into a control signal for driving the TFT liquid-crystal display panel 5' and image data. The display control circuit 201, which is connected to one of the input terminals of the switching circuit 202, supplies the output of the display control circuit 201 to the row-electrode driving circuit 18 and the column-electrode driving circuit 17 during a display period Tdsp, which will be described later. Further, the M-sequence generation circuit 2, which is connected to the other input terminal of the switching circuit 202, supplies the output of the M-sequence generation circuit 2 to the row-electrode driving circuit 18 and the column-electrode driving circuit 17 during the coordinate detection period Td.

Figure 37:
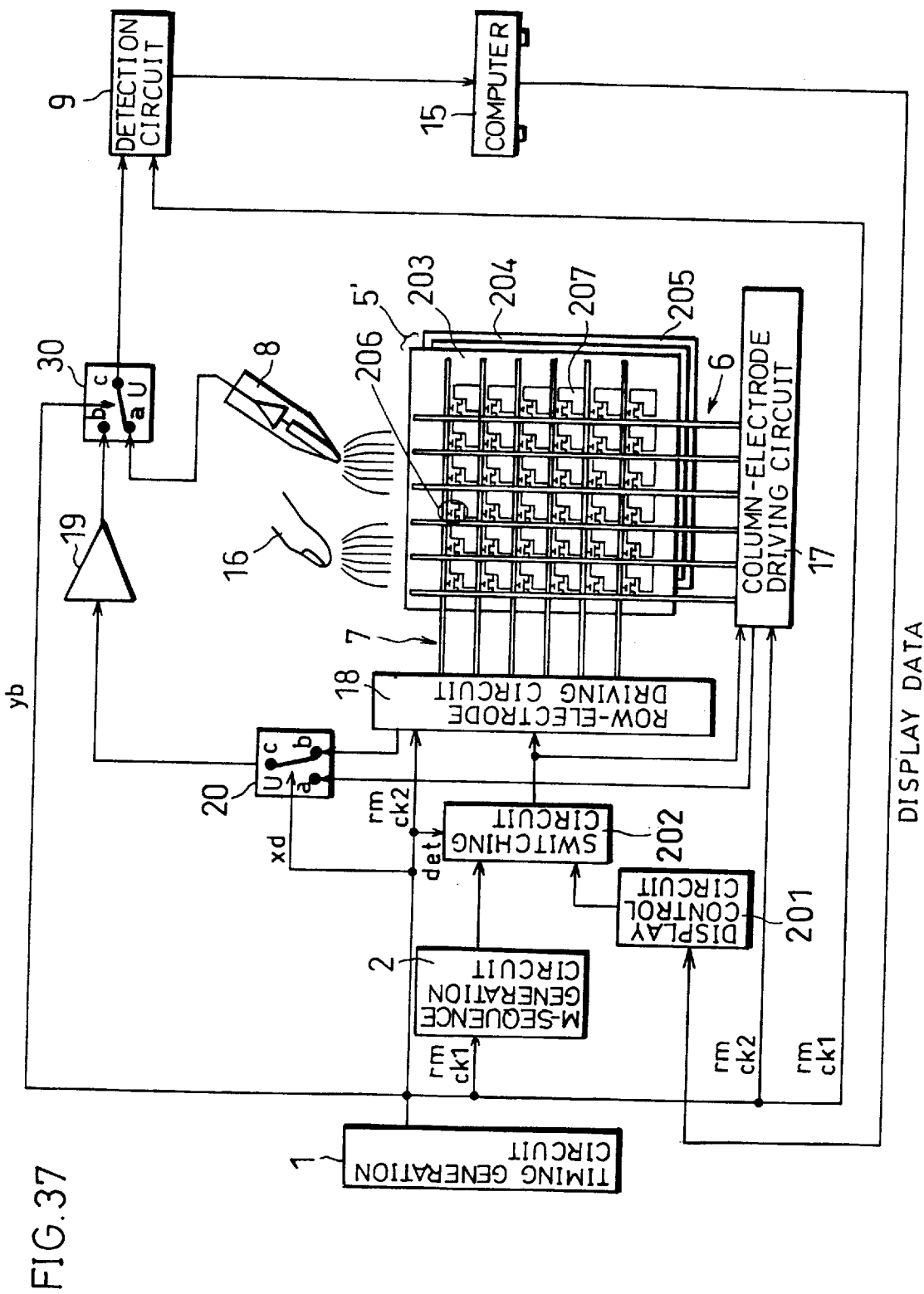
FIG. 37 is a block diagram that shows the arrangement of a coordinate input device in accordance with the fifth embodiment of the present invention.
Figure 38:
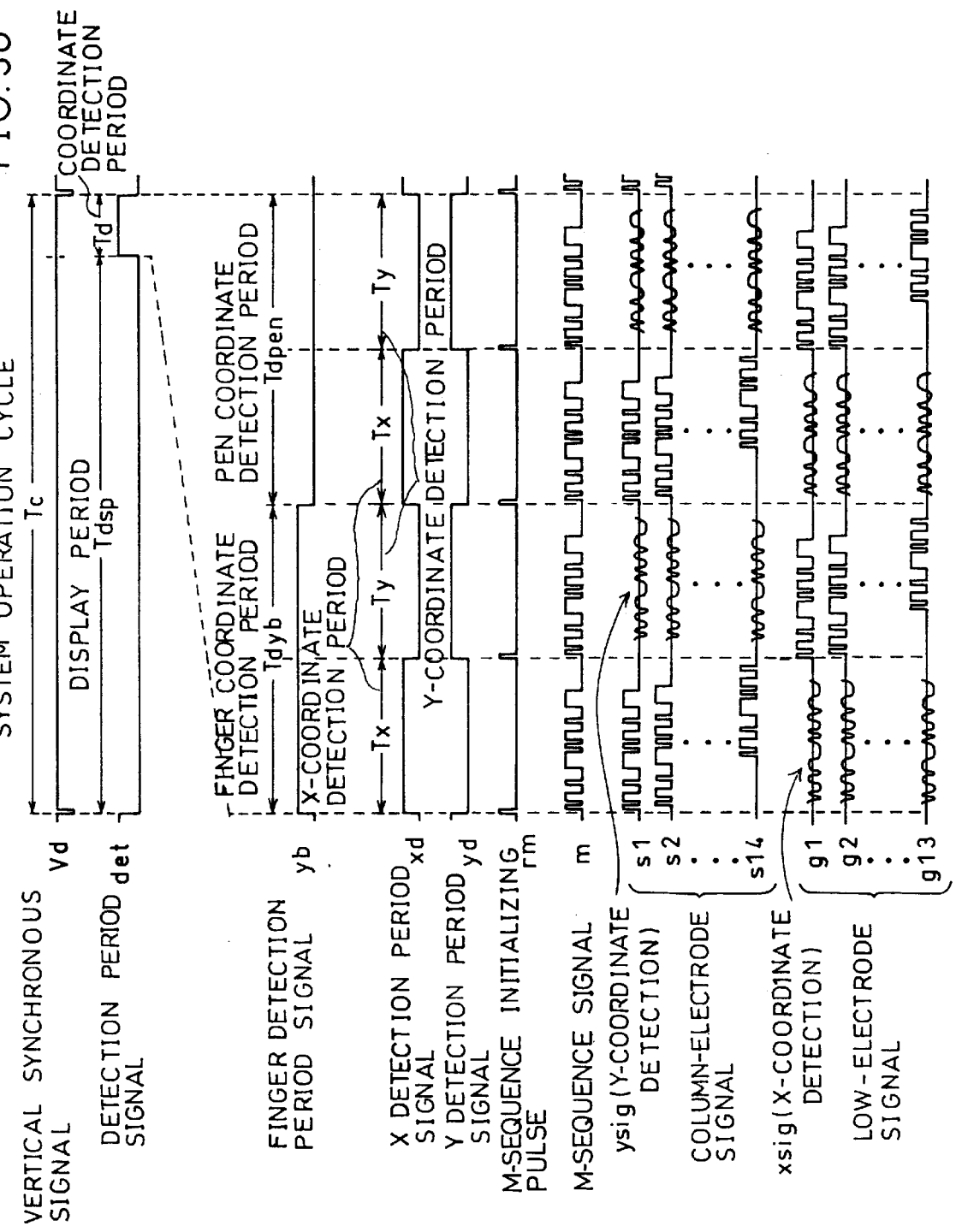
FIG. 38 is a timing chart that shows the operation of the above-mentioned coordinate input device.

FIG. 38 is a timing chart that indicates the operation shown in FIG. 37. Here, since the display driving method of TFT liquid crystal during the display period Tdsp has been well known in the art, the description of the display operation will be omitted.

The system operation cycle Tc, which forms an operation cycle for the entire system, consists of the display period Tdsp and the coordinate detection period Td. The system operation cycle Tc is controlled by a vertical synchronous signal Vd, and the display period Tdsp and the coordinate detection period Td are controlled by a detection period signal det respectively. During the display period Tdsp, the TFT liquid-crystal display panel 5' enters the display-operation mode, and during the coordinate detection period Td, the TFT liquid-crystal display panel 5' functions as a coordinate input device which allows finger input or electronic-pen input. Moreover, the coordinate detection period Td is constituted by the finger coordinate-detection period Tdyb and the pen coordinate-detection period Tdpen in the same manner as the arrangement of Embodiment 4.

In order to provide the TFT liquid-crystal display panel 5' with both the display function and the coordinate input function, it is necessary to modify voltages to be applied to the TFT 206, as described below.

Figure 40:
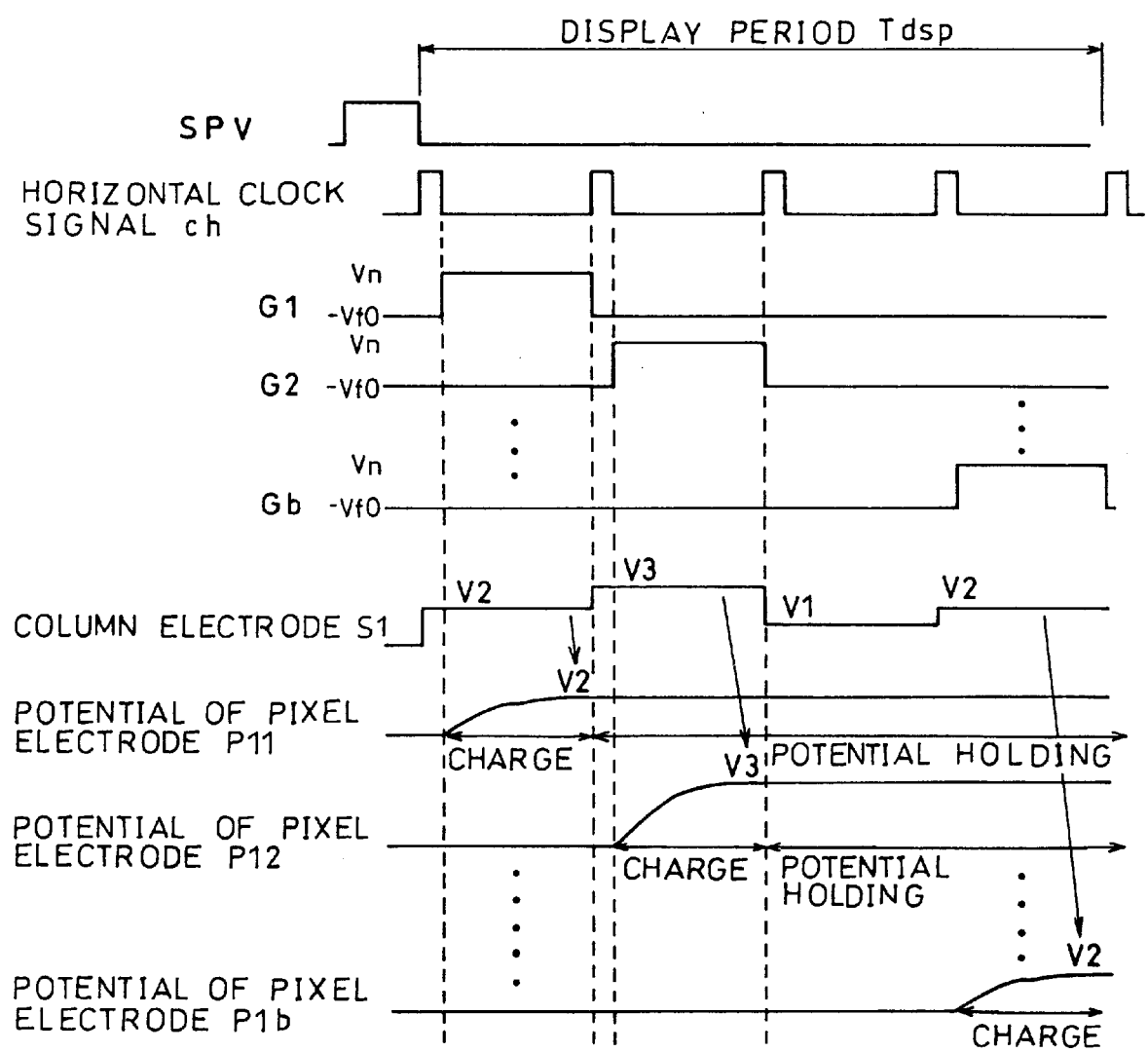
FIG. 40 is a timing chart that shows a display operation during a display period in the above-mentioned coordinate input device.

FIG. 40 shows an operation waveform during the display period Tdsp. During the display period Tdsp, a voltage corresponding to one line of display luminance is applied to the TFT 206 by the column-electrode S1. Simultaneously, the row-electrodes G1 through Gb are successively scanned in the row direction in synchronism with a horizontal clock signal ch. Thus, the TFTs 206, connected to the row electrodes, are turned on so that the voltage corresponding to the display data of the column-electrode S1 is charged to the liquid crystal through the pixel electrode 207. Here, in FIG. 40, the pixel electrode P1b indicates a pixel electrode located on column 1, line b. In this manner, the charging operation is completed with respect to all the pixels.

Figure 39:
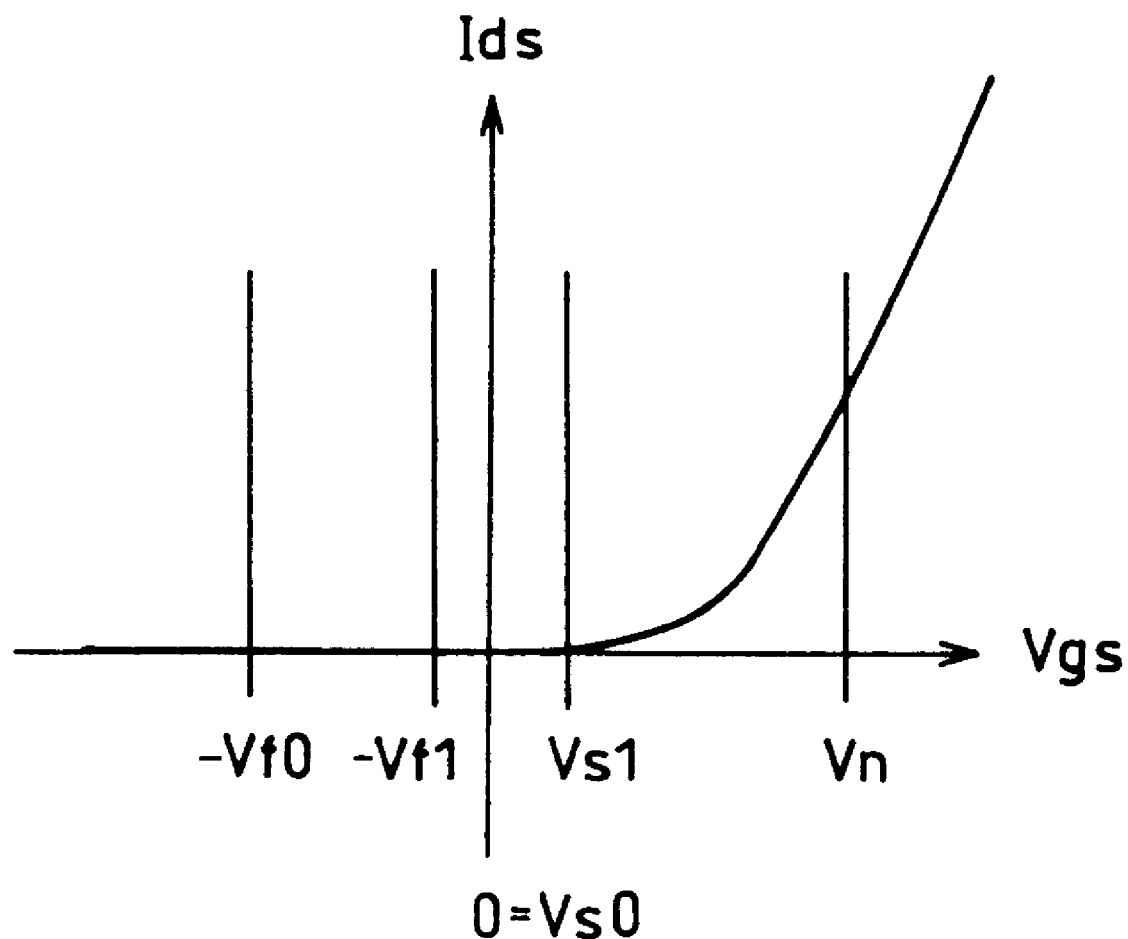
FIG. 39 is a graph that shows the drain current vs. gate voltage characteristic of a TFT in the above-mentioned coordinate input device.

Here, suppose that the voltages to be applied to the row electrodes are Vn and −Vf0. In accordance with the drain current vs. gate voltage characteristic of the TFT 206 as shown in FIG. 39, the TFT 206 is turned on upon application of the gate voltage Vn to the gate of the TFT 206, while the TFT 206 is turned off upon application of the cut-off voltage −Vf0 thereto.

During the coordinate detection period Td, on the other hand, the M-sequence signal m is applied to the column-electrode group 6 and the row-electrode group 7 in order to detect coordinates specified by a finger 16 or the electronic pen 8. Here, at this time, electric potentials have to be determined so as not to turn on the TFT 206. This is because, if the TFT 206 is turned on during the coordinate detection period Td, the image data, which has been charged to the liquid crystal during the display period Tdsp, will be discharged and lost.

Therefore, during the X-coordinate detection period Tx in which the column-electrode group 6 are scanned, the electric potentials (for example, V0 and V1 in FIG. 26) of the column-electrode group 6 are all set at 0 [V] and Vs1, and the row-electrode group 7 are set at −Vf0. Further, during the Y-coordinate detection period Ty in which the row-electrode group 7 are scanned, all the column-electrode group 6 are set at 0 [V], and the electric potentials (for example, V0 and V1 in FIG. 27) of the row-electrode group 7 are set at −Vf0 and −Vf1. Here, Vs1, −Vf0 and −Vf1 are electric potentials which do not allow the TFT 206 to turn on, as shown in FIG. 39.

This arrangement makes it possible to carry out a scanning operation without turning the TFT 206 on. At this time, it is needless to say that, during the X-coordinate detection period Tx, the input bias of the amplification circuit 19 to be connected to the row-electrode group 7 is set at −Vf0, and that, during the Y-coordinate detection period Ty, the input bias of the amplification circuit 19 to be connected to the column-electrode group 6 is set at 0 [V].

With the above-mentioned arrangement, when a finger 16 is used, an induction voltage is induced in the column-electrode group 6 or the row-electrode group 7 due to the M-sequence signal m that has been applied to the row-electrode group 7 or the column-electrode 6. When the electronic pen 8 is used, an induction voltage is induced in its detection electrode. The detection circuit 9 finds a correlation between the detection signal and the M-sequence signal m, eliminates noise by using the appropriate LPF 12, and detects coordinates specified by the finger 16 or the electronic pen 8.

The detected coordinates are inputted to the computer 15, and based on the coordinate values, a display data signal is generated so as to display a point image at the tip position of the finger 16 or the electronic pen 8 on the TFT liquid-crystal display panel 5', and inputted to the display control circuit 201. As a result, the switching circuit 202, which is controlled by the timing generation circuit 1, selects the display control circuit 201, and then the column-electrode driving circuit 17 and the row-electrode driving circuit 18 operate so as to display the point image at the tip position of the finger 16 or the electronic pen 8 on the TFT liquid-crystal display panel 5'.

As described above, the coordinate input device of the present embodiment carries out the coordinate detection by using the correlation detection method that uses the M-sequence signal, and also has the display function. At this time, a high S/N ratio is obtained by carrying out correlation operations; therefore, even in the case of display devices that have extremely narrow electrodes so as to increase the aperture ratio, it is possible to obtain high detection precision and high detection speeds. Further, even if the coordinate detection period is set as short as possible, no adverse effects are given on display. Moreover, since the construction and driving circuits of the display device are commonly utilized also in the coordinate detection by carrying out the display and coordinate detection in a time-sharing manner, it is possible to simplify the arrangement. Consequently, it becomes possible to provide a display-integrated-type coordinate input device with high transmittance and high visibility, which is also thin, light and inexpensive.

Additionally, in the present embodiment, the explanation was given by using a TFT liquid crystal panel as an example of liquid crystal display panels; however, the same correlation detection method using the M-sequence signal can be applied to other display panels, such as STN (Super Twisted Nematic) liquid crystal panels, MIM (Metal-Insulator-Metal) type liquid-crystal panels, EL panels, and plasma displays, as long as they have an arrangement wherein the electrode groups for applying voltage so as to display and the shift registers for driving the electrode groups can be commonly used in the display as well as in the coordinate input.

For example, in the case of duty-type liquid crystal, a transparent substrate on which a column-electrode group is placed and a transparent substrate which faces the transparent substrate and on which a row-electrode group is placed are provided, and liquid crystal is interpolated between the two transparent substrates. Here, the optical properties of the liquid crystal are controlled by effective applied voltages of the column-electrode group and the row-electrode group. In this arrangement, pixels are formed in regions at which the row- and column-electrodes intersect each other. Here, the liquid-crystal displaying operation is carried out by selecting one of the rows in the pixel matrix with the column-electrode group being made active, while releasing a signal corresponding to display data to the row-electrode group.

Normally, in such duty-type liquid crystal, since the areas in which the liquid crystal is interpolated with the column-electrode group and the row-electrode group intersecting each other are widened as large as possible so as to increase the aperture ratio for display, the electric coupling between the pen and the closer electrode group on the surface side is comparatively great, while the electric coupling between the pen and the electrode group on the opposite side is very small because the coupling is made through the gaps between the electrode group on the surface side. However, even in this case, the coordinate input device of the present invention makes it possible to provide a detection signal with high precision even when driven by a low voltage, since the correlation detection using the M-sequence signal is adopted.

Additionally, in the above-mentioned embodiment, the installation of the analog switch 30 makes both the finger input and the pen input available; however, as described in Embodiment 2, another arrangement which enables both the finger input and the pen input by using two detection circuits that correspond to the electronic pen and the finger may be adopted.

In addition, in the above-mentioned embodiment, both the finger input and the pen input are carried out; however, another arrangement, which enables only the pen input as described in Embodiment 1, or only the finger input as described in Embodiment 2, may be adopted.

Additionally, the M-sequence signal m is used in the above-mentioned Embodiments 1 through 5; however, the present invention is not intended to be limited to this signal, and any PN-sequence (Pseudo Random Noise) may be adopted as long as it has a pulse-related auto-correlation function, and satisfies equation (7). PN-sequences include binary functions and analog functions.

With respect to binary functions except for the M-sequence, Gold sequence, Barker codes, Frank codes and complementary-sequence codes are listed, and these codes may be adopted. However, since the M-sequence has moderate characteristics except for the case of $\tau=0$, and provides superior S/N ratios, it is preferable to use the M-sequence. Further, as compared with the Gold sequence which is formed by synthesizing two M-sequence signals, the M-sequence is advantageous in providing a simple construction and a smaller circuit size, as shown in FIG. 10. As a result, the M-sequence is advantageous in constructing a small portable-type coordinate input device with high-speed operation and low-power consumption.

Moreover, with respect to analog functions, chirp signals and white-noise signals can be used. Additionally, the application of analog functions will be explained in the next Embodiment 6 in detail.

As described above, when another function satisfying equation (7) is adopted in place of the M-sequence signal m, the correlator 11 in the detection circuit 9 is also modified to a circuit that corresponds to the adopted function. However, since the correlator 11 carries out operations of sum of products, it is easily constructed based upon FIG. 18. In this case also, the application of a binary sequence signal, such as the M-sequence signal, makes it possible to reduce the circuit size and to provide high-speed operations since the correlator 11 is constructed to provide sum of products whose coefficient is ±1.

EMBODIMENT 6

Referring to FIGS. 41 through 46, the following description will discuss Embodiment 6 of the present invention. Here, for convenience of explanation, those members that are the same as those shown in Figures in the aforementioned embodiments are indicated by the same reference numerals and the description thereof is omitted.

The coordinate input device of the present embodiment is designed to detect coordinates by carrying out correlation operations using an analog method.

Figure 44:
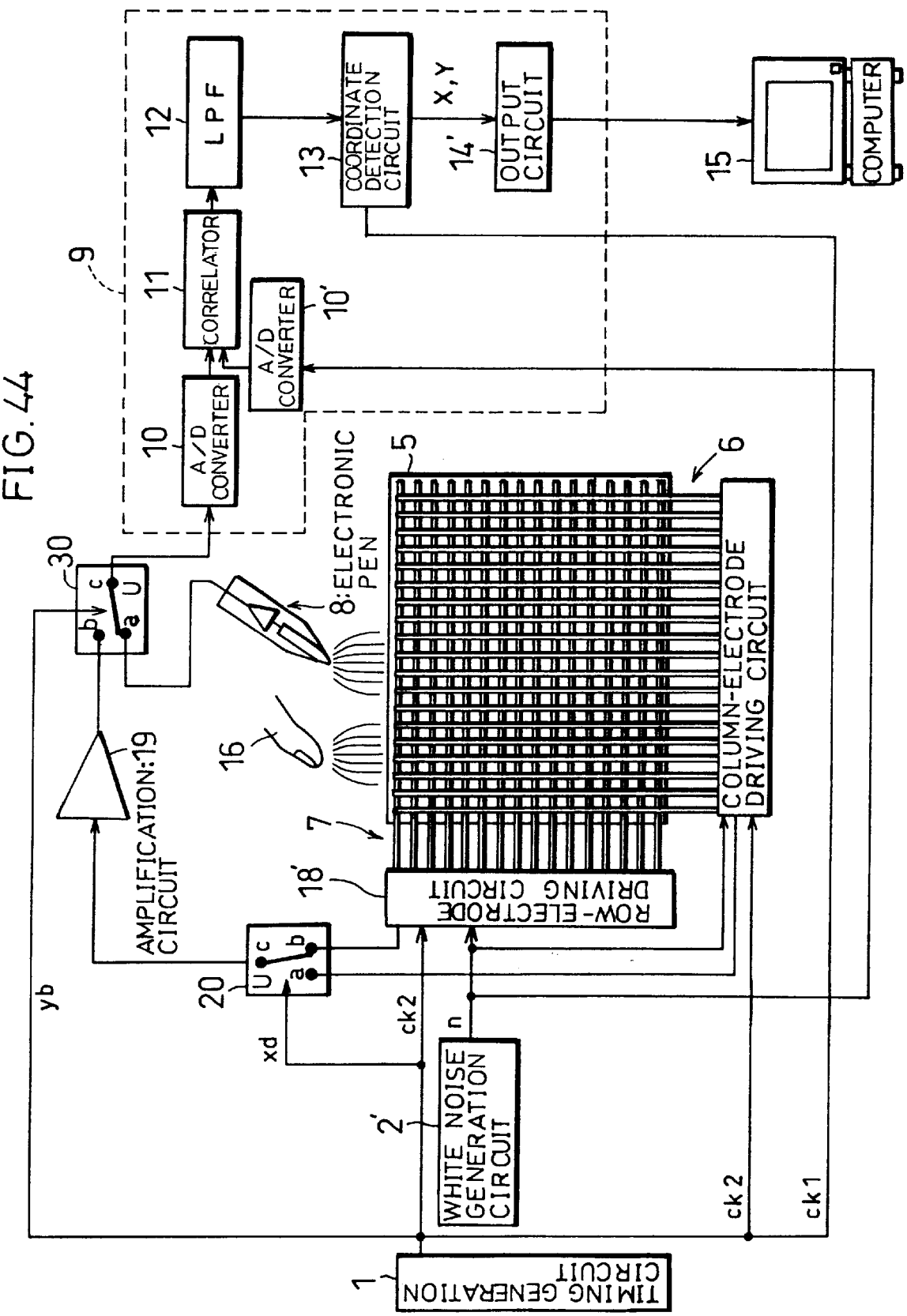
FIG. 44 is a block diagram that shows the arrangement of a coordinate input device in accordance with sixth embodiment of the present invention.

As illustrated in FIG. 44, the coordinate input device is provided with a white-noise generation circuit 2', a row-electrode driving circuit 17' and a column-electrode driving circuit 18' in place of the M-sequence generation circuit 2, the row-electrode driving circuit 17 and the column-electrode driving circuit 18 of Embodiment 4, and also is added by an A/D converter 10' in the detection circuit 9. The white-noise generation circuit (pseudo-random-signal generator) 2' generates white noise, and supplies it to the row-electrode driving circuit 17' or the column-electrode driving circuit 18', as well as to the A/D converter 10'. In this case, it is not necessary to supply the initializing pulse to the white-noise generation circuit 2'.

Further, the row-electrode driving circuit 17' and the column-electrode driving circuit 18' are operated by an analog delay system wherein delayed white noise n is successively applied to the row electrodes and column electrodes.

Moreover, in order to carry out digital correlation operations between the output of the analog switch 30 that has been converted into a digital signal and the output of the white-noise generation circuit 2', the white noise n is inputted to the correlator 11 after it has been converted into a digital signal in the A/D converter 10'.

Figure 45:
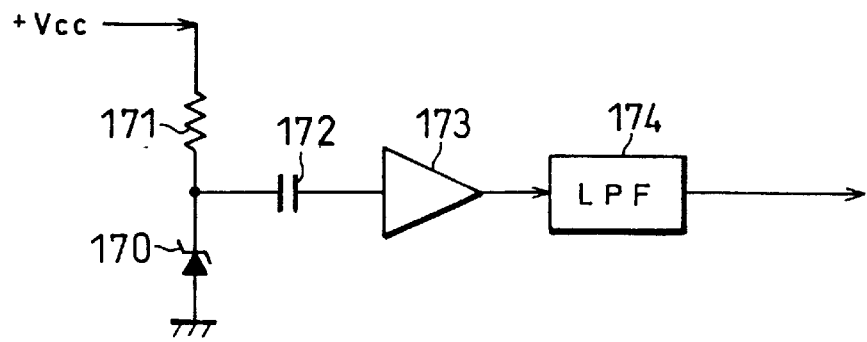
FIG. 45 is a circuit diagram that shows the arrangement of a white-noise generation circuit in the above-mentioned coordinate input device.

FIG. 45 shows a structural example of the white-noise generation circuit 2'. The white-noise generation circuit 2' is constituted by a zener diode 170, a resistor 171, a capacitor 172, an amplifier 173, and an LPF 174. The resistor 171 is a resistance that restricts the current flowing through the zener diode 170. Noise, which has been generated by the zener diode 170 and whose dc component has been eliminated by the capacitor 172, is amplified by the amplifier 173, and inputted to the LPF 174 from which it is outputted as a white noise n with a predetermined band width.

Figure 46:
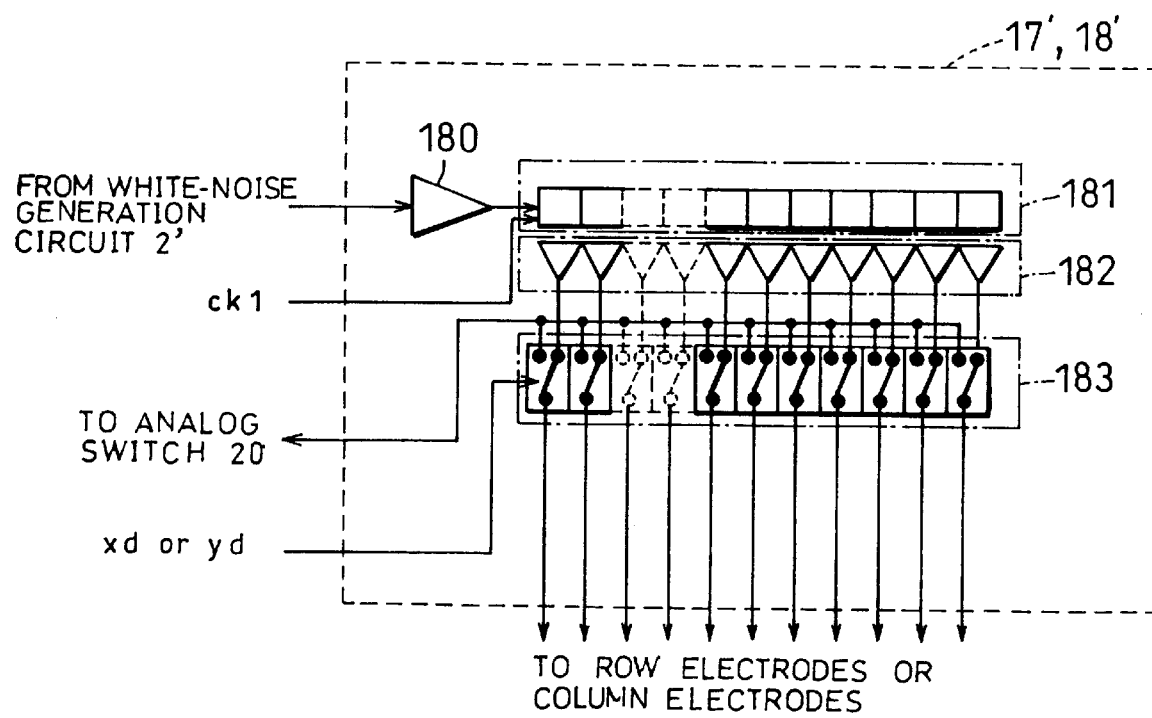
FIG. 46 is a circuit diagram that shows the arrangement of a column-electrode driving circuit or a row-electrode driving circuit in the above-mentioned input device.

FIG. 46 shows a structural example of the row-electrode driving circuit 17' or the column-electrode driving circuit 18'. Each of these driving circuits is constituted by an input buffer amplifier 180, a CCD 181, a CCD output buffer amplifier 182 for buffering outputs of the respective stages of the CCD 181, and a group of switching elements 183.

Since the CCD 181 samples, holds and shifts an analog voltage, the circuit of FIG. 46, as a whole, functions as an analog delay element with intermediate taps.

In this arrangement, upon receipt of pen input, the group of switching elements 183 are controlled by the X detection period signal xd or the Y detection period signal yd that are outputted from the timing generation circuit 1, and switched to the right side so as to be connected to the row-electrode group 7 or the column-electrode group 6.

Then, during the X-coordinate detection period Tx, the column-electrode driving circuit 18' is driven so that the white noise n, supplied from the white-noise generation circuit 2' is inputted to the CCD 181 through the input buffer amplifier 180, and converted into a quantity of charge. Here, the clock ck1 from the timing generation circuit 1 is supplied to the CCD 181, and the converted charge is transferred through the CCD 181 in synchronism with the clock ck1. The CCD 181 has taps which convert quantities of charge held in the respective stages into voltages and output them, and the resulting voltages are buffered by the CCD output buffer amplifiers 182 connected to the taps, and outputted to the column electrodes through the group of switching electrodes 183. On the other hand, during Y-coordinate detection period Ty, the row-electrode driving circuit 17' is driven, and the delayed white noise n is successively outputted to the row electrodes in the same manner.

During the X-coordinate detection period Tx, upon receipt of finger input, the group of switching elements 183 related to the column-electrode driving circuit 18' are switched to the left side, and connected to the analog switch 20, while the group of switching elements 183 related to the row-electrode driving circuit 17' are switched to the right side, and connected to the row electrodes. In contrast, during the Y-coordinate detection period Ty, the group of switching elements 183 related to the column-electrode driving circuit 18' are connected to the column electrodes, and the group of switching elements 183 related to the row-electrode driving circuit 17' are connected to the analog switch 20.

As described above, it is possible to simplify the construction of the coordinate input device by constructing the white noise generation circuit 2' and the driving circuits with analog elements and by using analog signals as the pseudo-random signals. This arrangement makes it possible to reduce the size of circuits, and to construct a high-precision coordinate input device; therefore, it is advantageous in constructing a small portable-type coordinate input device with high-speed operation and low-power consumption.

Figure 41:
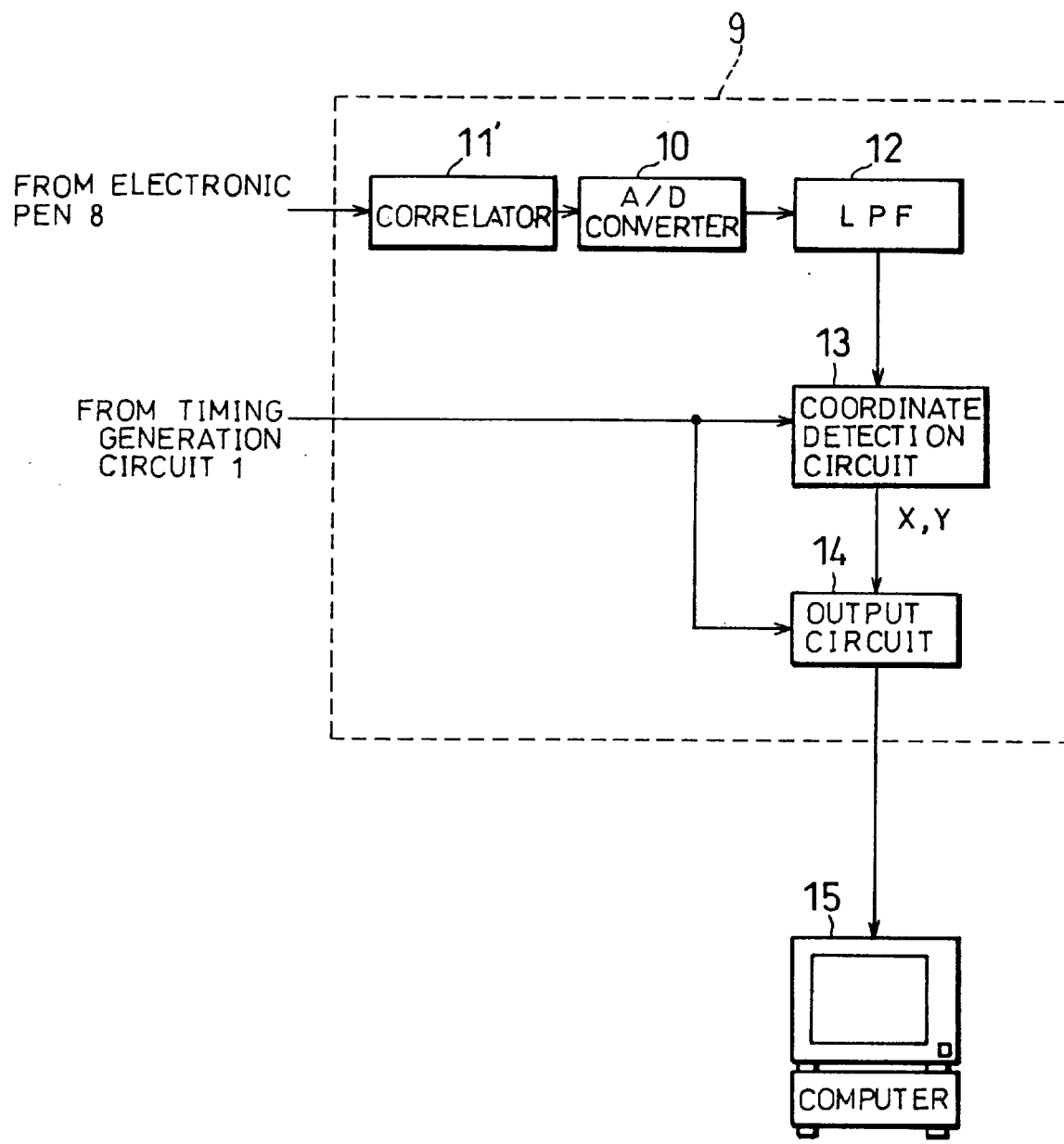
FIG. 41 is a block diagram that shows another arrangement of the detection circuit.

Additionally, the correlators 11 of the aforementioned Embodiments 1 through 6 are constituted by adders and subtracters; however, a DSP (Digital Signal Processor) and a CPU (Central Processing Unit) may be used for carrying out the correlation operations. Further, the correlator is not limited to a digital system, but may be provided as a correlator 11' which processes the output from the electronic pen 8 (or a finger) by using an analog system prior to subjecting it to an A/D conversion, as shown in FIG. 41. When the correlator 11' is applied to the arrangement of FIG. 44, it becomes possible to further simplify the size of detection circuit 9.

Figure 42:
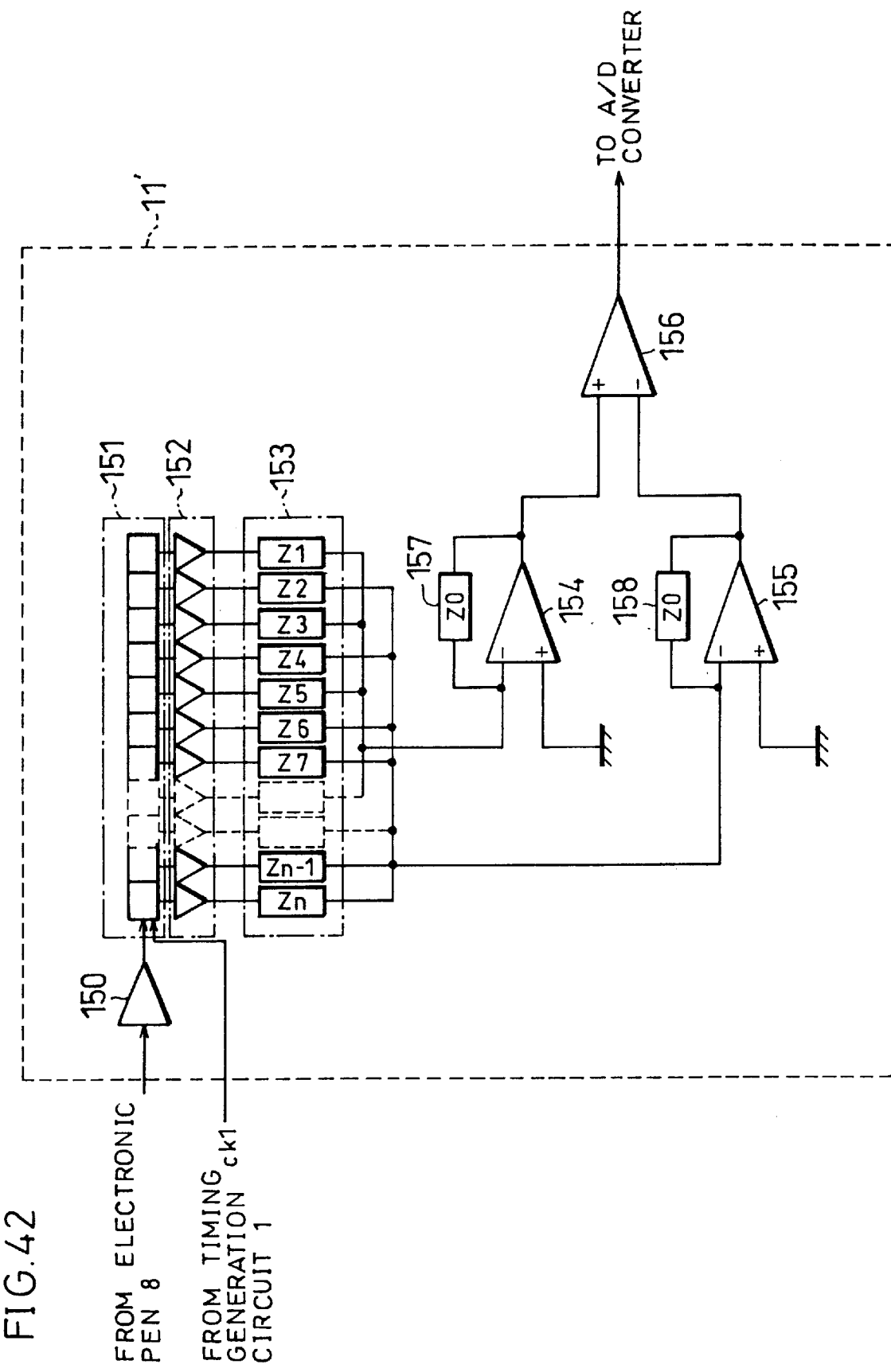
FIG. 42 is a circuit diagram that shows the arrangement of a correlator of the analog type.

For example, as shown in FIG. 42, the correlator 11' is constituted by a buffer amplifier 150, a CCD 151, a group of buffer amplifiers 152, impedance elements 153 that correspond to respective product coefficients, operational amplifiers 154, 155 and 156, and feedback impedance elements 157 and 158.

The CCD 151 shifts the analog output of the buffer amplifier 150 to the right in synchronism with the clock ck1. The intermediate tap outputs of the CCD 150 are respectively inputted to the group of buffer amplifiers 152. The respective outputs of the group of buffer amplifiers 152 are connected to the impedance elements 153 which have input resistors that are represented by Z1 through Zn.

Supposing ai=Zi/Z0, when the sign of ai in the following equation (21) is positive, the resulting outputs are inputted to the negative terminal of the operational amplifier 155, and when the sign is negative, they are inputted to the negative terminal of the operational amplifier 154. Then, the output d(τ) of the operational amplifier 156 is represented by:

$$d(\tau) = \Sigma vd(t - \Delta t_2 \times i) \times ai \qquad (21)$$

where Zi is a given input resistance and Z0 is a feedback resistance of the impedance elements 157 and 158.

In particular, in the case when the operational amplifiers 154 through 156 are designed to have the CMOS construction and the impedance element 153 is provided as a capacitor, this arrangement is more preferable since no stationary current is unnecessarily consumed all the time.

Figure 43:
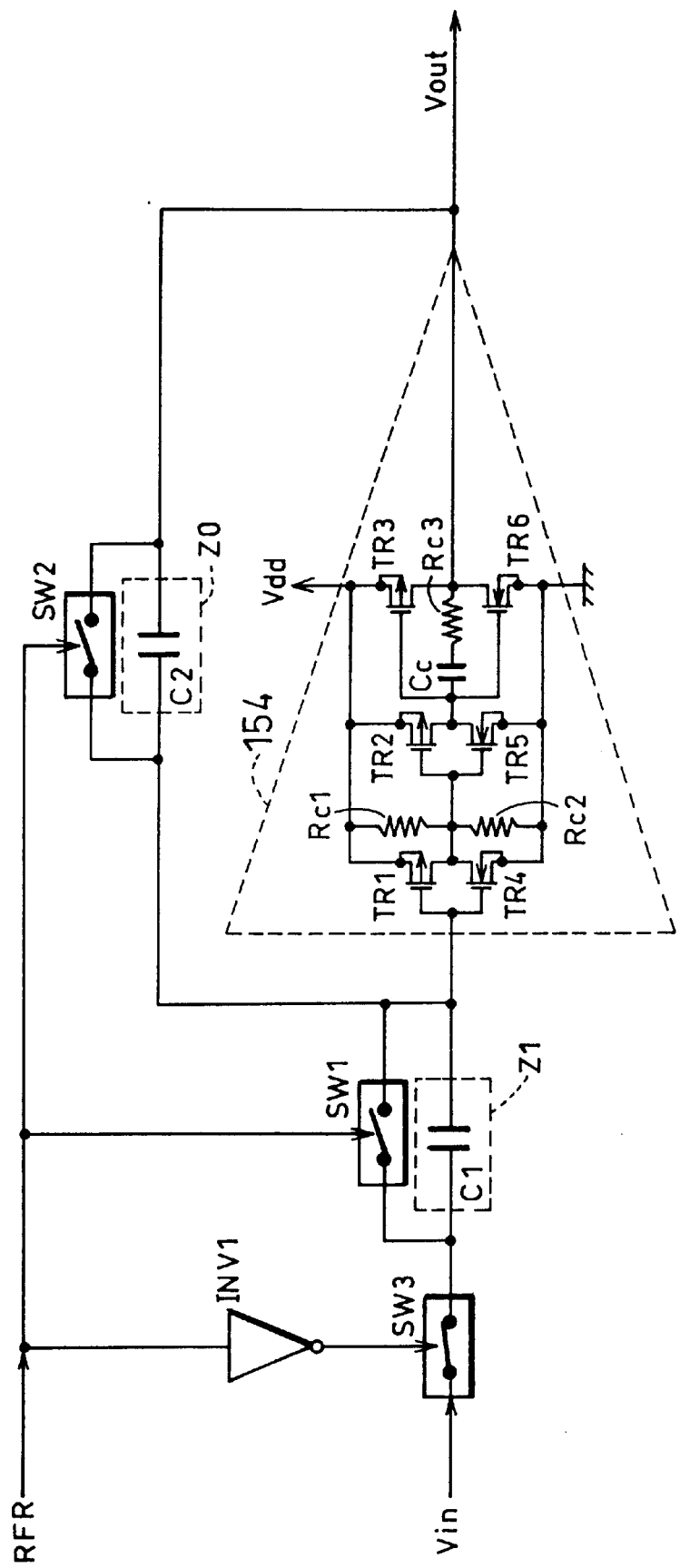
FIG. 43 is a circuit diagram that shows a case wherein the operation amplifier in the correlator of FIG. 42 is constituted only by CMOS transistors.

FIG. 43 shows an example of the operational amplifier 154 of the CMOS construction. The operational amplifier 154 is constituted by PchMOS transistors TR1 through TR3, NchMOS transistors TR4 through TR6, damping resistors Rc1 and Rc2, a phase-compensating resistor Rc3, and a phase-compensating capacitor Cc.

The operational amplifier 154 is equivalent to the construction wherein three CMOS inverters are connected in series, and the input terminal and the output terminal of the operational amplifier 154 function as an analog amplifier in the vicinity of Vdd/2 that is one-half of the power voltage Vdd. The feedback resistor Z0 is constituted by a capacitor C2, an input resistor Z1 and a capacitor C1, and its transfer function is represented as follows, when the switch SW1 is on and the switches SW2 and SW3 are off:

$$Vout/Vin = C1/C2 \qquad (22)$$

However, the bias is not determined depending on initial accumulated charges of the capacitors, the switches SW1 and SW2 are short-circuited by first applying a pulse to the refresh control terminal RFR. Thus, the switch SW3 is open and the charges in the capacitors C1 and C2 are discharged. After the discharge, the operation is carried out using Vin=Vout as an initial value; therefore, the operation bias is determined even when the capacitor C2 is applied to the feedback resistor Z0. In the operational state, the switch SW3 is short-circuited and the SW1 and SW2 are open.

As described above, the correlator 11' is characterized by the construction having: the analog delay devices (the buffer amplifier 150, the CCD 151 and the group of buffer amplifiers 152) which successively delay a detection signal that is an analog signal inputted to the correlator 11', and output the resulting signals; a plurality of impedance elements 153 to which the outputs from the analog delay devices are inputted and which have values corresponding to the coefficients of the pseudo-random signals; and the amplifiers (the operational amplifiers 154, 155 and 156 and the feedback impedance elements 157 and 158) whose integrated values are determined by the values of the impedance elements 153.

Consequently, it is possible to easily achieve a correlator 11' for carrying out correlation operations by using an analog system; this is advantageous in constructing a portable-type coordinate input device and the like.

Moreover, the impedance elements 153 are capacitors, and the amplifiers are complementary MOS circuits. This makes it possible to determine the integrated values by using the values of the impedance elements 153, as compared with the digital system. Therefore, the construction is simple and high-speed operation is available with small current consumption, thereby contributing to assemble a portable-type information apparatus with a coordinate input device.

Additionally, with respect to the construction of the correlator 11' for processing analog signals, the same effects are obtained by using SAW (Surface Acoustic Wave) elements, in place of the analog neuro-construction using the operational amplifiers.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A coordinate input device, which detects coordinates on a surface that are specified by an indicator, and outputs the resulting coordinate data, comprising:

a first group of electrodes arranged on a substrate at predetermined intervals;

a second group of electrodes, insulated from the first group of electrodes, and arranged at predetermined intervals so as to intersect the first group of electrodes;

a pseudo-random-signal generator for generating a pseudo-random signal having a pulse-related autocorrelation function;

a first sequential driver for sequentially applying the pseudo-random signal having alternately different phases to respective electrodes of the first group of electrodes;

a second sequential driver for sequentially applying the pseudo-random signal having alternately different phases to respective electrodes of the second group of electrodes;

a correlation detector for detecting correlation between a detection signal, outputted from the indicator when the indicator is electrostatically coupled to the first or second group of electrodes, and the pseudo-random signal generated by the pseudo-random-signal generator; and a coordinate output device, adapted to determine a time difference forming an extreme value of the detection signal detected by the correlation detector, and output a coordinate value corresponding to the time difference as a specified coordinate.

2. The coordinate input device as defined in claim 1, wherein the pseudo-random signal is a binary-sequence signal formed only of binary levels, and the correlation detector includes a delay device which successively delays the detection signal that has been inputted to the correlation detector and converted into a digital signal, and outputs a resulting signal, a first adder which adds the outputs a resulting signal, a first adder which adds the outputs of the delay device corresponding to a high-level coefficient of the binary sequence signal, a second adder which adds the outputs of the delay device corresponding to a low-level coefficient of the binary sequence signal, and a subtracter which calculates a difference between outputs of the first and second adders.

3. The coordinate input device as defined in claim 1, further comprising a low-pass filter, located between the correlation detector and the coordinate output device, which suppresses the high-frequency component of the output from the correlation detector.

4. The coordinate input device as defined in claim 3, wherein the low-pass filter is a matched filter, weighted based on a coupling capacitance resulting from the indicator.

5. The coordinate input device as defined in claim 4, wherein the coordinate output device includes a correction device for applying a quadratic-curve interpolation to an output from the matched filter.

6. The coordinate input device as defined in claim 4, wherein the low-pass filter is an infinite impulse response filter.

7. The coordinate input device as defined in claim 1, included within a display-integrated-type coordinate input device further comprising:

an information-processing device for driving an application program so as to generate display data upon receipt of the specified coordinates outputted from the coordinate output device;

a display control device for generating a control signal for driving the first or second sequential driver based on the display data outputted from the information-processing device;

an output-switching device for selectively outputting the control signal from the display control device and the pseudo-random signal from the pseudo-random-signal generator in a time sharing manner; and a display device for providing a liquid crystal display using the first and second groups of electrodes, wherein an image is displayed by controlling light transmittance of a liquid crystal using an electric signal released from the first or second sequential driver during a display period in which the control signal has been selected by the output-switching device.

8. The coordinate input device as defined in claim 7, wherein said display device comprises: a plurality of electrode-group switching elements connected to the first and second electrode groups, and transparent pixel electrodes, wherein a plurality of pixel electrodes, connected to the electrode-group switching elements, are arranged in a matrix format, and opposing electrodes face the transparent pixel electrodes with liquid crystal interpolated in between, said coordinate input device being arranged so that during the coordinate detection period in which the pseudo-random signal has been selected by the output-switching device, a voltage, which does not allow the electrode-group switching elements to conduct, is applied to the first electrode group or the second electrode group.

9. The coordinate input device as defined in claim 7, wherein said display device comprises a first transparent substrate on which the first electrode group is placed and a second transparent substrate on which the second electrode group is placed, the second transparent substrate facing the first transparent substrate, with the liquid crystal interpolated therebetween, said coordinate input device being arranged so that optical properties of the liquid crystal are controlled by an effective applied voltage of the first electrode group and the second electrode group.

10. The coordinate input device as defined in claim 1, wherein the pseudo-random signal is an M-sequence signal.

11. The coordinate input device as defined in claim 1, wherein the pseudo-random signal is an analog signal.

12. The coordinate input device as defined in claim 1, wherein the correlation detector comprises an analog delay device which successively delays the detection signal inputted to the correlation detector as an analog signal, and which outputs a resulting signal, a plurality of impedance elements to which the outputs from the analog delay device are inputted and having values corresponding to the coefficients of the pseudo-random signals, and an amplifier whose integrated values are determined by the values of the impedance elements.

13. The coordinate input device as defined in claim 12, wherein said impedance elements are capacitors and said amplifier is a complementary MOS circuit.

14. A coordinate input device, which detects coordinates on a surface that are specified by a conductive indicator, and outputs the resulting coordinate data, comprising:

a first group of electrodes arranged on a substrate at predetermined intervals;

a second group of electrodes insulated from the first group of electrodes and arranged at predetermined intervals so as to intersect the first group of electrodes;

a pseudo-random-signal generator for generating a pseudo-random signal having a pulse-related autocorrelation function;

a first sequential driver for sequentially applying the pseudo-random signal having alternately different phases to respective electrodes of the first group of electrodes;

a second sequential driver for sequentially applying the pseudo-random signal having alternately different phases to respective electrodes of the second group of electrodes;

a correlation detector which detects correlation between the pseudo-random signal, generated by the pseudo-random-signal generator, and a detection signal that has been induced in an electrode group not being driven, due to the fact that the indicator, electrostatically coupled to the electrode group being driven by the first or second sequential driver, is also electrostatically coupled to the electrode group not being driven; and a coordinate output device, adapted to determine a time difference forming an extreme value of the detection signal detected by the correlation detector, and output a coordinate value corresponding to the time difference as a specified coordinate.

15. The coordinate input device as defined in claim 14, wherein the pseudo-random signal is a binary-sequence signal formed only of binary levels, and the correlation detector includes a delay device which successively delays the detection signal that has been inputted to the correlation detector and converted into a digital signal, and outputs a resulting signal, a first adder which adds the outputs of the delay device corresponding to a high-level coefficient of the binary sequence signal, a second adder which adds the outputs of the delay device corresponding to a low-level coefficient of the binary sequence signal, and a subtracter which calculates a difference between outputs of the first and second adders.

16. The coordinate input device as defined in claim 14, further comprising a low-pass filter, located between the correlation detector and the coordinate output device, which suppresses the high-frequency component of the output from the correlation detector.

17. The coordinate input device as defined in claim 16, wherein the low-pass filter is a matched filter, weighted based on a coupling capacitance resulting from the indicator.

18. The coordinate input device as defined in claim 17, wherein the coordinate output device including a correction device for applying a quadratic-curve interpolation to an output from the matched filter.

19. The coordinate input device as defined in claim 16, wherein the low-pass filter is an infinite impulse response filter.

20. The coordinate input device as defined in claim 14, included within a display-integrated-type coordinate input device further comprising:

an information-processing device for driving an application program so as to generate display data upon receipt of the specified coordinates outputted from the coordinate output device;

a display control device for generating a control signal for driving the first or second sequential driver based on the display data outputted from the information-processing device;

an output-switching device for selectively outputting the control signal from the display control device and the pseudo-random signal from the pseudo-random-signal generator in a time sharing manner; and a display device for providing a liquid crystal display using the first and second groups of electrodes, wherein an image is displayed by controlling light transmittance of a liquid crystal using an electric signal released from the first or second sequential driver during a display period in which the control signal has been selected by the output-switching device.

21. The coordinate input device as defined in claim 20, wherein said display device comprises: a plurality of electrode-group switching elements connected to the first and second electrode groups, and transparent pixel electrodes wherein a plurality of pixel electrodes, connected to the electrode-group switching elements, are arranged in a matrix format, and opposing electrodes face the transparent pixel electrodes with liquid crystal interpolated in between, said coordinate input device being arranged so that during the coordinate detection period in which the pseudo-random signal has been selected by the output-switching device, a voltage, which does not allow the electrode-group switching elements to conduct, is applied to the first electrode group or the second electrode group.

22. The coordinate input device as defined in claim 20, wherein said display device comprises a first transparent substrate on which the first electrode group is placed and a second transparent substrate on which the second electrode group is placed, the second transparent substrate facing the first transparent substrate, with the liquid crystal interpolated therebetween, said coordinate input device being arranged so that optical properties of the liquid crystal are controlled by an effective applied voltage of the first electrode group and the second electrode group.

23. The coordinate input device as defined in claim 14, wherein the pseudo-random signal is an M-sequence signal.

24. The coordinate input device as defined in claim 14, wherein the pseudo-random signal is an analog signal.

25. The coordinate input device as defined in claim 14, wherein the correlation detector comprises an analog delay device which successively delays the detection signal inputted to the correlation detector as an analog signal, and which outputs a resulting signal, a plurality of impedance elements to which the outputs from the analog delay device are inputted and having values corresponding to the coefficients of the pseudo-random signals, and an amplifier whose integrated values are determined by the values of the impedance elements.

26. The coordinate input device as defined in claim 25, wherein said impedance elements are capacitors and said amplifier is a complementary MOS circuit.

27. The coordinate input device as defined in claim 14, further comprising:

a second indicator for specifying a coordinate position on the first and second groups of electrodes by being coupled to the first or second group of electrodes;

a second correlation detector for detecting correlation between a detection signal outputted from the second indicators and the pseudo-random signal generated by the pseudo-random-signal generator; and a second coordinate output device, adapted to determine a time difference forming an extreme value of the detection signal detected by the second correlation detector, and output a coordinate value corresponding to the time difference as a specified coordinate.

28. The coordinate input device as defined in claim 14, further comprising:

a second indicator for specifying a coordinate position on the first and second groups of electrodes by being coupled to the first or second group of electrodes; and a switch for selectively inputting to the correlation detector a detection signal outputted from the second indicator and a detection signal induced in the electrode group not driven.

29. The coordinate input device as defined in claim 28, wherein said switch carries out selection of the two detection signals in a time-sharing manner.

* * * * *